United States Patent
Breakstone et al.

(10) Patent No.: US 10,223,315 B2
(45) Date of Patent: *Mar. 5, 2019

(54) FRONT END TRAFFIC HANDLING IN MODULAR SWITCHED FABRIC BASED DATA STORAGE SYSTEMS

(71) Applicant: Liqid Inc., Lafayette, CO (US)

(72) Inventors: Jason Breakstone, Broomfield, CO (US); Christopher R. Long, Colorado Springs, CO (US); James Scott Cannata, Denver, CO (US)

(73) Assignee: Liqid Inc., Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/708,320

(22) Filed: Sep. 19, 2017

(65) Prior Publication Data

US 2018/0004615 A1    Jan. 4, 2018

Related U.S. Application Data

(63) Continuation of application No. 14/747,450, filed on Jun. 23, 2015, now Pat. No. 9,798,636.

(Continued)

(51) Int. Cl.
*G06F 13/00*     (2006.01)
*G06F 13/40*     (2006.01)
(Continued)

(52) U.S. Cl.
CPC ........ *G06F 13/4022* (2013.01); *G06F 3/0607* (2013.01); *G06F 3/0635* (2013.01);
(Continued)

(58) Field of Classification Search
CPC ............. G06F 11/2053; G06F 13/4068; G06F 11/2069; G06F 11/2017; G06F 11/2012;
(Continued)

(56) References Cited

U.S. PATENT DOCUMENTS 5,828,207 A    10/1998    Saadeh
6,061,750 A *   5/2000    Beardsley ........... G06F 11/2092
                                                                     710/10

(Continued)

OTHER PUBLICATIONS

International Application No. PCT/US2017/046602, International Search Report & Written Opinion, 8 pages, dated Oct. 19, 2017.

(Continued)

*Primary Examiner* — Jing-Yih Shyu

(57) ABSTRACT

Systems, methods, apparatuses, and software for data storage systems are provided herein. In one example, a data storage system is provided that includes storage drives each comprising a PCIe interface, and configured to store data and retrieve the data stored on associated storage media responsive to data transactions received over a switched PCIe fabric. The data storage system includes processors configured to each manage only an associated subset of the storage drives over the switched PCIe fabric. A first processor is configured to identify first data packets received over a network interface associated with the first processor within a network buffer of the first processor as comprising a storage operation associated with at least one of the plurality of storage drives managed by a second processor, and responsively transfer the first data packets into a network buffer of the second processor.

20 Claims, 20 Drawing Sheets

Related U.S. Application Data

(60) Provisional application No. 62/018,090, filed on Jun. 27, 2014, provisional application No. 62/015,990, filed on Jun. 23, 2014, provisional application No. 62/015,977, filed on Jun. 23, 2014, provisional application No. 62/015,967, filed on Jun. 23, 2014, provisional application No. 62/015,947, filed on Jun. 23, 2014, provisional application No. 62/015,942, filed on Jun. 23, 2014, provisional application No. 62/015,939, filed on Jun. 23, 2014, provisional application No. 62/015,936, filed on Jun. 23, 2014, provisional application No. 62/015,931, filed on Jun. 23, 2014, provisional application No. 62/015,927, filed on Jun. 23, 2014, provisional application No. 62/015,910, filed on Jun. 23, 2014.

(51) Int. Cl.
| | |
|---|---|
| *G06F 11/20* | (2006.01) |
| *G06F 13/42* | (2006.01) |
| *H04L 29/08* | (2006.01) |
| *H04L 29/14* | (2006.01) |
| *G06F 3/06* | (2006.01) |
| *H04L 12/24* | (2006.01) |
| *H04L 12/931* | (2013.01) |

(52) U.S. Cl.
CPC ........ *G06F 3/0685* (2013.01); *G06F 11/2007* (2013.01); *G06F 11/2012* (2013.01); *G06F 11/2017* (2013.01); *G06F 11/2053* (2013.01); *G06F 11/2069* (2013.01); *G06F 13/4068* (2013.01); *G06F 13/4234* (2013.01); *G06F 13/4282* (2013.01); *H04L 41/0893* (2013.01); *H04L 49/356* (2013.01); *H04L 67/1097* (2013.01); *H04L 69/40* (2013.01); *G06F 2201/85* (2013.01); *G06F 2213/0026* (2013.01)

(58) Field of Classification Search
CPC ............. G06F 13/4234; G06F 13/4022; G06F 13/4282; G06F 11/2007; G06F 2201/85; H04L 69/40; H04L 67/1097
See application file for complete search history.

(56) References Cited

U.S. PATENT DOCUMENTS

| | | | |
|---|---|---|---|
| 6,325,636 B1 | 12/2001 | Hipp et al. | |
| 6,687,718 B2 | 2/2004 | Gagne et al. | |
| 7,243,145 B1 | 7/2007 | Poortman | |
| 7,260,487 B2 | 8/2007 | Brey et al. | |
| 7,505,889 B2 | 3/2009 | Salmonsen et al. | |
| 7,606,960 B2 | 10/2009 | Munguia | |
| 7,725,757 B2 | 5/2010 | Padweka et al. | |
| 7,877,542 B2 | 1/2011 | Chow et al. | |
| 8,125,919 B1 | 2/2012 | Khanka et al. | |
| 8,150,800 B2 | 4/2012 | Webman et al. | |
| 8,370,567 B1 * | 2/2013 | Bonwick | G06F 3/0688 |
| | | | 711/103 |
| 8,656,117 B1 | 2/2014 | Wong et al. | |
| 8,688,926 B2 | 4/2014 | Breakstone et al. | |
| 8,880,771 B2 | 11/2014 | Subramaniyan et al. | |
| 9,602,437 B1 * | 3/2017 | Bernath | H04L 49/3054 |
| 2002/0059428 A1 * | 5/2002 | Susai | H04L 67/1008 |
| | | | 709/227 |
| 2003/0084219 A1 | 5/2003 | Yao et al. | |
| 2003/0110423 A1 | 6/2003 | Helms et al. | |
| 2003/0126478 A1 | 7/2003 | Burns et al. | |
| 2005/0223136 A1 | 10/2005 | Tanaka et al. | |
| 2006/0206655 A1 * | 9/2006 | Chappell | G06F 13/4027 |
| | | | 710/315 |
| 2006/0277206 A1 | 12/2006 | Bailey et al. | |
| 2007/0067432 A1 | 3/2007 | Tarui et al. | |
| 2008/0034153 A1 | 2/2008 | Lee et al. | |
| 2008/0198744 A1 | 8/2008 | Menth | |
| 2008/0281938 A1 | 11/2008 | Rai et al. | |
| 2009/0006837 A1 | 1/2009 | Rothman et al. | |
| 2009/0100280 A1 | 4/2009 | Lindsay | |
| 2009/0190427 A1 | 7/2009 | Brittain et al. | |
| 2009/0193201 A1 | 7/2009 | Brittain et al. | |
| 2009/0193203 A1 | 7/2009 | Brittain et al. | |
| 2009/0276551 A1 | 11/2009 | Brown et al. | |
| 2010/0088467 A1 | 4/2010 | Lee et al. | |
| 2011/0289510 A1 | 11/2011 | Lin et al. | |
| 2011/0299317 A1 | 12/2011 | Shaeffer et al. | |
| 2011/0320861 A1 * | 12/2011 | Bayer | G06F 11/2033 |
| | | | 714/5.11 |
| 2012/0030544 A1 | 2/2012 | Fisher-Jeffes | |
| 2012/0089854 A1 | 4/2012 | Breakstone et al. | |
| 2012/0113822 A1 * | 5/2012 | Letner | H04L 49/357 |
| | | | 370/250 |
| 2012/0151118 A1 | 6/2012 | Flynn et al. | |
| 2012/0166699 A1 | 6/2012 | Kumar et al. | |
| 2012/0210163 A1 | 8/2012 | Cho | |
| 2012/0317433 A1 | 12/2012 | Ellis et al. | |
| 2013/0132643 A1 | 5/2013 | Huang | |
| 2013/0185416 A1 | 7/2013 | Larkin et al. | |
| 2014/0047166 A1 | 2/2014 | Asnaashari et al. | |
| 2014/0056319 A1 | 2/2014 | Hellwig | |
| 2014/0059265 A1 | 2/2014 | Iyer et al. | |
| 2014/0075235 A1 | 3/2014 | Chandhoke et al. | |
| 2014/0103955 A1 | 4/2014 | Avritch et al. | |
| 2014/0108846 A1 | 4/2014 | Berke et al. | |
| 2014/0365714 A1 | 12/2014 | Sweere et al. | |
| 2015/0074322 A1 | 3/2015 | Galles | |
| 2015/0121115 A1 | 4/2015 | Chandra et al. | |
| 2015/0134881 A1 * | 5/2015 | Danilak | G06F 12/0246 |
| | | | 711/103 |
| 2015/0186437 A1 | 7/2015 | Molaro | |
| 2015/0212755 A1 | 7/2015 | Asnaashari | |
| 2015/0304423 A1 | 10/2015 | Satoyama et al. | |
| 2015/0373115 A1 | 12/2015 | Breakstone et al. | |
| 2016/0197996 A1 | 7/2016 | Barton et al. | |
| 2016/0248631 A1 | 8/2016 | Duchesneau | |

OTHER PUBLICATIONS

International Application No. PCT/US2017/046607, International Search Report & Written Opinion, 7 pages, dated Oct. 23, 2017.

Aragon, Juan L. et al., "Control Speculation for Energy-Efficient Next-Generation Superscalar Processors," IEEE Transactions on Computers, vol. 55, No. 3, pp. 281-291, Mar. 2006.

Lu, Yingping et al., "Performance Study of iSCSI-Based Storage Subsystems," IEEE Communications Magazine, pp. 76-82, Aug. 2003.

* cited by examiner

FRONT END TRAFFIC HANDLING IN MODULAR SWITCHED FABRIC BASED DATA STORAGE SYSTEMS

RELATED APPLICATIONS

This application is a continuation of U.S. patent application Ser. No. 14/747,450, issued as U.S. Pat. No. 9,798,636, titled "FRONT END TRAFFIC HANDLING IN MODULAR SWITCHED FABRIC BASED DATA STORAGE SYSTEMS," filed Jun. 23, 2015. This application also hereby claims the benefit of and priority to U.S. Provisional Patent Application 62/015,927, titled "INTER-MODULE REDUNDANCY FOR COMPUTE NODES," filed Jun. 23, 2014; U.S. Provisional Patent Application 62/015,931, titled "INTRA-MODULE REDUNDANCY FOR COMPUTE NODES," filed Jun. 23, 2014; U.S. Provisional Patent Application 62/015,936, titled "IDENTIFICATION OF STORAGE SLEDS," filed Jun. 23, 2014; U.S. Provisional Patent Application 62/015,939, titled "FRONT END ETHERNET LOAD BALANCING," filed Jun. 23, 2014; U.S. Provisional Patent Application 62/015,942, titled "SSD INITIALIZATION SPOOFING," filed Jun. 23, 2014; U.S. Provisional Patent Application 62/015,910, titled "CLUSTER-WIDE DEVICE VISIBILITY," filed Jun. 23, 2014; U.S. Provisional Patent Application 62/015,947, titled "TCP FAILOVER MAINTAINING CONNECTION STATE," filed Jun. 23, 2014; U.S. Provisional Patent Application 62/015,967, titled "CLUSTERING OF STORAGE NODES OVER PCIE," filed Jun. 23, 2014; U.S. Provisional Patent Application 62/015,977, titled "LOGICAL STORAGE UNIT PRESENTATION OF STORAGE NODE OVER ISCSI," filed Jun. 23, 2014; U.S. Provisional Patent Application 62/015,990, titled "NVME TARGET ABSTRACTION/EMULATION OVER A VIRTUAL LUN," filed Jun. 23, 2014; and U.S. Provisional Patent Application 62/018,090, titled "VLUN ABSTRACTION OVER PCIE PHYSICAL INTERFACE AS NVME TARGET," filed Jun. 27, 2014; which are hereby incorporated by reference in their entirety.

BACKGROUND

Computer systems typically include bulk storage systems, such as magnetic disk drives, optical storage devices, tape drives, or solid state storage drives, among other storage systems. As storage needs have increased in these computer systems, networked storage systems have been introduced which store large amounts of data in a storage environment physically separate from end user computer devices. These networked storage systems typically provide access to bulk data storage over one or more network interfaces to end users or other external systems. In addition to storage of data, remote computing systems include various processing systems that can provide remote computing resources to end users. These networked storage systems and remote computing systems can be included in high-density installations, such as rack-mounted environments.

However, as the densities of networked storage systems and remote computing systems increase, various physical limitations can be reached. These limitations include density limitations based on the underlying storage technology, such as in the example of large arrays of rotating magnetic media storage systems. These limitations can also include computing density limitations based on the various physical space requirements for network interconnect as well as the large space requirements for environmental climate control systems.

In addition to physical space limitations, these bulk storage systems have been traditionally limited in the number of devices that can be included per host, which can be problematic in storage environments where higher capacity, redundancy, and reliability is desired. These shortcomings can be especially pronounced with the increasing data storage and retrieval needs in networked, cloud, and enterprise environments.

OVERVIEW

Systems, methods, apparatuses, and software for data storage systems are provided herein. In one example, a data storage system is provided that includes storage drives each comprising a Peripheral Component Interconnect Express (PCIe) interface, and configured to store data and retrieve the data stored on associated storage media responsive to data transactions received over a switched PCIe fabric. The data storage system includes a plurality of processors configured to each manage only an associated subset of the plurality of storage drives over the switched PCIe fabric, wherein each of the processors is associated with a network interface configured to receive data packets related to the storage operations for any of the plurality of storage drives. A first processor is configured to identify first data packets received over a network interface associated with the first processor within a network buffer of the first processor as comprising a storage operation associated with at least one of the plurality of storage drives managed by a second processor, and responsively transfer the first data packets into a network buffer of the second processor.

In another example, a method of operating a data storage system is provided. The method includes, in a plurality of storage drives, storing data and retrieving the data stored on associated storage media responsive to storage operations received over a PCIe interface. In each of a plurality of processors communicatively coupled to the plurality of storage drives over a PCIe fabric, the method includes managing only an associated subset of the plurality of storage drives over the switched PCIe fabric. In a first processor, the method includes identifying first data packets received over a network interface associated with the first processor within a network buffer of the first processor as comprising a storage operation associated with at least one of the plurality of storage drives managed by a second processor, and responsively transferring the first data packets into a network buffer of the second processor.

In another example, a modular data storage system is provided. The modular data storage system includes a plurality of storage drives each comprising a PCIe interface, and configured to store data and retrieve the data stored on associated storage media responsive to storage operations received over a switched PCIe fabric. The modular data storage system includes a plurality of processing modules comprising one or more processors configured to each manage only an associated subset of the plurality of storage drives over the switched PCIe fabric, wherein each of the processors is associated with a network interface over the switched PCIe fabric configured to receive data packets related to the storage operations for any of the plurality of storage drives. A first processor is configured to identify first data packets received over a network interface associated with the first processor within a layer 2 network buffer of the first processor as comprising a storage operation associated with at least one of the plurality of storage drives managed by a second processor, and responsively transfer over the switched PCIe fabric the first data packets into a layer 2 network buffer of the second processor.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
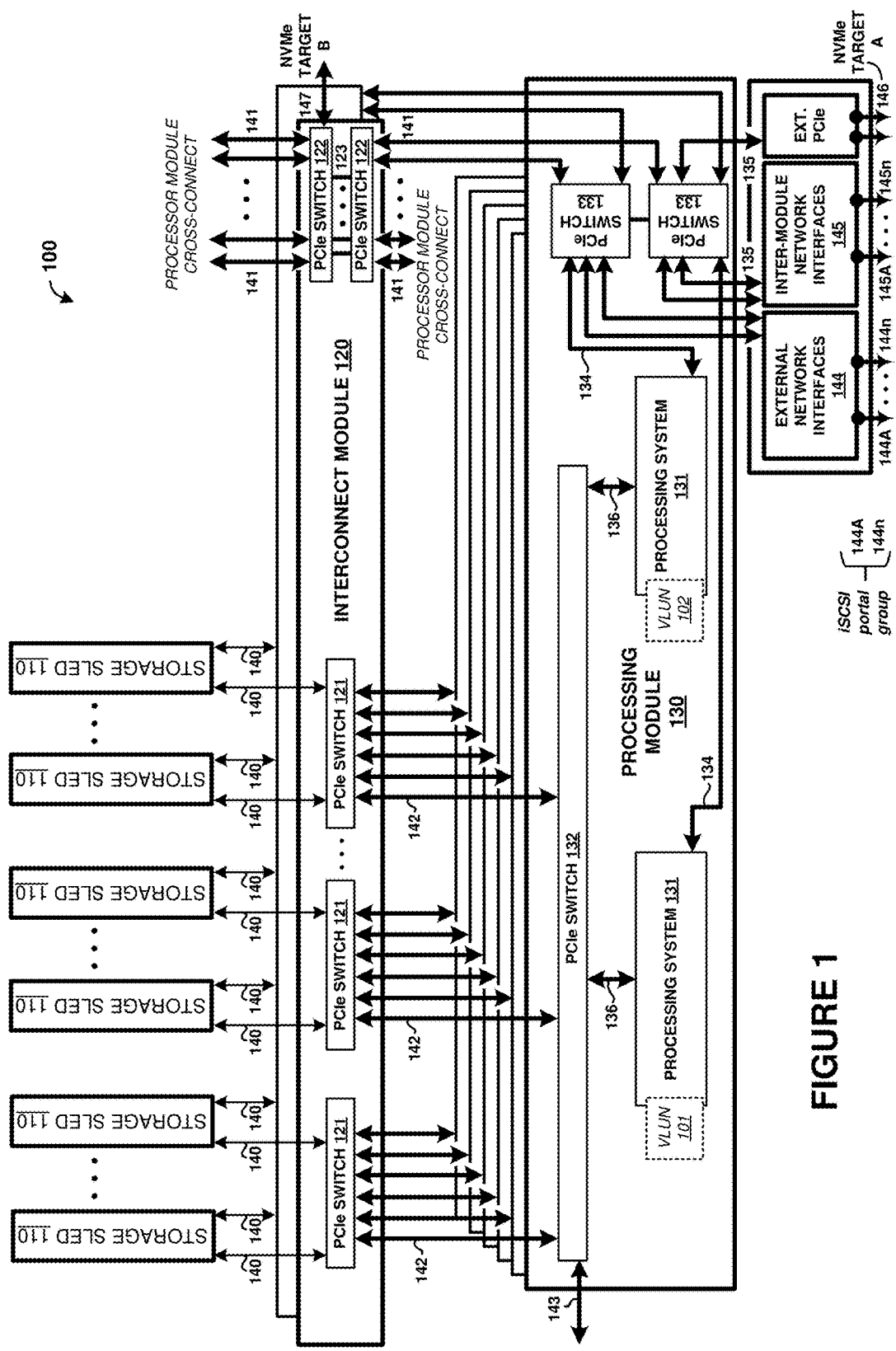
FIG. 1 is a system diagram illustrating a storage system.

FIG. 1 is a system diagram illustrating storage system 100. Storage system 100 includes three different module types in FIG. 1, namely storage sleds 110, interconnect modules 120, and processing modules 130. Although this example shows many storage sleds, 2 interconnect modules, and 6 processing modules. Any number of sleds or modules can be includes, such as 48 storage sleds or 64 storage sleds, along with a different number of interconnect or processing modules. Some examples can distribute functionality of each interconnect module 120 among two or more modules. Additionally, power supply modules and associated power and control distribution links can also be included, but are omitted in FIG. 1 for clarity.

A module typically comprises physical support structure and enclosure that includes circuitry, printed circuit boards, semiconductor systems, and structural elements. The modules are insertable and removable from a rackmount style of enclosure. In some examples, the elements of FIG. 1 are included in a 3U chassis for mounting in a larger rackmount environment. It should be understood that the elements of FIG. 1 can be included in any physical mounting environment, and need not include any associated enclosures or rackmount elements.

Holdup circuitry can be included on each sled 110 to provide power to the associated sled when input power has been lost or removed for the sled. In some examples, the sled is removed from an associated mating connector and input power is lost due to the removal. In other examples, power is lost to system 100, such as during a facility power outage or when an associated power supply fails. Similar holdup circuitry can be included on the other various modules of system 100. Specifically, holdup circuitry can be included on interconnect modules 120 and processing modules 130.

A plurality of storage sleds 110 are included in system 100. Each storage sled 110 includes one or more storage drives, such as four each shown in FIG. 3. Each storage sled 110 also includes Peripheral Component Interconnect Express (PCIe) switches, processors, and control system elements. PCIe switches of each storage sled 110 communicate with one or more on-sled storage drives over associated PCIe links. PCIe switches of each storage sled 110 also are communicatively coupled to an on-sled processor or control system for traffic statistics retrieval and status monitoring, among other operations. PCIe switches of each storage sled 110 communicate over one or more PCIe links 140 with an associated PCIe switch 121 of an interconnect module 120.

Each PCIe switch 121 of interconnect modules 120 communicate over associated PCIe links 142 with associated PCIe switch 132 of one or more processing modules 130. PCIe switch 132 communicates with one or more associated processing systems 131 over PCIe links 136 as well as over one or more cross-connect PCIe links 143. Interconnect modules 120 also each include a plurality of PCIe switches 122 for interconnecting processor modules, such as processor modules 130. PCIe switches 122 and PCIe links 123 are included for processor module cross-connect, and communicate with ones of PCIe switches 133 in associated processing modules 130 over processor module cross-connect links 141. PCIe switches 133 communicate with ones of processing systems 131 over PCIe links 134.

Each processing module 130 communicates over one or more PCIe links 135 through PCIe switches 133 with external expansion cards or external PCIe ports. In some examples, the external expansion cards include network interface cards for communicating over TCP/IP (Transmission Control Protocol (TCP)/Internet Protocol) networks or for carrying iSCSI (Internet Small Computer System Interface), Non-Volatile Memory Host Controller Interface Specification (NVMHCI) traffic (i.e. Non-Volatile Memory Express (NVMe)) traffic, among other network traffic types. These packet links are illustrated by external network interfaces 144, which include one or more packet network links 144A-144n. External access to storage system 100 is provided over ones of packet network links 144A-144n, such as for end user access to data stored on storage sleds 110.

Each processing module 130 can also communicate with other processing modules, such as those in other storage assemblies or 3U enclosures, over one or more inter-module packet network interfaces 145, which include one or more links 145A-145n. In some examples, inter-module packet network interfaces 145 include network interface cards for communicating over Ethernet or TCP/IP (Transmission Control Protocol (TCP)/Internet Protocol) networks for exchanging storage packets between processing modules. Further operation of inter-module storage packet exchange over Ethernet is discussed in the examples herein.

In some examples, external expansion cards comprising external PCIe connectors include one or more external PCIe interfaces for carrying NVMe traffic. These PCIe links are illustrated by links 146. External access to storage system 100 is provided over ones of PCIe links 146 and 147, such as for end user access to data stored on storage sleds 110. Storage system 100 is accessible by an external system, such as a server or computer system, over one or more PCIe interfaces. These PCIe interfaces are represented in FIG. 1 by PCIe link 146 and PCIe link 147. Further external PCIe links can be included, and two are shown in FIG. 1 for clarity. PCIe link 147 includes a PCIe link provided by PCIe switch 122 on interconnect module 120. PCIe link 146 includes a PCIe link provided by an expansion card that interfaces with processing module 130 over PCIe switch 133. PCIe links 146 and 147 can include external PCIe connectors and cabling, such as employed in PCIe direct connect.

The PCIe switches discussed herein can comprise PCIe crosspoint switches, which logically interconnect various ones of the associated PCIe links based at least on the traffic carried by each PCIe link. In some examples, logical segregation of the PCIe fabric is achieved using non-transparent ports of the PCIe switches. Selected PCIe switch ports can be configured as non-transparent (NT) or transparent ports. An NT port can allow some logical isolation between endpoints, much like a bridge, while a transparent port does not allow logical isolation, and has the effect of connecting endpoints in a purely switched configuration. Access over an NT port or ports can include additional handshaking between the PCIe switch and the initiating endpoint to select a particular NT port or to allow visibility through the NT port.

In other examples, logical segregation of the PCIe fabric is achieved using domain-based routing of the PCIe switches. A domain-based PCIe signaling distribution can be included in the PCIe switches which allows segregation of PCIe ports of a PCIe switch according to user-defined groups. These logical segregation or groups can be used to form the front-end and back-end data planes discussed herein, or can be used for establishing routing and redundancy among the various PCIe switches, forming a mesh fabric of PCIe traffic in system 100.

In FIG. 1, PCIe switches 121 and 132 (and associated PCIe links) are included in a back end data plane of system 100, and used for carrying storage operations and storage data between storage sleds 110 and processing modules 130. PCIe switches 122 and 133 (and associated PCIe links) are included in a front end data plane of system 100, and used for carrying storage operations and storage data, as well as user control data and control signaling between processing modules. In some examples, one or more Ethernet interfaces and associated links comprise a control plane of system 100, such as over interfaces 145 as well as other Ethernet interfaces, such as shown for Ethernet links 447-448 of FIG. 4 below. The control plane can be used for control signaling between processing modules, management messaging, initialization messaging, statistical data monitoring and gathering from control processors, such as processor 450 of FIG. 4, among other control data and information.

In an alternative arrangement of system 100, which can be applied to the examples in further figures herein, a unified PCIe fabric is employed which does not physically distinguish among front-end data plane and back-end data planes. Instead, a common set of PCIe switches are employed which can route PCIe traffic among various destinations based on factors such as PCIe addressing, logic domains that are established, sideband PCIe messaging, or other techniques. In logical domain examples, a PCIe switch can be dynamically programmed by any processing system 131 or control processor. This programming can be done over a discrete control interface or link, or via specialized PCIe commands or sideband PCIe messaging, to segregate the PCIe links of the PCIe switch into various logical groups. However, in many of the examples herein, separate front end and back end data planes formed by separate PCIe fabrics are employed. It should be understood that either configuration is possible, such as unified data planes and unified PCIe fabrics, and the examples herein do not limit the configuration to one particular configuration of PCIe fabric.

PCIe can support multiple bus widths, such as ×1, ×4, ×8, ×16, and ×32, with each multiple of bus width comprising an additional "lane" for data transfer. PCIe also supports transfer of sideband signaling, such as System Management Bus (SMBus) interfaces and Joint Test Action Group (JTAG) interfaces, as well as associated clocks, power, and bootstrapping, among other signaling. Although PCIe is used in FIG. 1, it should be understood that different communication links or busses can instead be employed, such as Ethernet, Serial Attached SCSI (SAS), NVMe, FibreChannel, Thunderbolt, Serial Attached ATA Express (SATA Express), among other interconnect, network, and link interfaces. Any of the links in FIG. 1 can each use various communication media, such as air, space, metal, optical fiber, or some other signal propagation path, including combinations thereof. Any of the links in FIG. 1 can include any number of PCIe links or lane configurations. Any of the links in FIG. 1 can each be a direct link or might include various equipment, intermediate components, systems, and networks. Any of the links in FIG. 1 can each be a common link, shared link, aggregated link, or may be comprised of discrete, separate links.

In FIG. 1, any processing system 131 on any processing module 130 has logical visibility to all storage drives in all storage sleds 110. Any processing system 131 can transfer data for storage on any storage drive and retrieve data already stored on any storage drive. Thus, 'm' number of storage drives can be coupled with 'n' number of processors to allow for a large, scalable architecture with a high-level of redundancy and density.

To provide visibility of each processing system 131 to any storage sled 110, various techniques can be employed. In a first example, a particular processing system 131 manages (instantiates/binds) a subset number of the total quantity of storage sleds, such as 16 storage drives spanning 4 storage sleds, and handles transactions for that subset of storage drives, such as read and write transactions. Each processing system 131, however, has memory-mapped visibility to the storage drives managed by any other processing system 131. When a transaction is desired for a storage drive not managed by a particular processing system, the particular processing system uses the memory mapped access to all storage drives for that transaction. The transaction can be transferred and transitioned to the appropriate processing system that manages that storage drive associated with the data of the transaction. The front end data plane, namely PCIe switches 122 and 133 are used to transfer data between processing systems so that a particular processing system or processor can store the data in the storage sled or sleds that is managed by that particular processing system, even though the data might be received over a network interface associated with a different processing system.

In an example, the PCIe interfaces associated with each processing system 131 have 64-bit address spaces, which allows an addressable space of $2^{64}$ bytes, leading to at least 16 exbibytes of byte-addressable memory. The 64-bit PCIe address space can shared by all processing systems 131 for memory mapping to storage drives on storage sleds. Thus, while each particular processing system 131 actually manages a subset of the total storage drives on storage sleds, all processors 131 have visibility to, and can initiate read/write transactions to, any of storage drives on storage sleds. A managing processing system 131 that manages a particular storage drives on storage sleds receives write/read transactions and any associated data from an initiating processing system 131 by at least using the memory mapped PCIe address space.

In operation, such as a write operation, data can be received over any of network interfaces 144 by any processing system 131 of any processing module 130. For example, the write operation can be a write operation received over any of network interfaces 144 from an end user employing an iSCSI protocol or NVMe protocol. The processing system that receives the write operation determines if it physically manages the storage drive or drives associated with the write operation, and if it does, then the processing system transfers the data for storage on the associated storage drives over back end data plane PCIe links 136. If the processing system determines that it does not physically manage the storage drive or drives associated with the write operation, then the processing system transfers the write operation to another processing sled that includes the processing system that does manages the storage drive or drives over cross connect links 134. Data striping can be employed by any processing system to stripe data for a particular write transaction over any number of storage drives, such as over all of the storage sleds that include storage drives managed by the particular processing system.

NVMe (NVM Express) is an interface standard for mass storage devices, such as hard disk drives and solid state memory devices. NVMe can supplant serial ATA (SATA) interfaces for interfacing with mass storage devices in personal computers and server environments. However, these NVMe interfaces are limited to one-to-one host-drive relationship, similar to SATA devices. In the examples discussed herein, a PCIe interface is employed to transport NVMe traffic and present a multi-processor, multi-drive system as one or more NVMe virtual logical unit numbers (VLUNs) over a PCIe interface.

In NVMe operations, such as an NVMe write operation, data can be received over any of PCIe links 141-143 and 146-147 by any processing system 131 of any processing module 130. For example, the write operation can be an NVMe write operation received over PCIe link 143 from a device employing an NVMe protocol transported over a PCIe interface. In another example, the write operation can be an NVMe write operation received over PCIe link 146 or 147 from an external device employing an NVMe protocol transported over a PCIe interface. The processing system that receives the write operation determines if it manages the storage drive or drives associated with the write operation, and if it does, then the processing system transfers the data for storage on the associated storage drives over PCIe links 142. If the processing system determines that it does not physically manage the storage drive or drives associated with the write operation, then the processing system transfers the write operation to another processing sled that includes the processing system that does manages the storage drive or drives over cross connect links 134. Data striping can be employed by any processing system to stripe data for a particular write transaction over any number of storage drives, such as over all of the storage sleds that include storage drives managed by the particular processing system.

Any of processing systems 131 can present the storage resources of storage system 100 as a VLUN, such as NVMe VLUNs. In the example of FIG. 1, a first VLUN is presented as VLUN 101 and a second VLUN is presented as VLUN 102. Although these VLUNs are shown associated with different processing systems on a single processing module 130, in other examples a VLUN is presented by any processing system on any processing module and can storage traffic for the VLUN can be handled by any processing system on any processing module. The processing modules of system 100 can present any number of VLUNs to an external system over a PCIe interface, such as any of PCIe links 146-147. These VLUNs can be presented as an NVMe target, such as NVMe target A or NVMe target B in FIG. 1. An NVMe target can present the storage resources of storage system 100 as a single storage target, such as emulating a single storage drive, over a PCIe interface. In this manner, a plurality of storage drives that comprise any number of storage sleds 110 can be presented as a single NVMe target to an external system over a PCIe interface. Any of the processing systems of system 100 can receive NVMe storage traffic, such as NVMe frames, and distribute these storage transactions for handling by an assigned processing system within system 100.

Figure 8:
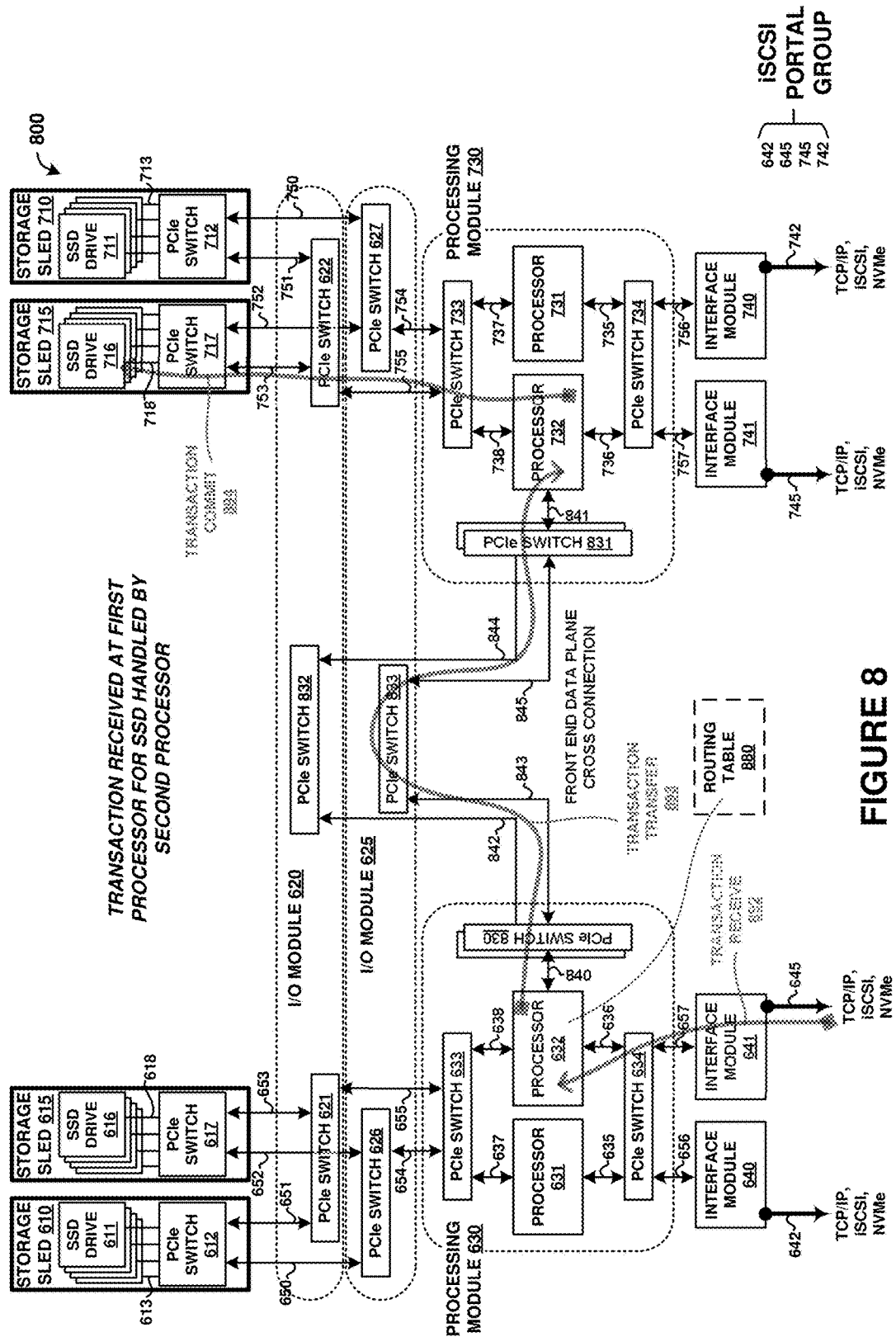
FIG. 8 is a system diagram illustrating a storage system.
Figure 12:
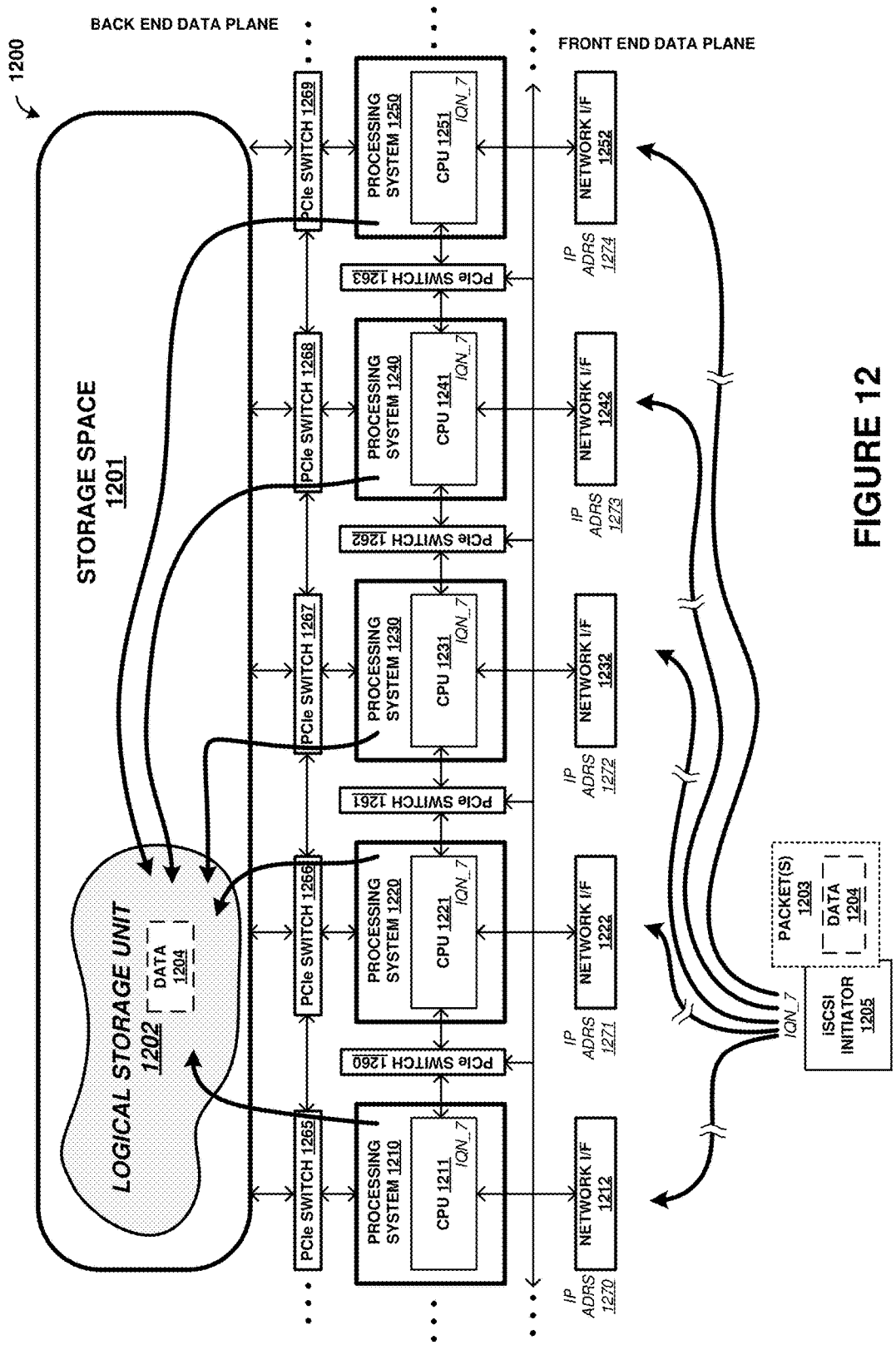
FIG. 12 is a system diagram illustrating a storage system.

Some network storage protocols, such as iSCSI, allow for grouping of destination addresses into a logical unit. For example, iSCSI allows for portal groups which can associate more than one IP address with a single target. The target is a particular processor or particular network interface, even if that interface or processor has more than one network address associated therewith. However, FIG. 1 as well as FIGS. 8 and 12 illustrate forming a logical grouping of destination addresses for a network storage protocol using a plurality of processors or processing nodes that share a common storage space spread over a plurality of storage devices. Many processors can be included in a portal group, with each processor configured to receive network storage traffic for any of the other processors and route the traffic accordingly to the correct processor, even though a single iSCSI portal group is presented to an iSCSI initiator. In specific examples, a PCIe fabric is employed between many processors, network interfaces, and storage drives. These concepts can apply to network storage protocols other than iSCSI.

In FIG. 1, more than one network interface is employed. Specifically, network interfaces 144 or 145 can be coupled to the plurality of processing modules 130 shown in FIG. 1. Each network interface can have one or more IP addresses associated therewith, and can be reachable over a packet network using the associated IP addresses. The various network interfaces of system 100 can be formed into an iSCSI portal group, which allows an iSCSI initiator to transfer network storage transactions, such as iSCSI transactions, over a packet network to any of network interfaces 144 or 145. As a specific example, FIG. 1 shows an iSCSI portal group being formed from external network links 144A-144n. This portal group can be presented to network devices over network links 144A-144n, and the portal group can span the resources of system 100, such as one or more processing systems 131, one or more processing module 130, and one or more of storage sleds 110, among other elements. Further discussions on iSCSI portal groups are discussed in FIGS. 8 and 12.

Figure 2:
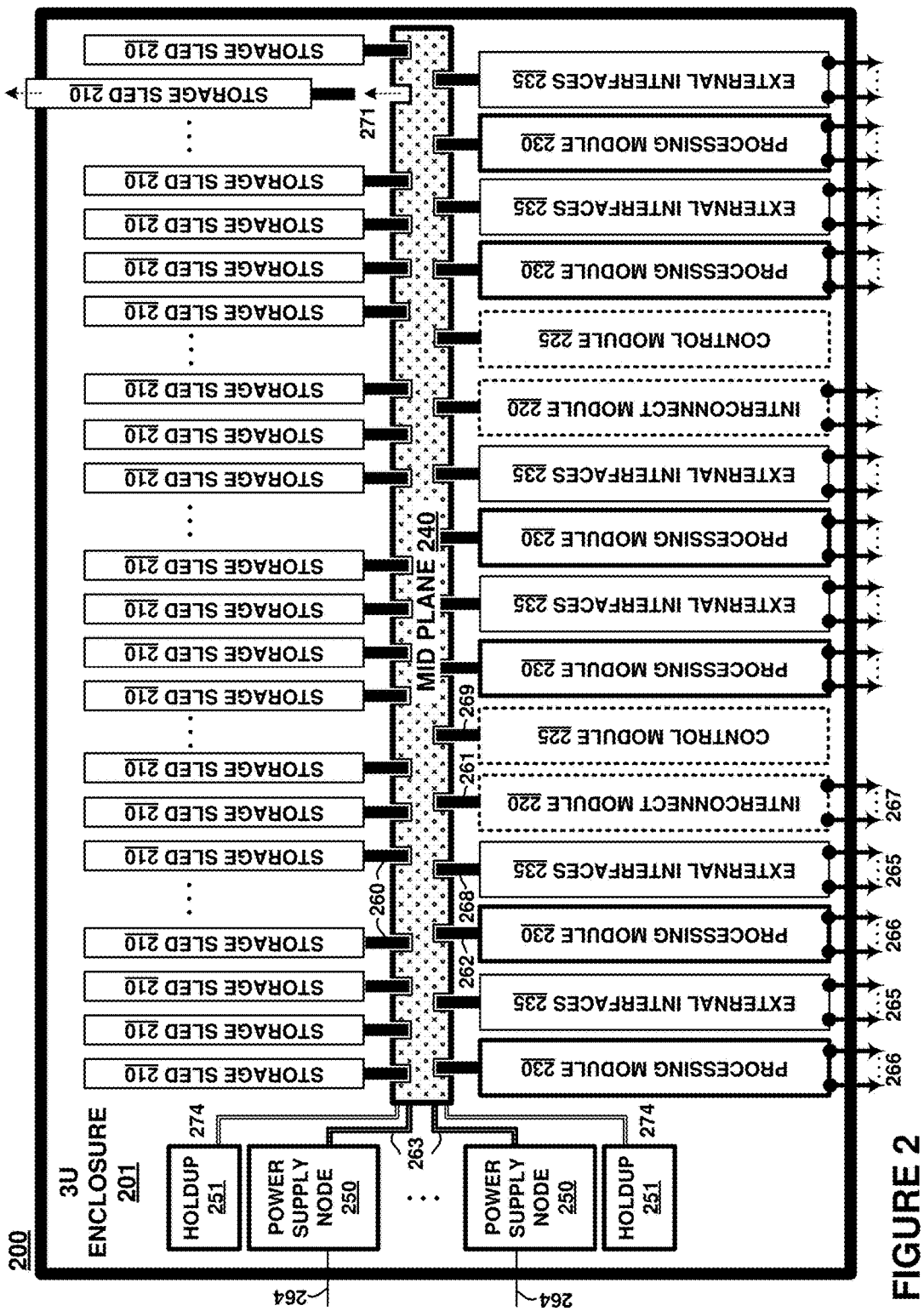
FIG. 2 is a block diagram illustrating a storage system.

To show an example physical configuration of a storage system, such as system 100, FIG. 2 is presented. FIG. 2 is a block diagram illustrating storage system 200. The elements of FIG. 2 are shown as enclosed by enclosure 201 and physically mated to midplane 240. Midplane 240 includes a chassis and a plurality of physical connectors for mating with any associated storage sleds 210, interconnect modules 220, processing modules 230, or external interfaces 235. Midplane 240 comprises one or more printed circuit boards, connectors, physical support members, chassis elements, structural elements, and associated links as metallic traces or optical links for interconnecting the various elements of FIG. 2. Midplane 240 can function as a backplane, but instead of having sleds or modules mate on only one side as in backplane examples, midplane 240 has sleds or modules that mate on at least two sides. Elements of FIG. 2 can correspond to similar elements of FIG. 1, such as storage sled 110, interconnect module 120, processing module 130, and the expansion/external interfaces 144-146, although variations are possible.

FIG. 2 shows all elements included in a 3U enclosure 201. The enclosure can instead be of any multiple of a standardized computer rack height, such as 1U, 2U, 3U, 4U, and the like, and can include associated chassis, physical supports, cooling systems, mounting features, cases, and other enclosure elements. Typically, each sled or module will fit into associated groove features included in a chassis portion of enclosure 201 to slide into a predetermined slot and guide an edge connector associated with each sled to mate with an associated socket connector on midplane 240. Storage sleds 210 each have an associated connector 260. Interconnect modules 220 each have an associated connector 261. Interconnect modules 220 also each have one or more cluster interconnect links 267, which in this example are PCIe links. Cluster interconnect links 267 are employed to interconnect 3U enclosures between each other using PCIe links. Control modules 225 each have an associated connector 269. In some examples, ones of control modules 225 and interconnect modules 220 are included in the same module. Processing modules 230 each have an associated connector 262. Processing modules 230 each have one or more associated external links 266 for communicating with external systems, such as management systems, end user devices, or other computing systems, including other enclosures similar to enclosure 201. External links 266 can comprise Ethernet, SFP+, or other links and connectors. External interfaces module 235 each have an associated connector 268. External interfaces 235 provide external access to the storage contents of enclosure 201, such as for end user devices or external systems. Network links 265 can be provided by external interfaces 235, which can comprises Ethernet, TCP/IP, Infiniband, iSCSI, NVMe, or other external interfaces. In operation, external interfaces 235 each is communicatively coupled with an associated processing module, as pictured in FIG. 2. Enclosure 201 enables hot-swapping of any of the sleds and can include other features such as power lights, activity indicators, external administration interfaces, and the like.

In some examples, enclosure 201 includes a chassis and midplane that can accommodate a flexible configuration and arrangement of sleds and associated circuit cards. Although FIG. 2 illustrates storage sleds mating on one side of midplane 240 and various modules mating on another side of midplane 240, it should be understood that other configurations are possible. Enclosure 201 can include a chassis to accommodate any of the following configurations, either in front-loaded or rear-loaded configurations:

one or more sleds that contain four M.2 SSDs each
one or more sleds containing 2×HHHL cards (half-height half-length PCIe cards) that can comprise PCIe storage cards, PCIe network adaptors, or host bus adaptors
one or more sleds with 2×FHHL cards (full-height half-length PCIe cards) that can comprise graphics cards or graphics processing units (GPUs)
one or more sleds with 1×PCIe cards (full-height full-length PCIe cards) that comprise processing modules, which can comprise NVIDIA Tesla or Intel Phi processor cards
one or more sleds containing 4× 2.5-inch PCIe SSDs
interconnect modules, interposer modules, and control modules Additionally, power and associated power control signaling for the various sleds of enclosure 201 is provided by one or more power supply nodes 250 over associated links 263. Although power supply nodes 250 are shown as included in enclosure 201 in FIG. 2, it should be understood that power supply nodes 250 can instead be included in separate enclosures, such as separate 1U enclosures. Each power supply node 250 also includes power link 264 for receiving power from power sources, such as AC or DC input power. Additionally, power holdup circuitry can be included in holdup modules 251 which can deliver holdup power over links 274 responsive to power loss over link 264 or from a failure of power supply nodes 250.

Power holdup circuitry can be included on each sled or module of FIGS. 1 and 2. This power holdup circuitry can be used to provide interim power to the associated sled or module during power interruptions, such as when main input or system power is lost from a power source. Additionally, during use of holdup power, processing portions of each sled or module can be employed to selectively power down portions of each sled according to usage statistics, among other considerations. This holdup circuitry can provide enough power to commit in-flight write data during power interruptions or power loss events. These power interruption and power loss events can include loss of power from a power source, or can include removal of a sled or module from an associated socket or connector on midplane 240. The holdup circuitry can include capacitor arrays, super-capacitors, ultra-capacitors, batteries, fuel cells, flywheels, or other energy storage components, along with any associated power control, conversion, regulation, and monitoring circuitry.

Storage sleds 210 or any of the insertable modules in FIG. 2 can each provide self-power during power interruption events. Also, storage sleds 210 can each redistribute power to other storage sleds or modules. This redistributed power can be transferred to other storage sleds 210 or to other modules in FIG. 2, such as interconnect module 220, control module 225, processing module 230, or external interfaces 235. Once any in-flight write data has been committed to non-volatile memory of a storage sled, then excess or remaining holdup power can be redistributed to other modules. In a first example power is lost to 3U enclosure 201, such as loss of input power over links 264 or failure of power supplies 250, among other failures or loss. In this example, storage sleds 210 can self-power for a period of time or redistribute power to other modules or sleds. In an example operation, one storage sled 210 transfers holdup power to another of storage sleds 210, such as over power links of the associated modules. In another example operation, storage sled 210 transfers power to a processing module or interconnect module, among others. This redistribution of power from storage sleds or other modules for use by other storage sleds or other modules can occur over a shared power link or power bus included in midplane 240. Directional control of power flow can be provided by circuitry in each module or sled which allows the associated module to receive input power or to redistribute power over the same power link.

In another example operation 271, a storage sled is removed from midplane 240 and thus has any input power lost due to physical removal. The removed storage sled can detect removal, such as by using pull-up or pull-down resistors, detection pins, link capacitance or impedance detection, or detection of loss of input power, among other detection methods. If in-flight write data has not yet been committed during loss of power, then associated holdup circuitry can power the removed storage sled. In sled removal examples, redistribution of power to other sleds or modules is not likely due to removal and thus remaining holdup power not redistributed to other sleds or modules. Instead, excess or remaining holdup power can be bled off to an associated power sink. This power sink can include a bleed resistor or resistor array which converts the excess holdup power to heat. In other examples, one or more indicator lights can be included in bleed-off circuitry and the indicator lights can remain lit during a bleed off procedure to indicate power remains on the sled as well as to bleed power by powering the indicator lights. Once the sled is reinserted into midplane 240, input power is restored and the sled can receive power from midplane 240 as well as charge any holdup circuitry for the next power loss event.

Figure 3:
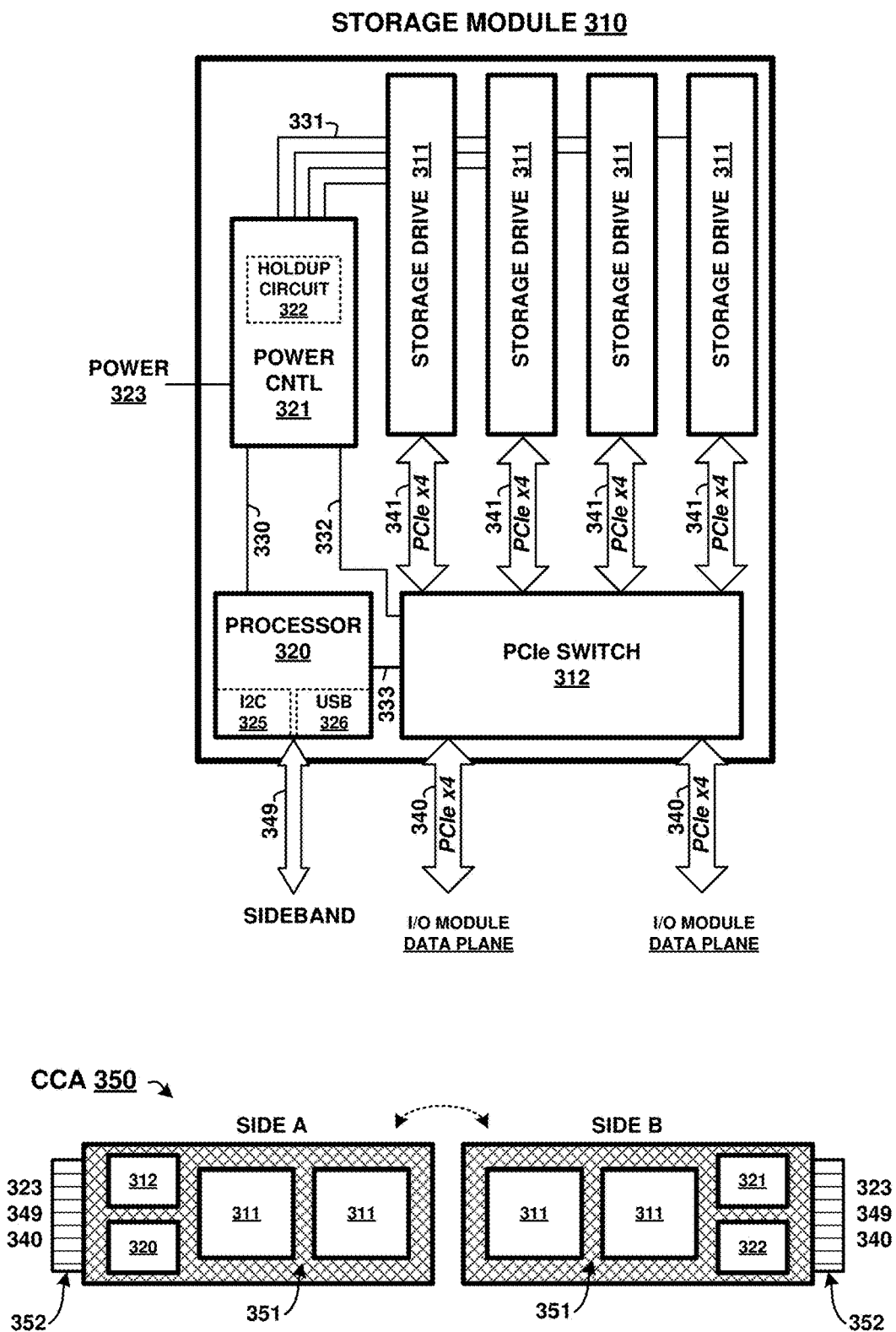
FIG. 3 is a block diagram illustrating a storage module.

FIG. 3 illustrates a block diagram of storage module 310, as an example of any of storage sleds 110 of FIG. 1 or storage sleds 210 of FIG. 2. FIG. 3 also illustrates an example physical configuration of storage module 310 as shown for circuit card assembly 350. Storage module 310 includes four storage drives 311, PCIe switch 312, processor 320, power control module 321, and holdup circuit 322. Power control module 321 distributes power to each element of storage module 310 over associated power links 330-332. Power control module 321 can selectively enable/disable power for each power link. Further communication links can be included for intra-sled communication between the various elements of storage module 310.

PCIe switch 312 communicates with an interconnect module (not pictured) over links 340. Links 340 are included in a back end data plane for transferring user data, such as that discussed for FIG. 1. Each of links 340 comprises a PCIe link with four lanes, namely a "×4" PCIe link. More than one PCIe link 340 is provided for load balancing, redundancy, and failover protection for storage module 310. In some examples, PCIe switch 312 has links 340 connected to non-transparent (NT) interfaces or ports, where one or more host systems (such as a processor on a processing module) can interact with storage drives 311 in a redundant or failover configuration. PCIe switch 312 also communicates with four storage drives 311 over associated ×4 PCIe links 341.

Processor 320 communicates over at least sideband links 349. Sideband links 349 can include Universal Serial Bus (USB), SMBus, JTAG, Inter-Integrated Circuit (I2C), controller area network bus (CAN), or any other communication interface, and in some examples is provided over portions of PCIe links 340. In this example, processor 320 includes I2C interface 325 and USB interface 326 for communication over sideband links 349. I2C interface 325 and USB interface 326 can be included in separate circuitry or included in similar elements as processor 320. Processor 320 and PCIe switch 312 can communicate over an associated communication link 333, which can be an I2C or a PCIe link, among other link types.

Each storage drive 311 comprises a solid state drive (SSD) in this example, and communicates with external systems over an associated PCIe interface included in each storage drive 311. The solid state storage media of storage drives 311 can comprise flash memory, static RAM, NAND flash memory, NOR flash memory, memristors, or other solid state media. Instead of or in addition to solid state media, each storage drive 311 can comprise magnetic storage, such as hard disk drives, tape drives, magnetoresistive memory devices, and the like, or can comprise optical storage, such as phase change memory. Each storage drive 311 can receive read transactions and write transactions issued by a host system, such as a processor of a processing sled node. Responsive to a read transaction, storage drive 311 can retrieve data identified by the read transaction and transfer the data for delivery to the associated host. Responsive to a write transaction, storage drive 311 can write data that accompanies the write transaction to storage media associated with storage drive 311.

In some examples, each storage drive 311 comprises a circuit card assembly (CCA) which is separate from CCA 350 and with a mini-PCI Express connector 352 or other connector that interfaces with a connector on CCA 350. CCA 350 comprises one or more printed circuit boards 351 that couple to the various elements of storage module 310. In other examples, each storage drive 311 comprises one or more flash memory chips with a PCIe interface which is soldered onto CCA 350. In yet other examples, each storage drive 311 comprises one or more separate solid state disk drives or magnetic hard disk drives along with associated enclosures and circuitry. PCIe switch 312 comprises a PCIe cross connect switch for establishing switched connections between any PCIe interfaces handled by PCIe switch 312. In some examples, PCIe switch 312 comprises a PLX Technology PEX8725 10-port, 24 lane PCIe switch chip.

Processor 320 comprises one or more microprocessors, processing devices, multi-core processors, processing circuitry, or other processing system. Processor 320 can include one or more non-transitory memory devices, such as RAM, solid state storage, or other memory to store instructions that are executable by processor 320 to operate as discussed herein. In some examples, processor 320 comprises an ARM microcontroller, ARM microprocessor, field-programmable gate array (FPGA), application specific integrated circuit (ASIC), application specific processor, or other microprocessor or processing elements. Processor 320 can comprise any processing elements discussed below for processing system 510 of FIG. 5. Processor 320 can monitor usage statistics, traffic status, or other usage information through link 333. PCIe switch 312 can track this usage information during normal operation and data transfer with storage drives 311, and processor 320 can retrieve this usage information as needed over link 333.

Power control module 321 includes circuitry to selectively provide power to any of the elements of storage module 310. Power control module 321 can receive control instructions from processor 320 or over any of PCIe links 340. In some examples, power control module 321 comprises processing elements discussed above for processor 320, or is included in the elements of processor 320. Power control module 321 can receive power over power link 323 as a power source for the various elements of storage module 310. Holdup circuit 322 includes energy storage devices for storing power received over power link 323 for use during power interruption events, such as loss of source power. Holdup circuit 322 can include capacitance storage devices, such as an array of capacitors. Power can be accepted by storage module 310 when input power is available, such as from a mating connector or midplane. Power can be redistributed to other modules by storage module 310 over power link 323 when input power is not available, such as during power interruption events. When storage module 310 is removed from a mating connector, then power can be bled off into associated power sink circuitry. Although one power link 323 is shown, it should be understood that more than one link can be included, such as separate input and output links or separate links for different voltage levels.

Figure 4:
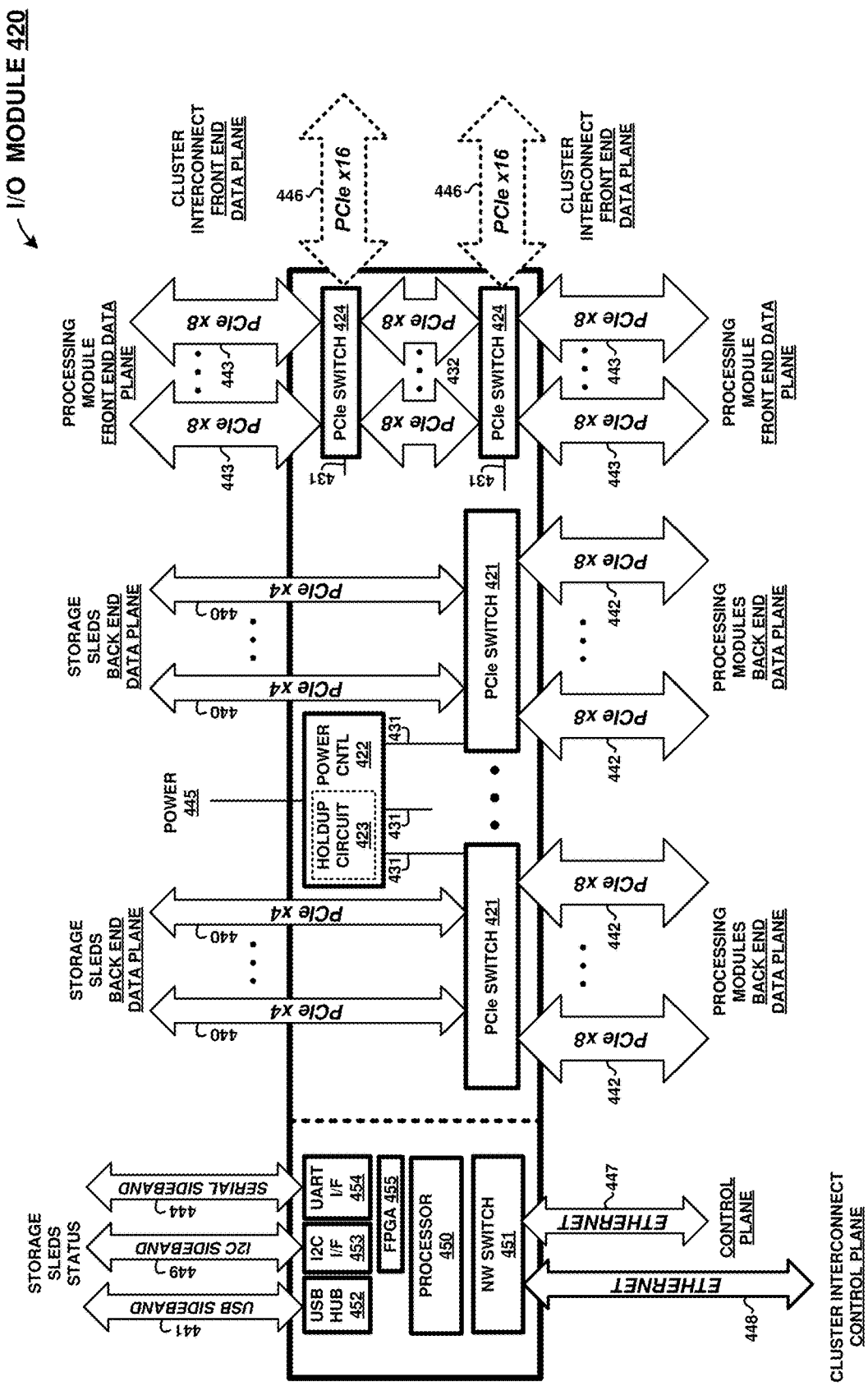
FIG. 4 is a block diagram illustrating control modules.

FIG. 4 is a block diagram illustrating input/output (I/O) module 420 as examples of interconnect module 120 of FIG. 1 or interconnection module 220 and control module 235 of FIG. 2. It should be understood that the elements of module 420 can be combined onto a single module, such as shown in FIG. 1, or included in separate modules.

I/O module 420 includes at least two back end data plane PCIe switches 421, at least two front end data plane PCIe switches 424, power control module 422, and holdup circuit 423. Power control module 422 distributes power to each element of I/O module 420 over associated power links 431. Power control module 422 can selectively enable/disable power for each power link. Further communication links can be included for intra-sled communication between the various elements of I/O module 420.

PCIe switches 421, PCIe links 440, and PCIe links 442 are included in a back end data plane, or back end, of a storage system, such as that illustrated in FIG. 1. Each PCIe switch 421 communicates with two or more storage sleds (not pictured) over PCIe links 440, and with two or more processing modules (not pictured) over PCIe links 442. Each of links 440 comprises a PCIe link with four lanes, namely a "×4" PCIe link. Each of links 442 comprises a PCIe link with eight lanes, namely a "×8" PCIe link. In some examples, each PCIe switch 421 communicates with six processing modules, such as shown in FIG. 1. Each PCIe link can also include sideband signaling, such as SMBus, JTAG, I2C, CAN, or any other communication interface, and in some examples is provided over separate links. Each PCIe switch 421 comprises a PCIe cross connect switch for establishing switched connections between any PCIe interfaces handled by each PCIe switch 421. In some examples, each PCIe switch 421 comprises a PLX Technology PEX8796 24-port, 96 lane PCIe switch chip.

PCIe switches 424 and PCIe links 443 are included in a front end data plane, or front end, of a storage system, such as that illustrated in FIG. 1. Each PCIe switch 424 communicates with many processing modules over PCIe links 443, and with each other over PCIe links 432. Each of links 443 and 432 comprises a PCIe link with eight lanes, namely a "×8" PCIe link. In some examples, each PCIe switch 424 communicates with six processing modules, such as shown in FIG. 1. Each PCIe link can also include sideband signaling, such as SMBus, JTAG, I2C, CAN, or any other communication interface, and in some examples is provided over separate links. Each PCIe switch 424 comprises a PCIe cross connect switch for establishing switched connections between any PCIe interfaces handled by each PCIe switch 424. In some examples, each PCIe switch 424 comprises a PLX Technology PEX8796 24-port, 96 lane PCIe switch chip.

Power control module 422 includes circuitry to selectively provide power to any of the elements of I/O module 420. Power control module 422 can receive control instructions from a processing module over any of PCIe links 442. In some examples, power control module 422 comprises processing elements discussed above for processor 320 of FIG. 3. Power control module 422 can receive power over power link 445 as a power source for the various elements of I/O module 420. Holdup circuit 423 includes energy storage devices for storing power received over power link 445 for use during power interruption events, such as loss of source power. Holdup circuit 423 can include capacitance storage devices, such as an array of capacitors. Further discussion of examples of power control circuitry is found below.

Power can be accepted by module 420 when input power is available, such as from a mating connector or midplane. Power can be redistributed to other modules by module 420 over link 445 when input power is not available, such as during power interruption events. When module 420 is removed from a mating connector, then power can be bled off into associated power sink circuitry. Although one power link 445 is shown, it should be understood that more than one link can be included, such as separate input and output links or separate links for different voltage levels. Also, although only module 420 shows power control circuitry and holdup circuitry in FIG. 4, similar circuitry and power links can be included in other control or interposer modules when module 420 is comprised of separate modules.

I/O module 420 includes processor 450, network switch 451, USB hub 452, I2C interface 453, and universal asynchronous receiver/transmitter (UART) interface 454. Network switch 451 can include one or more Ethernet switches, including transceivers, transformers, isolation circuitry, buffers, and the like. USB hub 452 includes USB hub circuitry for fanning out a single host USB connection to many device USB links, and can include transceivers, processors, transformers, isolation circuitry, buffers, and the like.

Processor 450 includes one or more microprocessors or microcontrollers along with any associated storage memory. Processor 450 communicates with processing modules over Ethernet control plane links 447 and 448. Processor 450 communicates with data storage sleds over sideband links 441, 444, and 449 which can comprise USB links, I2C links, or serial links, among others. An interworking or interposing module can facilitate communication by processor 450 over any of the sideband links, such as though FPGA 455. FPGA 455 provides protocol translation between an interface of processor 450, such as Serial Peripheral Interfaces (SPI), and the various serial sideband interfaces. For example, FPGA 455 can convert communications received over an SPI interface from processor 450 to communications of I2C interface 453 or communications of UART interface 454. Likewise, FPGA 455 can convert communications received over the sideband interfaces and transfer over an interface to processor 450. FPGA 455 can handle fan-out and replication of various interface for communications to interface with more than one storage sled over the associated sideband interfaces.

Processor 450 initializes data storage sleds, such as discussed above for FIG. 1. Processor 450 accumulates statistical data and usage information for each storage sled in a storage system. Processing modules can retrieve this statistical data or usage information over Ethernet link 447 via network switch 451 from processing modules or over sideband links from data storage sleds. Ethernet link 447 comprises a control plane, which can be used for transferring control information and status information between processing modules. I/O module 420 also provides expansion of the control plane to other 3U enclosures for cluster control plane interconnect over Ethernet link 448. A further example of processor 450 can be seen in control processor 1800 in FIG. 18.

PCIe switches 424 each include cluster interconnect interfaces 446 which are employed to interconnect further I/O modules of other storage systems in further enclosures, such as in other 3U enclosures seen in FIG. 2. Interfaces 446 comprise PCIe links with 16 lanes, namely "×16" PCIe links. Cluster interconnect provides PCIe interconnect between external systems, such as other storage systems, over associated external connectors and external cabling. These connections can be PCIe links provided by any of the include PCIe switches, among other PCIe switches not shown, for interconnecting other I/O modules of other storage systems via PCIe links. The PCIe links used for cluster interconnect can terminate at external connectors. These connections can instead be PCIe links provided by any of the included PCIe switches, among other PCIe switches not shown, for interconnecting other interconnect modules of other storage systems via PCIe links.

Figure 16:
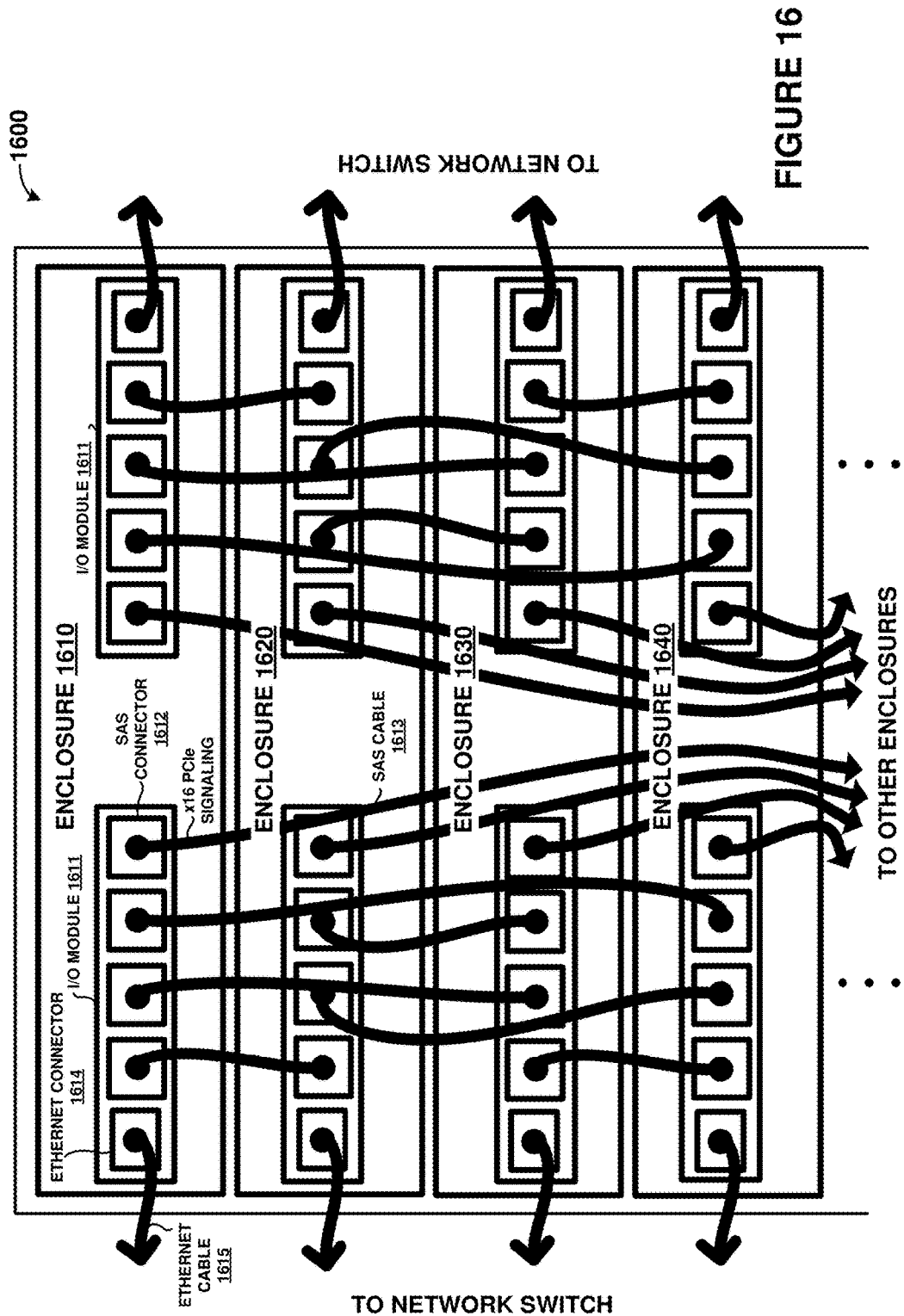
FIG. 16 is a system diagram illustrating a storage system.

The PCIe links used for cluster interconnect can terminate at external connectors, such as mini-Serial Attached SCSI (SAS) connectors which are employed to carry PCIe signaling over mini-SAS cabling. In further examples, Mini-SAS HD cables are employed that drive 12 Gb/s versus 6 Gb/s of standard SAS cables. 12 Gb/s can support PCIe Gen 3. To further illustrate cluster interconnection, FIG. 16 is presented below.

Figure 5:
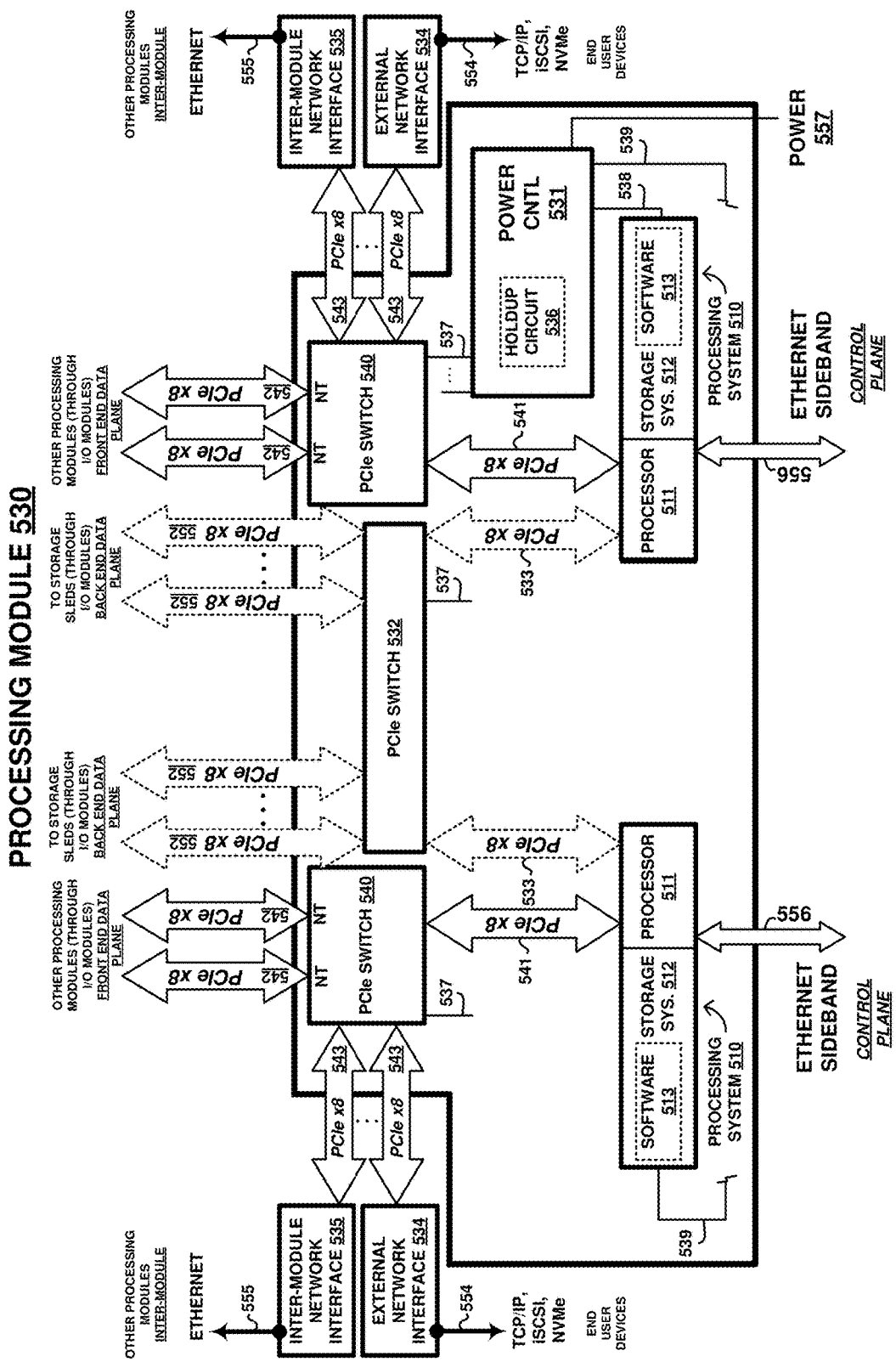
FIG. 5 is a block diagram illustrating a processing module.

FIG. 5 is a block diagram illustrating processing module 530, as an example of processing modules 130 of FIG. 1. Processing module 530 includes two or more processing systems 510, at least one PCIe switch 532, PCIe switches 540, network interfaces 534, power control module 531, and holdup circuit 536. Power control module 531 distributes power to each element of processing module 530 over associated power links 537-539. Power control module 531 can selectively enable/disable power for each power link. Further communication links can be included for intra-sled communication between the various elements of processing module 530.

Each processing system 510 further includes processor 511 and storage system 512. In some examples, network interfaces 534-535 are included in processing system 510, but network interfaces 534-535, or portions thereof, can be provided by separate circuitry and elements, such as separate PCIe expansion cards. Each processing system 510 can send and receive storage operations, such as storage packets over any of network interfaces 534-535, such as from external systems, end user devices, or from other processing systems of a cluster.

Each processor can communicate over an associated Ethernet sideband signaling link 556, such as with various microprocessors/controllers or power control nodes on other sleds or with interconnect, interposer, or control modules to retrieve statistical data or usage information. Links 556 can comprise Ethernet interfaces, or can comprise SMBus, JTAG, I2C, CAN, or any other communication interfaces, and in some examples is provided over separate links. Links 556 can be provided using external network interfaces, such as network interface cards or adapters communicatively coupled over ones of PCIe links 543. Each processor 511 also includes at least one PCIe interface, such as a PCIe transceiver and communication circuitry for communicating over associated PCIe links 533 and 541. The PCIe interface of each processor 511 can include a large number of PCIe lanes which are subdivided between narrower PCIe links, such as a ×16 interface that is subdivided among two ×8 links. In some examples, the PCIe interfaces are integrated into a single-chip die of processor 511. In other examples, the PCIe interface is provided over a separate microchip transceiver which can communicate with an associated processor 511 over another communication interface, such as a front-side bus of processor 511 or peripheral hub chip interface.

Processor 511 can comprise one or more microprocessors and other processing circuitry that retrieves and executes software 513 from storage system 512. Processor 511 can be implemented within a single processing device but can also be distributed across multiple processing devices or subsystems that cooperate in executing program instructions. Examples of processor 511 include general purpose central processing units, application specific processors, and logic devices, as well as any other type of processing device, combinations, or variations thereof. In some examples, processor 511 comprises an Intel or AMD microprocessor, ARM microprocessor, FPGA, ASIC, application specific processor, or other microprocessor or processing elements.

Storage system 512 can comprise any non-transitory computer readable storage media capable of storing software 513 that is executable by processor 511. Storage system 512 can include volatile and nonvolatile, removable and non-removable media implemented in any method or technology for storage of information, such as computer readable instructions, data structures, program modules, or other data. Storage system 512 can be implemented as a single storage device but can also be implemented across multiple storage devices or sub-systems co-located or distributed relative to each other. Storage system 512 can comprise additional elements, such as a controller, capable of communicating with processor 511. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof.

Software 513 can be implemented in program instructions and among other functions can, when executed by processing system 510 in general or processor 511 in particular, direct processor 511 to operate as commanded by software 513. Software 513 can include processes, programs, or components, such as operating system software, database software, or application software. Software 513 can also comprise firmware or some other form of machine-readable processing instructions executable by elements of processing system 510, such as processor 511. Encoding software 513 on storage system 512 can transform the physical structure of storage system 512. The specific transformation of the physical structure can depend on various factors in different implementations of this description. Examples of such factors can include, but are not limited to the technology used to implement the storage media of storage system 512 and whether the computer-storage media are characterized as primary or secondary storage. For example, if the computer-storage media are implemented as semiconductor-based memory, software 513 can transform the physical state of the semiconductor memory when the program is encoded therein. For example, software 513 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

Processing module 530 also interfaces with one or more network interfaces 534-535 to communicate over one or more associated network links 554-555. One or more network interfaces 534-535 are communicatively coupled to an associated processing system 510 or processor 511 via associated PCIe links 543 in FIG. 5. External access to processing module 530, and the storage sleds managed thereby, can be provided over ones of packet network links 554. Communication between processing modules or processors can be provided over ones of packet network links 555. In this example, packet network links 554-555 each comprises an Ethernet link for carrying various packet communications, such as Transmission Control Protocol/ Internet Protocol (TCP/IP) communications, NVMe communications, or iSCSI communications, although other packet types can be employed. The network interfaces can comprise Ethernet interfaces, IP interfaces, T1 interfaces, or other local or wide area network communication interfaces which can communicate over a communication link. Examples of communication transceivers include network interface card equipment, receivers, transmitters, modems, and other communication circuitry. In some examples, network links 554 comprise a different bandwidth or transfer speed than network links 555.

PCIe switch 532 handles back end data plane or "back side" traffic for processing module 530 for storage and retrieval of data. PCIe switch 532 communicates with storage sleds through one or more interconnect modules (not pictured) over PCIe links 552, and with ones of processors 511 over PCIe links 533. Each of links 552 and 533 comprises a PCIe link with eight lanes, namely a "×8" PCIe link. PCIe switch 532 also includes processing module cross connect links 533, which in this example are four ×8 PCIe links. This processing module cross connect 533 allows a PCIe switch 532 on another processing module to handle back end data plane traffic for any processing module for load balancing and bottleneck prevention. PCIe switch 532 also can include PCIe links 552 for further processing module cross connect. PCIe switch 532 comprises a PCIe cross connect switch for establishing switched connections between any PCIe interface handled by PCIe switch 532. In some examples, PCIe switch 532 comprises a PLX Technology PEX8796 24-port, 96 lane PCIe switch chip.

PCIe switches 540 handle front end data plane or "front side" traffic for processing module 530 for communications between processors of different processing modules. PCIe switches 540 communicate with other processing modules through one or more interconnect modules (not pictured) over PCIe links 542, and with ones of processors 511 over PCIe links 541. Each of links 542 and 541 comprises a PCIe link with eight lanes, namely a "×8" PCIe link. PCIe switches 540 also includes external module links 543, which in this example are four ×8 PCIe links. PCIe switches 540 comprise a PCIe cross connect switch for establishing switched connections between any PCIe interface handled by PCIe switches 540. In some examples, PCIe switches 540 each comprise a PLX Technology PEX8796 24-port, 96 lane PCIe switch chip.

Power control module 531 includes circuitry to selectively provide power to any of the elements of processing module 530. Power control module 531 can receive control instructions from a processor 511 over associated links 537-539 or additional communication links. In some examples, power control module 531 comprises processing elements discussed above for processor 320 of FIG. 3. Power control module 531 can receive power over power link 557 as a power source for the various elements of processing module 530. Holdup circuit 536 includes energy storage devices for storing power received over power link 557 for use during power interruption events, such as loss of source power. Holdup circuit 536 can include capacitance storage devices, such as an array of capacitors.

Figure 6:
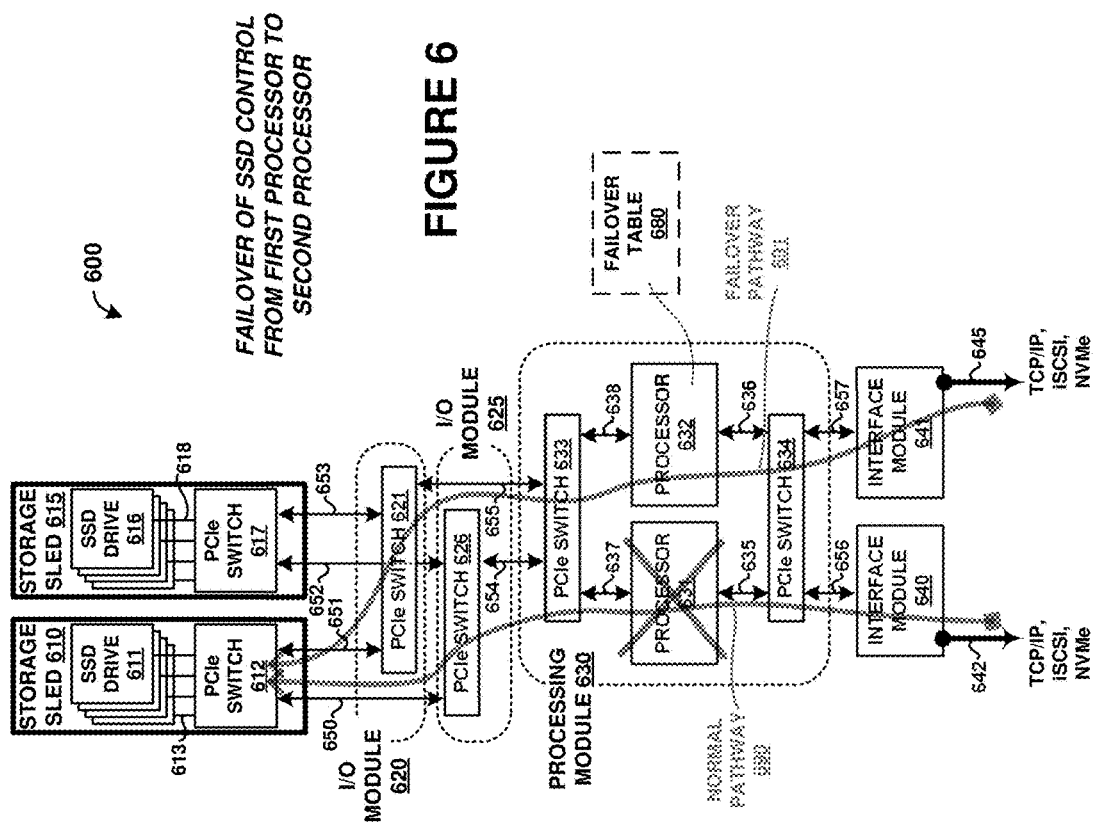
FIG. 6 is a system diagram illustrating a storage system.

FIG. 6 is a system diagram illustrating storage system 600, which can be an example of some elements of system 100 in FIG. 1. Storage system 600 includes storage sleds 610 and 615, I/O modules 620 and 625, processing module 630, and interface modules 640-641. Storage sled 610 includes SSD drives 611 and PCIe switch 612 which communicate over PCIe links 613. Storage sled 615 includes SSD drives 616 and PCIe switch 617 which communicate over PCIe links 618. Although two storage sleds are included in FIG. 6, it should be understood that any number of storage sleds can be included. Also, although four SSD drives are included in each storage sled, it should be understood that any number of SSD drives can be included. I/O module 620 includes PCIe switch 621, and I/O module 625 includes PCIe switch 626. Although one PCIe switch is shown for each I/O module in FIG. 6, it should be understood that any number can be included. Processing module 630 includes processors 631-632 and PCIe switches 633-634 that communicate over associated ones of PCIe links 635-638, and further elements can be included as discussed above.

Interface module 640 communicates over various interfaces, namely a network interface 642 for TCP/IP, iSCSI, or NVMe traffic, and a processing module PCIe interface 656. Interface module 641 communicates over at least two interfaces, namely a network interface 645 for TCP/IP, iSCSI, or NVMe traffic, and a processing module PCIe interface 657. Processing module 630 communicates with storage sleds 610 and 615 over PCIe links 654 and 655 which are switched through associated PCIe switches on associated I/O modules. Storage sled 610 communicates with different I/O modules over respective PCIe links 650-651. Storage sled 615 communicates with different I/O modules over respective PCIe links 652-653. The elements of FIG. 6 form a storage system with multiple redundant PCIe links between processing modules and storage sleds by way of I/O modules, such as those discussed herein.

In operation, a specific processor of a processing module will be configured to manage or "own" specific SSD drives on various storage sleds. For example, processor 631 can be configured to manage SSD drives 611 of storage sled 610 while processor 632 can be configured to manage SSD drives 616 of storage sled 615. Other combinations can be used, including a subset of SSD drives of a particular storage sled managed by a processor and the remaining SSD drives of that particular storage sled managed by another processor. Managing an SSD drive comprises a processor initializing the SSD drive and handling read, write, or other file or object transactions for the SSD drive. Each processor can reference a data structure stored on a non-transitory computer readable medium to determine which SSD drives are to be managed.

However, once a particular processor has been configured to manage a particular SSD drive or set of SSD drives, that processor might experience a failure or interruption in normal operation. Responsive to the failure of a processor, such as processor 631, another processor 632 can be configured to take over management of the SSD drives previously managed by the failed processor 631. To take over management of the SSD drives previously managed by the failed processor 631, processor 632 can initialize the SSD drives previously managed by the failed processor 631 and begin managing file operations, such as read and write operations, for those SSD drives. Processor 632 can include failover table 680 which indicates SSD drives for which processor 632 manages in the event of a failure of another processor. Failover table 680 can also indicate a processor or processors that processor 632 monitors to determine if any failures have occurred.

In FIG. 6, different pathways for data and other file transactions are shown. In a first pathway, namely normal pathway 690, interface module 640 receives data packets corresponding to a file transaction (such as data store or retrieve transactions) and transfers the data packets over PCIe switch 634 for delivery to processor 631. Processor 631 determines that it "owns" SSD drives that correspond to the file transaction and proceeds to handle the file transaction for the particular SSD drives, such as SSD drives 611. If processor 631 fails, then further data packets for file transactions associated with SSD drives 611 can be managed by processor 632. These data packets can be received over interface module 641, or can instead be received over interface module 640 since interface module 640 is communicatively coupled to processor 632 over at least one PCIe switch 634. To handle incoming data packets originally intended for failed processor 631, processor 632 can inherit network connection states from processor 631, such as TCP/IP connections and subsequently handle network traffic originally handled by failed processor 631. Failover pathway 691 indicates one example flow of data and file transactions for SSD drive 611 when processor 631 has failed.

Processor 632 can monitor another processor, such as processor 631, using different methods. In a first example, processor 632 sends periodic messages to processor 631 and awaits response messages from processor 631. If the response messages fail to come within a predetermined amount of time, then processor 632 can determine that processor 631 has failed. The periodic messages can include probe packets sent through a network stack or stacks between processors, such as over a network interface that processor 631 and 632 can communicate. In another example, a set of registers or bits are maintained for processor 631 in processor 632 that are set or reset by processor 631. If a register or bit associated with processor 631 has not been properly set or reset within a predetermined amount of time, then processor 632 can determine that processor 631 has failed. Although two processors are shown in FIG. 6 as monitoring each other, in other examples a greater number of processors can be included. This greater number of processors can each be configured be monitored for failure by all other processors, by only one other processor (dual mode), or by two other processors (tri-mode). Any combination of monitored and monitoring processors can be employed.

Once a processor has been determine to have failed, the monitoring processor, such as processor 632, can be configured to initiate a restart, reboot, or power cycle of the failed processor. If the failed processor comes back online and functioning after the restart, reboot, or power cycle, then those SSD drives that were transitioned to the monitoring processor can be re-managed by the previously failed processor.

Figure 7:
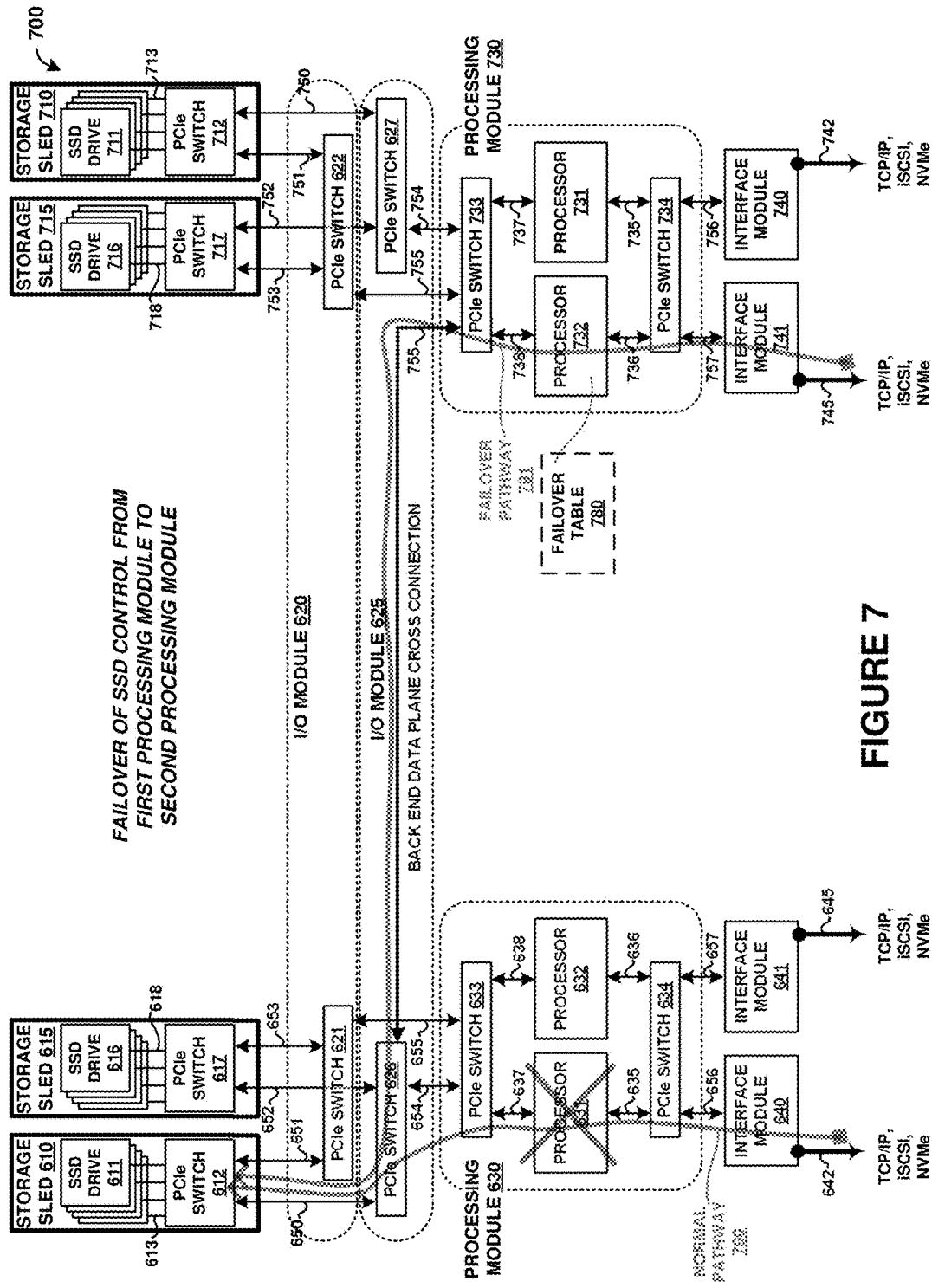
FIG. 7 is a system diagram illustrating a storage system.

FIG. 7 is a system diagram illustrating storage system 700, which can be an example of some elements of system 100 in FIG. 1. FIG. 7 includes elements indicated in FIG. 6 as well as additional elements. These additional elements include storage sleds 710 and 715, processing module 730, and interface modules 740-741. Storage sled 710 includes SSD drives 711 and PCIe switch 712 which communicate over PCIe links 713. Storage sled 715 includes SSD drives 716 and PCIe switch 717 which communicate over PCIe links 718. Although four storage sleds are included in FIG. 7, it should be understood that any number of storage sleds can be included. Also, although four SSD drives are included in each storage sled, it should be understood that any number of SSD drives can be included. I/O module 620 includes PCIe switches 621-622, and I/O module 625 includes PCIe switches 626-627. Although two PCIe switches are shown for each I/O module in FIG. 7, it should be understood that any number can be included. Processing module 730 includes processors 731-732 and PCIe switches 733-734 that communicate over associated ones of PCIe links 735-738, and further elements can be included as discussed above.

Interface module 740 communicates over at least two interfaces, namely a network interface 742 for TCP/IP, iSCSI, or NVMe traffic, and a processing module PCIe interface 756. Interface module 741 communicates over at least two interfaces, namely a network interface 745 for TCP/IP, iSCSI, or NVMe traffic, and a processing module PCIe interface 757. Processing module 630 communicates with any of storage sleds 610, 615, 710, and 715 over PCIe links 654 and 655 which are switched through associated PCIe switches on associated I/O modules. Processing module 730 communicates with any of storage sleds 610, 615, 710, and 715 over PCIe links 754 and 755 which are switched through associated PCIe switches on associated I/O modules. Storage sled 710 communicates with different I/O modules over respective PCIe links 750-751. Storage sled 715 communicates with different I/O modules over respective PCIe links 752-753. The elements of FIG. 7 form a storage system with multiple redundant PCIe links between processing modules and storage sleds by way of I/O modules, such as those discussed herein.

In operation, a specific processor of a processing module will be configured to manage specific SSD drives on various storage sleds. For example, processor 731 can be configured to manage SSD drives 711 of storage sled 710 while processor 732 can be configured to manage SSD drives 716 of storage sled 715. Other combinations can be used, including a subset of SSD drives of a particular storage sled managed by a processor and the remaining SSD drives of that particular storage sled managed by another processor. Managing an SSD drive comprises a processor initializing the SSD drive and handling read, write, or other file or object transactions for the SSD drive. Each processor can reference a data structure stored on a non-transitory computer readable medium to determine which SSD drives are to be managed.

However, once a particular processor has been configured to manage a particular SSD drive, the processor might experience a failure or interruption in normal operation. Although FIG. 6 focuses on processors on a shared processing module 630, the examples of FIG. 7 discuss processors that may reside on separate processing modules, namely processing module 630 and processing module 730.

Responsive to the failure of a processor, such as processor 631, another processor 732 can be configured to take over management of the SSD drives previously managed by the failed processor 631. Processor 732 can initialize the SSD drives previously managed by the failed processor 631 and begin managing file operations, such as read and write operations, for those SSD drives. Processor 732 can include failover table 780 which indicates SSD drives for which processor 732 manages in the event of a failure of another processor. Failover table 780 can also indicate a processor or processors that processor 732 monitors to determine if any failures have occurred.

Figure 10:
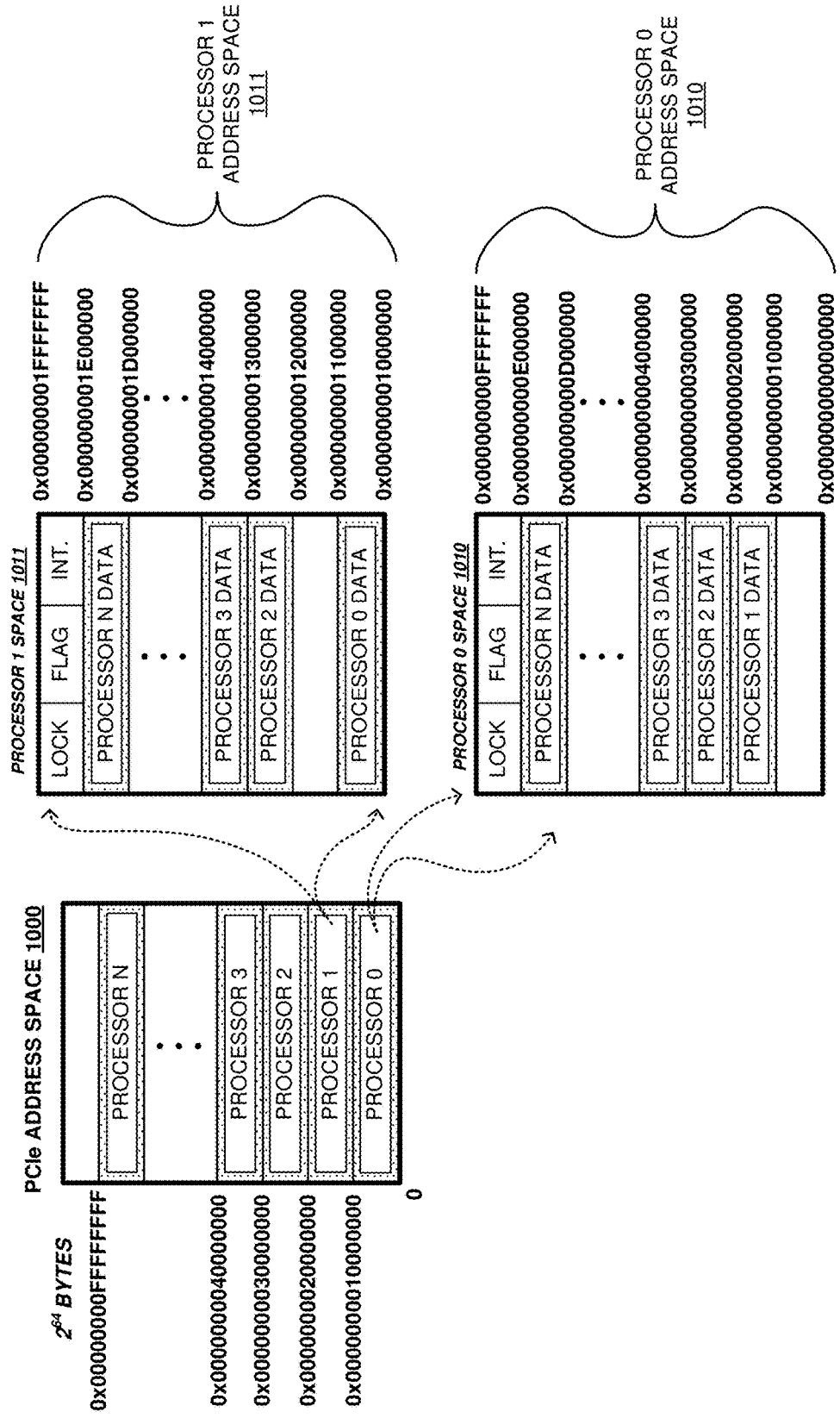
FIG. 10 is s diagram illustrating a memory allocation table.

Table 780 can comprise a listing of various portions of a shared PCIe address space that each of the processors of system 700 handles storage operations for, such as an associated address range. This address range corresponds to one or more of the SSDs on the storage sleds and indicates which SSDs are managed by a particular processor. Each processor can include table 780 which indicates which SSDs are managed by that processor and which SSDs are managed by the processors which that processor monitors for failures. Additionally, in load-balancing examples, table 780 can include all of the various PCIe address ranges for all processors, so that when a particular processor receives a storage operation that particular processor can check the associated PCIe address against table 780 to determine if that particular processor should manage the storage operation or if the storage operation should be transferred to another of the processors for further handling. FIG. 10 shows an example PCIe address space that is subdivided among various processors which can manage various ones of the SSDs in a storage system.

In FIG. 7, different pathways for data and other file transactions are shown. In a first pathway, namely normal pathway 790, interface module 640 receives data packets corresponding to a file transaction (such as data store or retrieve transactions) and transfers the data packets over PCIe switch 634 for delivery to processor 631. Processor 631 determines that it "owns" SSD drives that correspond to the file transaction and proceeds to handle the file transaction for the particular SSD drives, such as SSD drives 611. If processor 631 fails, then further data packets for file transactions associated with SSD drives 611 can be managed by processor 732. These data packets can be received over interface module 741 when processor 732 begins accepting packets originally accepted by processor 631. Alternatively, these data packets can be received over interface module 640 and transferred for delivery to processor 732 over a PCIe switch, such as PCIe switch 634, among others. To handle incoming data packets originally intended for failed processor 631, processor 732 can inherit network connection states from processor 631, such as TCP/IP connections and subsequently handle network traffic originally handled by failed processor 631. Failover pathway 791 indicates one example flow of data and file transactions for SSD drive 611 when processor 631 has failed.

Processor 732 can monitor another processor, such as processor 631, using different methods. In a first example, processor 732 sends periodic messages to processor 631 and awaits response messages from processor 631. If the response messages fail to come within a predetermined amount of time, then processor 732 can determine that processor 631 has failed. The periodic messages can include probe packets sent through a network stack or stacks between processors, such as over a network interface that processor 631 and 732 can communicate. In another example, a set of registers or bits are maintained for processor 631 in processor 732 that are set or reset by processor 631. If a register or bit associated with processor 631 has not been properly set or reset within a predetermined amount of time, then processor 732 can determine that processor 631 has failed. Although two processors are shown in FIG. 7 as monitoring each other, in other examples a greater number of processors can be included. This greater number of processors can each be configured be monitored for failure by all other processors, by only one other processor (dual mode), or by two other processors (tri-mode). Any combination of monitored and monitoring processors can be employed.

Once a processor has been determine to have failed, the monitoring processor, such as processor 732, can be configured to initiate a restart, reboot, or power cycle of the failed processor. If the failed processor comes back online and functioning after the restart, reboot, or power cycle, then those SSD drives that were transitioned to the monitoring processor can be re-managed by the previously failed processor.

The storage systems described herein include a switch fabric which is comprised of a plurality of PCIe switch elements along with associated PCIe links. This switch fabric can include any of the PCIe switches discussed herein, and can be partitioned into a front end data plane and a back end data plane. The front end data plane is employed to transfer file operations, object operations, inter-processor communications, among other control information between processors, processing modules, and network interfaces. The back end data plane is employed to transfer data to and from storage sleds. When multiple processors are employed, the switch fabric is configured with a failover path. If the communications goes down for a particular processor, the hardware can automatically switch PCIe connections over to another processor. Additionally, there is a management processor on each I/O module that can be instructed to dynamically change the PCIe paths as necessary by any of the processing modules. The same type of mechanisms that are employed for failover are used to form a redundant path for each of the components the fabric.

In addition to the paths the hardware provides, there are also software-based additional layers of redundancy via front end and back end routing. All processors within a storage system are aware of the current state of the hardware and can determine additional routes to storage sleds as required. This is achieved in part through route requests locally within the system all the way to rerouting traffic externally by reverse ARP. Hardware provides minimal latency reroutes for failover and redundancy. While software increase the levels of redundant paths that can be changed too. (i.e. when a hardware path fails software can set up the next path of redundancy for another failure event). There is a table included in each processor that tells it which SSD it owns normally and which it supports when there is a failover situation. In the event of a failover an interrupt is generated on the PCIe bus as it switches over. A discovery process of drive(s) assigned to the failed processor is initiated. This is followed by the processor populating discovered SSD(s) that match the failover table into its active table.

The redundancy and failover are controlled by a couple of mechanisms. At bootup, each processing node (running a separate instance of an operating system) gets a configuration that specifies the peer-node monitoring algorithm (all nodes monitor all others, dual node monitoring, where each node has one peer, and tri-node monitoring where each node has two peers monitoring it). The peer algorithm uses a hardware register heartbeat mechanism that each node sets/clears like an alternately at a configurable interval (seconds). This lets a processor know when the peer is crashed and/or loses power. In addition there are SW algorithms running on each side that sends a "probe" packet over the network stack at configurable interval (seconds). After a loss of some max number of missed probe responses, the peers can determine if the peer kernel, driver, or operating system software is hung up or crashed. Thus, there is hardware and software checking for enhanced peer state determination.

Once a node is determined to be crashed and/or non-responding, a failover event is initiated by one of the peers configured to monitor the crashed node. This entails two actions: 1) take over ownership the SSDs of the node, 2) initiate a failback operation on a node by recycling its power or resetting it to reboot. The SSD ownership change occurs by one of the monitoring peer's searching a table/array of devices owned by the failed node. Note, each peer knows all the devices owned by peers. The exchange this information periodically (i.e. every 60 seconds roughly) and initially when a peer boots and joins the cluster. The peer then executes a userspace script/command that reconfigures the PCIe switch fabric chip to make the device "visible" through the fabric to the node that wants to obtain ownership. The peer then checks the SSD's device driver's status register, determines the state of the SSD/driver, then issues a driver/device reset such that the device gets recycled and rediscovered anew (by the monitoring peer that wants to obtain ownership). The drive now "appears" to the new owning peer, gets configured and comes on line accessible now via the peer's IP address.

In parallel to what is described above, an operating system backend software invalidates layer-2 (Ethernet) routing table entries pointing to the crashed node and generates new layer-2 (Ethernet) routing tables entries that point to the new owning peer as the destination for storage transactions that access the SSDs/LBAs contained on the transferred SSDs. These tables are propagated to all the nodes in the cluster. Incoming storage transactions now are routed correctly at layer-2 to the new owning node. The crashed node is then rebooted by the monitoring peer. It will continue attempting to reset it until it comes back and re-joins the cluster.

FIG. 8 is a system diagram illustrating a storage system, which can be an example of some elements of system 100 in FIG. 1. FIG. 8 includes elements indicated in FIGS. 6 and 7 as well as additional elements. These additional elements include PCIe switches 830-833. I/O module 620 includes PCIe switches 621-622 and 832, and I/O module 625 includes PCIe switches 626-627 and 833. Processor 632 communicates over PCIe link 840 with PCIe switch 830. Processor 631 can also communicate with PCIe switch 830. Processor 732 communicates over link 841 with PCIe switch 831. Processor 731 can also communicate with PCIe switch 831. PCIe switch 830 communicates with both PCIe switch 832 and 833 over associated PCIe links 842 and 843. PCIe switch 831 communicates with both PCIe switch 832 and 833 over associated PCIe links 844 and 845.

FIG. 8 illustrates front end data plane cross connection between processing modules 630 and 730 over any of I/O module 620 and 625. As discussed above for FIGS. 6 and 7, a particular processor can manage a particular I/O sled or set of SSD drives. However, data packets related to data transactions for a particular SSD drive can be received over any of interface modules 640, 641, 740, and 741. This configuration of multiple interface modules each communicating over various TCP/IP links allows for load balancing, highly parallelized receipt of transactions from external systems, and reception of traffic for any SSD drive over any network interface included in system 800. A particular processor typically manages traffic for a particular SSD on the back end data plane side, such as for read and write transactions to a particular storage sled, but file transactions can be received over a network interface by any processor. FIG. 8 illustrates one example process of transferring a file transaction received at one processor to another processor which manages the storage elements associated with the file transaction. The operations described in FIG. 8 are further detailed in FIGS. 9A and 9B, which will be discussed below.

In FIG. 8, a file transaction is received over link 645 by interface module 641, as indicated by "transaction receive 892" in FIG. 8. This file transaction can include a file or object operation or transaction, such as read, write, delete, modify, or other file system operations for data. In this example, the affected data is stored on SSD drive 716 on storage sled 715. However, the file transaction, in the form of one or more packets, is received by interface module 641 and transferred initially to processor 632 by way of PCIe switch 634. Transaction 892 can indicate a storage address for which the data associated with transaction 892 is to be written to or read from, among other operations.

Processor 632 includes routing table 880 which comprises one or more data structures that indicate which particular processor of system 800 manages data for the storage address space contained within the storage sleds of system 800. As discussed above, a particular processor manages a particular set of SSD drives or storage sleds. However, file transactions can be received over any network interface by any processor. Each processor includes a routing table or other data structure that indicates which processor manages a particular address space.

Table 880 can comprise a listing of various portions of a shared PCIe address space that each of the processors of system 800 handles storage operations for, such as an associated address range. This address range corresponds to one or more of the SSDs on the storage sleds and indicates which SSDs are managed by a particular processor. Each processor can include table 880 which indicates which SSDs are managed by that processor and which SSDs are managed by the processors which that processor monitors for failures. Additionally, in load-balancing examples, table 880 can include all of the various PCIe address ranges for all processors, so that when a particular processor receives a storage operation that particular processor can check the associated PCIe address against table 880 to determine if that particular processor should manage the storage operation or if the storage operation should be transferred to another of the processors for further handling. FIG. 10 shows an example PCIe address space that is subdivided among various processors which can manage various ones of the SSDs in a storage system.

In this example, routing table 880 indicates that processor 732 manages the storage devices associated with transaction 892. Processor 632 transfers transaction 892 over at least PCIe switch 830, PCIe switch 833, and PCIe switch 831 for delivery to processor 732, as indicated by "transaction transfer 893" in FIG. 8. Processor 732 then handles transaction 892. If transaction 892 is a write transaction, then processor 732 writes data associated with transaction 892 into an associated SSD drive, such as SSD drive 716 of storage sled 715, as indicated by "transaction commit 894" in FIG. 8. For read transactions, processor 732 reads associated data from an SSD drive and transfers the read data for delivery to an external system that initiated the transaction. This read data can be transferred over a network interface associated with processor 732, such as interface module 741.

In iSCSI examples, FIG. 8 can incorporate features for iSCSI portal groups. For example, transferring an iSCSI transaction received at a first processing system to another processing system in the same portal group can be achieved by the operation described in FIG. 8. FIG. 8 illustrates PCIe front end data plane cross connection between processing modules 630 and 730 over any of I/O module 620 and 625. As discussed above for FIG. 1, a particular processor can manage a particular I/O sled or set of SSD drives. However, data packets related to storage transactions for a particular SSD drive can be received over any of interface modules 640, 641, 740, and 741. This configuration of multiple interface modules each communicating over various TCP/IP links allows for load balancing, highly parallelized receipt of transactions from external systems, and reception of traffic for any SSD drive over any network interface included in system 800. A particular processor typically manages traffic for a particular SSD on the back end data plane side, such as for read and write transactions to a particular storage sled, but storage transactions can be received over a network interface by any processor.

In the example shown in FIG. 8, an iSCSI portal group is discussed as related to receiving an iSCSI storage transaction over a first network interface associated with a first processor and that processor transferring the storage transaction for handling by a second processor. In FIG. 8, an iSCSI portal group is associated with at least links 642, 645, 742, and 745, which in turn are associated with correlated ones of processors 631, 632, 731, and 732. Each of the interface modules comprises at least one network interface link of a network interface card, and has a different associated TCP/IP address associated therewith. These various TCP/IP addresses are grouped into an iSCSI target portal group, as shown in FIG. 8.

However, in FIG. 8, each processor 631, 632, 731, 732, only handles a particular subset of the total number of SSD drives in system 800. For example, processor 632 might only manage SSD drives on storage sled 615 and processor 732 might only manage SSD drives on storage sled 715. Other storage drive and sled configurations are possible. Thus, when processor 632 receives a storage transaction for the portal group of system 800, the storage transaction is first transferred to a managing processor, namely processor 732 in this example. Processor 632 references routing table 880 to determine that processor 732 manages the SSD drives associated with the storage transaction. The storage transaction can identify an address or address range for the storage transaction, and this address or address range can be used by processor 632 to determine that processor 732 should handle the transaction further. Responsively, processor 632 transfers the storage transaction for delivery to processor 732 over a front end data plane PCIe fabric. This is shown in FIG. 8 as operation 893. The front end data plane PCIe fabric is comprised of a plurality of PCIe crosspoint switches, namely PCIe switches 634, 734, and 830-833, along with any associated PCIe links. Other pathways can be employed. Further discussion of iSCSI portal groups is found in FIGS. 9A and 12.

Figure 9A:
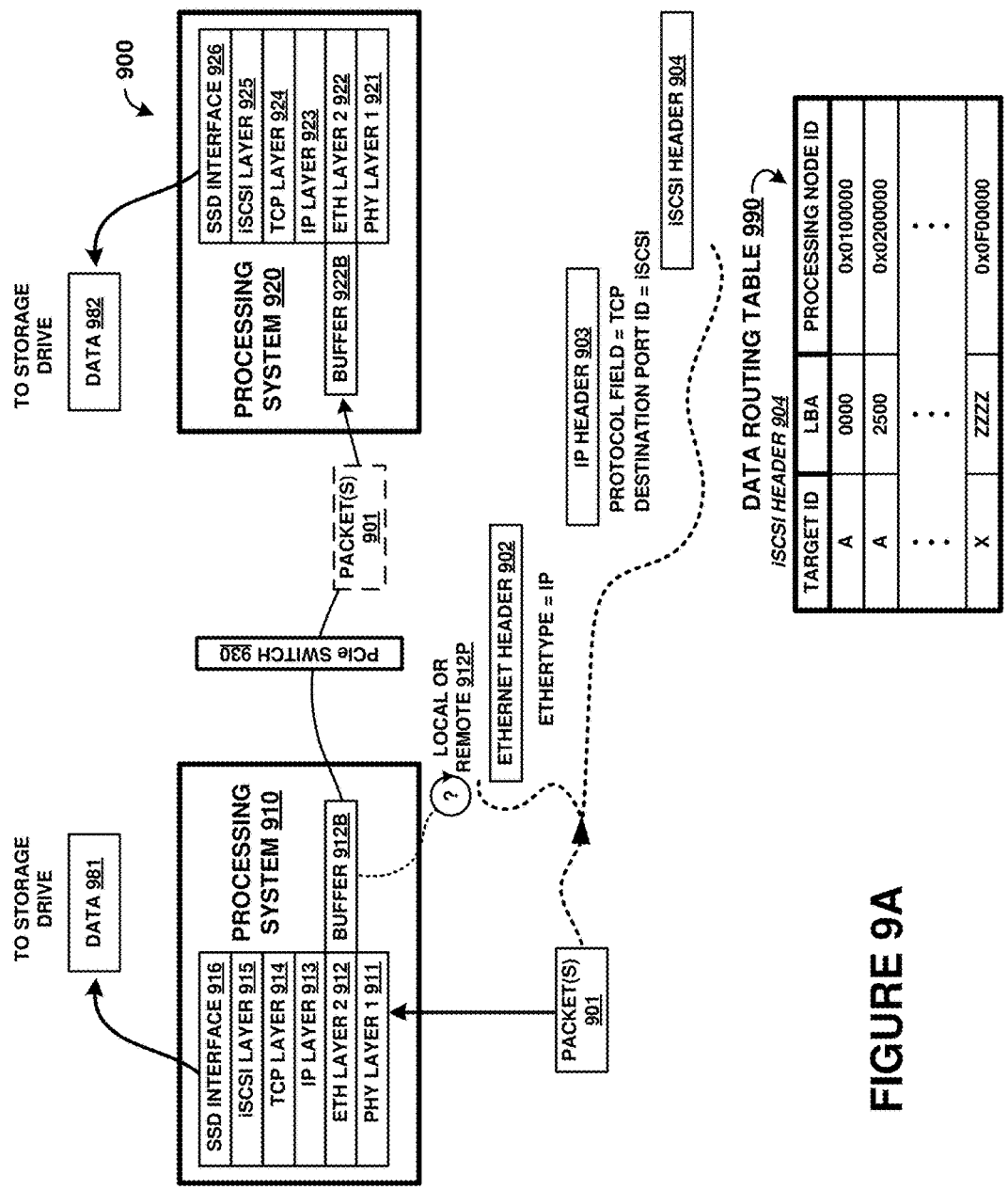
FIG. 9A is a system diagram illustrating a storage system.

As one example or transferring transactions received by one processor or processing system for handling by another processor or processing system, FIG. 9A is presented. FIG. 9A illustrates storage system 900 communicating over an iSCSI protocol. Storage system 900 includes processing system 910, processing system 920, and PCIe switch 930. Further storage system elements such as found in the previous figures can be included in system 900, but are omitted for clarity in FIG. 9A. In alternative examples, NVMe protocol handling is discussed below in FIG. 9B.

In FIG. 9A, processing system 910 and processing system 920 are communicatively coupled by at least PCIe switch 930. Further redundant PCIe switches can be employed. PCIe switch 930 is included in a front end data plane of a storage system, and allows for transfer of file transactions between processors.

In operation, packets 901 are received by processing system 910. These packets can be received by a network interface card associated with processing system 910, such as over an Ethernet interface of processing system 910. Packets 901 are associated with a storage transaction, such as a write transaction or read transaction, for data storage on an associated storage drive, such as a storage sled or SSD as discussed herein. Each of processing systems 910 and 920 include network interfaces that can receive storage transactions for each other for redundancy, load balancing, failover protection, among other features. Additionally, as discussed above, each processing system manages or owns storage drives that are particular to each processing system. Specifically, processing system 910 will manage a first set of storage drives, while processing system 920 will manage a different second set of storage drives. However, if an iSCSI storage operation for the second set of storage drives is received over a network interface associated with a processing system that manages the first set of storage drives, then the operations detailed in FIG. 9A is followed.

In FIG. 9A, packets 901 are associated with a storage operation for storage drives managed by processing system 920. However, packets 901 might be received by processing system 910 which might manage a different set of storage drives not associated with packets 901. These packets will be received into the various network stack layers of a network interface of processing system 910, such as PHY layer 1 911, and ETH layer 2 912. If packets 901 were for a storage drive managed by processing system 910, then these packets can proceed further into IP layer 3 913 or further layers 914-916 for storage as data 981. However, if packets 901 were for a storage drive managed by another processing system, such as processing system 920, then the process detailed below can allow for processing system 920 to handle packets 901 for storage as data 982.

Specifically, once packets 901 are stored in buffer 912B, processing system 910 executes process 912P to determine if packets 901 are related to a storage transaction for storage drives managed by processing system 910 or by another processing system. Process 912P includes checking various headers and field values of packets 901 to determine if packets 901 are associated with storage drives that processing system 910 manages or another processing system. FIG. 9A illustrates one example process 912P.

First, an Ethernet header 902 of packets 901 are examined to determine a value of the Ethertype field. If the Ethertype field indicates an IP packet, then IP header 903 is examined. If the protocol field in IP header 903 indicates TCP and the destination port identifier indicates an iSCSI port, then iSCSI header 904 is examined. iSCSI header 904 indicates various properties including an iSCSI target identifier and a logical block address (LBA) associated with the iSCSI target identifier. This target identifier and logical block address can be used to determine if the storage transaction comprising packets 901 is for the local processor/processing system 910 or a remote processor/processing system 920, among other processors/processing systems.

Table 990 indicates an example routing configuration to determine which processing system is to handle incoming iSCSI packets. It should be understood that the values indicated for table 990 are merely exemplary, and other values can be used in practice. Table 990 indicates three columns, with the first two corresponding to the target ID and the LBA found in iSCSI header 904. The third column corresponds to a processing node identifier. The processing node ID is correlated to a PCIe address range, with each processing system or processor in a storage system that shares a front end PCIe fabric having a corresponding address range. If the address range is for itself (local processing system 910), then processing system 910 determines that it should handle packets 901 through layers 913-916 and storage of corresponding data 981. If the address range is for a remote processing system, such as processing system 920, then processing system 910 determines that it should transfer packets 901 to the remote processing system.

FIG. 9A also illustrates transfer of packets 901 to another processing system. If packets 901 are to be handed by another processing system, such as determined using routing table 990 discussed above, then processing system 910 transfers packets 901 from buffer 912B to the PCIe memory address location indicated by table 990 as the processing node ID. FIG. 9A shows processing system 910 transferring packets 901 over a PCIe fabric comprised of at least PCIe switch 930 into a buffer of processing system 920, namely buffer 922B. Processing system 910 can also issue an interrupt or other signal to processing system 920 which indicates that packets 901 are waiting in buffer 922B for handling by processing system 920.

Processing system 920 checks buffer 922B responsive to an interrupt issued by processing system 910, or due to periodic polling of buffer 922B. This buffer 922B can be a buffer maintained by ETH layer 2 922 of processing system 920. ETH layer 2 922 can have more than one buffer associated therewith. A first buffer can be a circular buffer used for receiving packets over PHY layer 1 921. A second buffer can be a PCIe buffer, such as buffer 922B, that accepts packets from other processing systems over a PCIe fabric.

In this example, buffer 922B is associated with ETH layer 2 922 of a network stack of processing system 920. Processing system 920 then processes packets 901 as if processing system 920 itself had received packets 901 over its own network interface, such as by passing packets 901 to a higher layer in the network stack, including IP layer 3 923. These packets can then be handled by processing system 920 for the particular storage transaction that are indicated by packets 901. For example, if packets 901 describe a write operation for SSDs managed by processing system 920, then data 982 is transferred for storage in associated storage drives by processing system 920.

Since packets 901 were originally addressed to processing system 910, portions of packets 901 can be transformed by processing system 920 to be handled by a network stack of processing system 920. The recipient peer/remote node, namely processing system 920, receives packets 901 and transforms portions of packets 901, such as TCP frames, and re-builds the Ethernet header, the IP header to appear as if it was sent directly to the servicing node to prevent a network stack of processing system 920 from rejecting packets 901. This transformation can include modifying an associated MAC addresses of packets 901, Ethernet CRC value, destination IP address, and other header properties. In other examples, processing system 920 does not transform the portions of packets 901 and instead inhibits rejection of packets 901 due to MAC address, Ethernet CRC value, or destination IP address mismatches.

In this manner, processing system 910 can receive packets for storage transactions for storage drives handled by another processing system 920. Processing system 910 inspects packet 901 and references table 990 to determine if to transfer packets 901 over the PCIe fabric to the correct processing system. Moreover, the packets are transferred into a layer 2 buffer of the correct processing system and the correct processing system handles the packets as if it had originally received the packets instead of the processing system that instead received the packets over a different network interface.

In specific examples, network driver software of a second processing system is modified to intake packets received at a first processing system as if it was received at that second processing system. Likewise, the driver software of the first processing system is also modified to transfer packets received by the first processing system for delivery into a network stack of the second processing system. The layer 2 driver software of the second processing system can receive an interrupt generated by the first processing system to indicate that new packets are waiting in an associated layer 2 buffer of the second processing system.

Figure 9B:
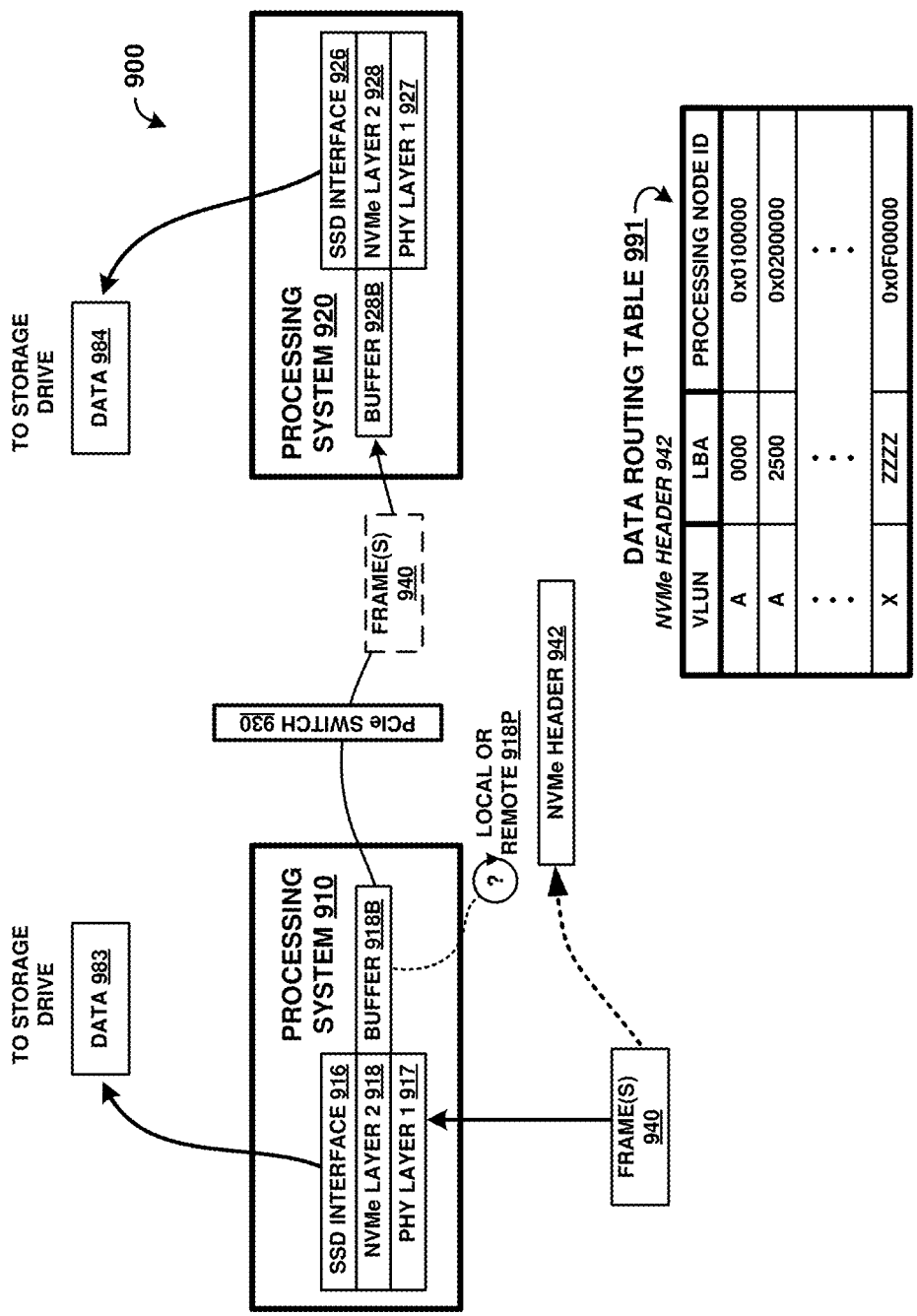
FIG. 9B is a system diagram illustrating a storage system.

As another example or transferring storage transactions received by one processor or processing system for handling by another processor or processing system, FIG. 9B is presented. FIG. 9B illustrates storage system 900 communicating using an NVMe protocol. Storage system 900 includes processing system 910, processing system 920, and PCIe switch 930. Further storage system elements such as found in the previous figures can be included in system 900, but are omitted for clarity in FIG. 9B.

In FIG. 9B, processing system 910 and processing system 920 are communicatively coupled by at least PCIe switch 930. Further redundant PCIe switches can be employed. PCIe switch 930 is included in a front end data plane of a storage system, and allows for transfer of file transactions between processors.

In operation, frames 940 are received by processing system 910. These frames can be received by an NVMe interface associated with processing system 910, such as over an NVMe interface card coupled to processing system 910. Frames 940 are associated with a storage transaction, such as a write transaction or read transaction, for data storage on an associated storage drive, such as a storage sled or SSD as discussed herein. Frames 940 can comprise one or more NVMe frames, and can be bundled into one or more packets. Each of processing systems 910 and 920 include communication interfaces that can receive storage transactions for each other for redundancy, load balancing, failover protection, among other features. Additionally, as discussed above, each processing system manages or owns storage drives that are particular to each processing system. Specifically, processing system 910 will manage a first set of storage drives, while processing system 920 will manage a different second set of storage drives. However, if an NVMe storage operation for the second set of storage drives is received over an NVMe interface associated with a processing system that manages the first set of storage drives, then the operations detailed in FIG. 9B is followed.

In FIG. 9B, frames 940 are associated with an NVMe storage operation for storage drives managed by processing system 920. However, frames 940 might be received by processing system 910 which might manage a different set of storage drives not associated with frames 940. These frames will be received into the various protocol stack layers of an NVMe interface of processing system 910, such as PHY layer 1 917, and NVMe layer 2 918. If frames 940 were for a storage drive managed by processing system 910, then these frames can proceed further for storage as data 983. However, if frames 940 were for a storage drive managed by another processing system, such as processing system 920, then the process detailed below can allow for processing system 920 to handle frames 940 for storage as data 984.

Specifically, once frames 940 are stored in buffer 918B, processing system 910 executes process 918P to determine if frames 940 are related to a storage transaction for storage drives managed by processing system 910 or by another processing system. Process 918P includes checking various headers and field values of frames 940 to determine if frames 940 are associated with storage drives that processing system 910 manages or another processing system. FIG. 9B illustrates one example process 918P.

First, an NVMe header 942 of frames 940 are examined. NVMe header 942 indicates various properties including an NVMe logical unit number (VLUN) and possibly a logical block address (LBA) associated with the VLUN. This VLUN and LBA information can be used to determine if the storage transaction comprising frames 940 is for the local processor/processing system 910 or a remote processor/processing system 920, among other processors/processing systems.

Table 991 indicates an example routing configuration to determine which processing system is to handle incoming NVMe frames. It should be understood that the values indicated for table 991 are merely exemplary, and other values can be used in practice. Table 991 indicates three columns, with the first two corresponding to the VLUN and the LBA found in NVMe header 942. The third column corresponds to a processing node identifier. The processing node ID is correlated to a PCIe address range, with each processing system or processor in a storage system that shares a front end PCIe fabric having a corresponding address range. If the address range is for itself (local processing system 910), then processing system 910 determines that it should handle frames 940 and storage of corresponding data 983. If the address range is for a remote processing system, such as processing system 920, then processing system 910 determines that it should transfer frames 940 to the remote processing system.

FIG. 9B also illustrates transfer of frames 940 to another processing system. If frames 940 are to be handed by another processing system, such as determined using routing table 991 discussed above, then processing system 910 transfers frames 940 from buffer 918B to the PCIe memory address location indicated by table 991 as the processing node ID. FIG. 9B shows processing system 910 transferring frames 940 over a PCIe fabric comprised of at least PCIe switch 930 into a buffer of processing system 920, namely buffer 928B. Processing system 910 can also issue an interrupt or other signal to processing system 920 which indicates that frames 940 are waiting in buffer 928B for handling by processing system 920.

Processing system 920 checks buffer 928B responsive to an interrupt issued by processing system 910, or due to periodic polling of buffer 928B. This buffer 928B can be a buffer maintained by NVMe layer 2 928 of processing system 920. NVMe layer 2 928 can have more than one buffer associated therewith. A first buffer can be a buffer used for receiving NVMe frames over PHY layer 1 927. A second buffer can be a PCIe buffer, such as buffer 928B, that accepts frames from other processing systems over a PCIe fabric.

In this example, buffer 928B is associated with NVMe layer 2 928 of processing system 920. Processing system 920 then processes frames 940 as if processing system 920 itself had received frames 940 over its own NVMe interface. These packets can then be handled by processing system 920 for the particular storage transaction that are indicated by frames 940. For example, if frames 940 describe a write operation for SSDs managed by processing system 920, then data 984 is transferred for storage in associated storage drives by processing system 920.

Since frames 940 were originally received by processing system 910, portions of frames 940 can be transformed by processing system 920 to be handled by a protocol stack of processing system 920. The recipient peer/remote node, namely processing system 920, receives frames 940 and transforms portions of frames 940, such as NVMe frames, and re-builds the NVMe header to appear as if it was sent directly to the servicing node to prevent an NVMe stack of processing system 920 from rejecting frames 940. This transformation can include modifying an associated MAC addresses of frames 940, CRC values, destination network addresses, and other header properties. In other examples, processing system 920 does not transform the portions of frames 940 and instead inhibits rejection of frames 940 due to MAC address, CRC value, or destination network address mismatches.

In this manner, processing system 910 can receive NVMe frames for storage drives handled by another processing system 920. Processing system 910 inspects packet 940 and references table 991 to determine if to transfer frames 940 over the PCIe fabric to the correct processing system. Moreover, the frames are transferred into an NVMe layer 2 buffer of the correct processing system and the correct processing system handles the frames as if it had originally received the frames instead of the processing system that instead received the frames over a different network interface.

In specific examples, network driver software of a second processing system is modified to intake frames received at a first processing system as if it was received at that second processing system. Likewise, the driver software of the first processing system is also modified to transfer frames received by the first processing system for delivery into a network stack of the second processing system. The layer 2 driver software of the second processing system can receive an interrupt generated by the first processing system to indicate that new frames are waiting in an associated layer 2 buffer of the second processing system.

FIG. 10 is s diagram illustrating PCIe address space 1000, which can be employed for a PCIe fabric as discussed herein. PCIe address space 1000 is a $2^{64}$ bit address space associated with the PCIe address space of a PCIe switch fabric of a storage system. PCIe address space 1000 maps various ranges to buffers of particular processors or processing systems. Specifically, an address range is associated with a processing system, such as processing system 1 through N, among others. In a storage system, such that described in FIG. 1, a particular processor will manage and instantiate a particular subset of the total number of storage drives, but storage transactions can be received into any processor over an associated network interface. To enable load balancing and redundancy, each processor or processing system can include an associated network interface that can receive packets for storage transactions, including read and write transactions. If the packets received at a first processor are for storage drives not managed by the first processor, then these packets are transferred for handling by another processor.

To facilitate the transfer of the packets and associated data from one processor to another processor, PCIe address space 1000 is subdivided among the various processing systems. Each processing system in a storage system is assigned a particular quantity of storage drives, and thus is configured to intake packets and data addressed to a particular PCIe address range. A first processor transferring packets for delivery to another processor does not need to have knowledge of which exact processor is configured to handle the storage drives for the packets. Instead, the storage space of the entire storage system is divided among the various processors in the storage system, and each individual processor is configured to respond to only transactions directed to a specific address range of the PCIe address space. Thus, a storage system, such as storage system 100 in FIG. 1, can have a total storage space of $2^{64}$ bytes, or 16 exbibytes of byte-addressable memory.

When a first processor receives data packets for a storage operation, such as a read or write operation, the first processor determines if the storage address included in the data packets is for an address range managed by the first processor. If the data packets indicate a storage address managed by the first processor, then the first processor handles the storage operation, such as by transferring write data for storage in storage drives managed by the first processor or by initiating a read operation for storage drives managed by the first processor. If the data packets indicate a storage address managed by the second processor, then the first processor merely transfers the data packets to the address by the mapping to PCIe address space 1000. The particular processor configured to handle storage operations for those storage addresses indicated in the data packets will be configured to receive any data transferred to the associated PCIe address range, and responsively handle the storage operation for the storage drives managed by that particular processor. The first processor does not need to know which particular processor manages particular storage drives, and instead merely transfers the data packets for a storage transaction to a particular PCIe address which is automatically routed to the correct processor for further handling. From the viewpoint of the processor which receives the packets, the PCIe address space includes address ranges that it manages and address ranges it does not manage.

Moreover, each processor can have its address space sub-divided into buffer spaces for the other processors of the system. For example, processor 1 might have a first address range, but when processor 2 transfers data to processor 1, processor 2 uses its own identity as a hash into the address space of processor 1. In this manner, each processor's address space is segregated into sub-spaces that are each associated with another processor in the storage system.

In FIG. 10, PCIe address space 1000 is subdivided among the total number of processors in a storage system, such as in storage system 100 of FIG. 1. For example, if a storage system has 12 processors, then PCIe address space 1000 can be subdivided among the 12 processors. Other configurations are possible. PCIe address space 1000 can be equally subdivided, unequally subdivided, or a portion of PCIe address space 1000 can be subdivided, among other configurations. The total amount of PCIe address space utilized by a storage system can correspond to the total addressable storage space provided by the collection of storage drives employed. For example, if 2 terabytes of storage space is employed, then PCIe address space 1000 can have a maximum range corresponding to the 2 terabytes of storage space and each processor can have a corresponding sub-portion of that 2 terabytes of storage space allocated thereto. In yet other examples, the total amount of PCIe address space might not correspond to the total storage space of the storage system, and might be a smaller amount and used just for shuttling storage packets among the various processors for load balancing and failover fault handling. Of course, the load balancing and failover features can be employed in the example where PCIe address space 1000 is correlated to the total addressable storage space of the storage system.

For each processor address space in PCIe address space 1000, a further subdivision is performed. Specifically, processor 0 and processor 1 address spaces 1010-1011 are shown in FIG. 10. Processor 0 address space 1010 includes portions assigned to each other processor in a storage system, namely processor 1-N. Additionally, processor 0 address space 1010 includes a miscellaneous area that includes space for lock indicators, flags, and interrupts. These interrupts can be used to signal a receiving processor that data or packets are ready for handling. The lock and flag spaces can be used for handshaking, semaphoring, or other uses during data or packet transfer between processors.

In operation, if processor 0 desires to transfer packets to processor 1, then processor 0 will transfer the packets into the space allocated for processor 0 within address space 1011 of processor 1. These packets can be transferred over an associated PCIe fabric. Any appropriate interrupt or flags can be set by processor 0 in the interrupt/flag/lock space of processor 1 address space 1011. Processor 1 can detect that packets or other data is waiting in the address space for processor 0 and act accordingly, such as by initiating a storage transaction indicated by the packets transferred by processor 0 into the address space of processor 1.

As discussed herein, each processor of a storage system is configured to have visibility to all storage drives of a particular storage system, such as by using the memory mapped address spaces in FIG. 10. However, each processor does not manage all storage drives of a particular storage system, and instead only manages a subset of the total storage drives. The PCIe front end data plane is employed to exchange data and packets between processors and maintain visibility for each processor to each storage drive. A PCIe back end data plane is employed to transfer data to and from actual storage drives and the various managing processors. One or more PCIe switches form the PCIe back end data plane. An initialization process is performed for each processor of a storage system to allow each processor to manage the particular subset of the storage drives. Typically for a processor that manages storage drives, the processor performs a PCIe discovery process to find the storage drives connected via PCIe interfaces to the processor to initialize or enumerate those storage drives. In some examples, for storage drives not managed by a processor, initialization software spoofs the enumeration process for that processor so that processor thinks that the PCIe discovery process has found all storage drives in the storage system.

For example, a first processor, upon boot up or responsive to a reconfiguration process, performs a scan of any associated PCIe interfaces for devices that the first processor is to manage and enumerate. However, in a storage system such as that included in FIG. 1, many storage drives are included, and only a particular processor manages a subset of the total storage drives. The first processor is allowed to enumerate and initialize a subset of the storage drives that it is to manage. Similarly, other processors will enumerate and initialize different subsets of the storage drives. In this manner, each processor can access all storage drives via the PCIe front end data plane, but only physically manages a subset of the storage drives on the PCIe back end data plane. Thus, a large shared storage space can be provided using many different processors, with each processor only managing a small associated portion of the total storage space.

Normally, each processor will want to enumerate and initialize all the storage drives that each processor "sees" over the PCIe bus, which would include all the storage drives of a storage system since all storage drives are connected to all processors via a shared back end PCIe switch fabric, such as found in FIG. 1. By segregating a back end data plane initialization process for each processor, the storage drives can be allocated among the various processors even though a shared front end data plane PCIe address space is employed across all processors.

When a particular processor fails, then the storage drives managed by that particular processor can be re-assigned to another processor for managing storage transactions. An initialization process can be performed between the storage drives associated with the failed processor and the replacement processor to enumerate those storage drives with the replacement processor. The replacement processor is configured to handle transactions addressed to the failed processor's address space, in addition to any address spaces the replacement processor might have previously managed.

Figure 11:
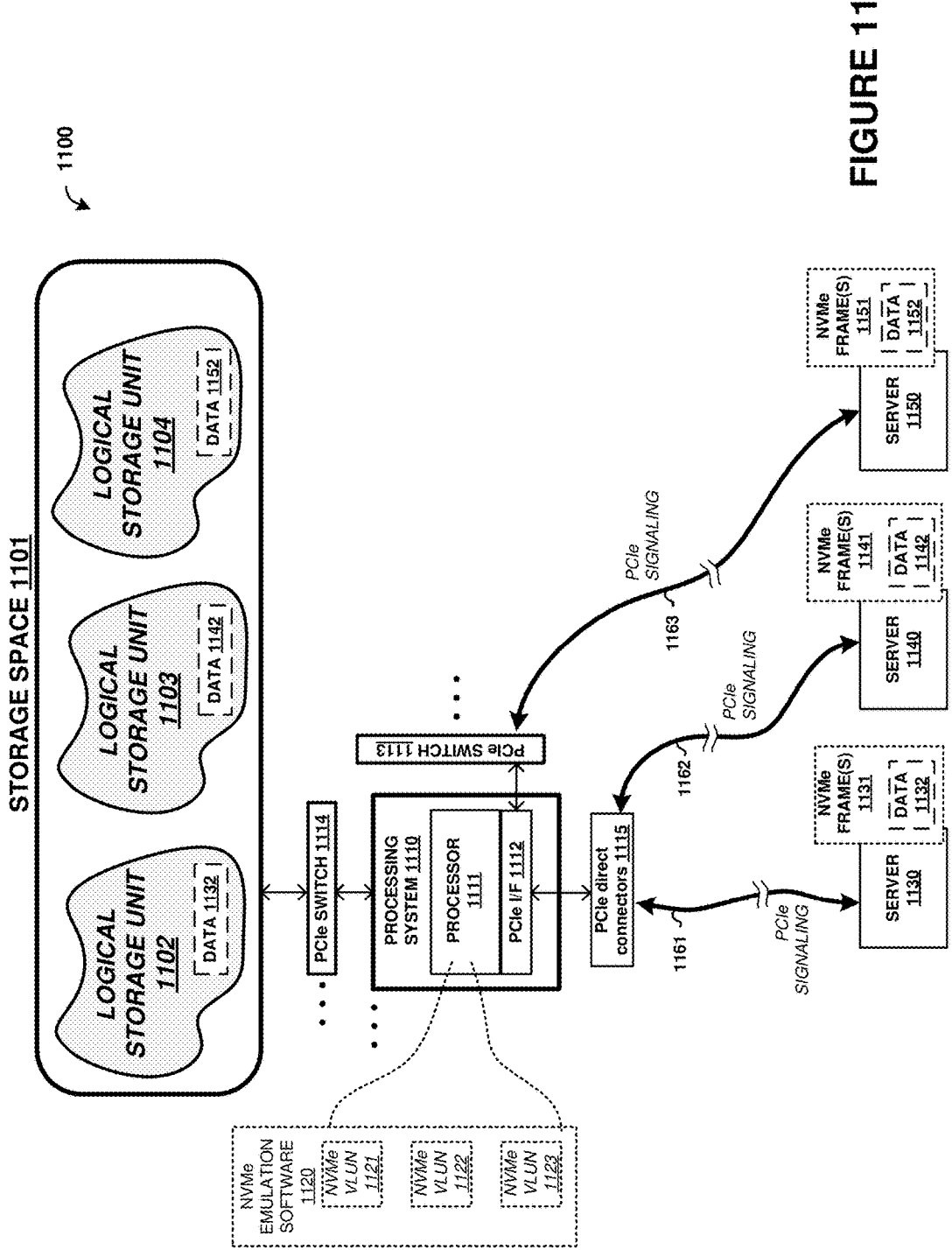
FIG. 11 is a system diagram illustrating a storage system.

As another example of presenting one or more NVMe targets over a PCIe interface, FIG. 11 is presented. FIG. 11 is a system diagram illustrating storage system 1100. Storage system 1100 includes storage space 1101 which comprises a plurality of storage drives contained on storage sleds, such as the storage drives on the storage sleds of FIG. 1. Storage space 1101 can be an example of a storage space defined over one or more storage sleds 110 of FIG. 1, although other configurations are possible. For example, storage space 1101 can be striped, spanned, mirrored, or parallelized over more than one storage sled 110. Storage sleds 110 of FIG. 1 can include more than one storage space. In this example, however, storage space 1101 is discussed. Storage space 1101 includes three logical storage units, such as logical storage units 1102-1104. These logical units can define a storage unit such as a VLUN, logical disk, among other logical storage arrangements. In this example, however, logical storage units 1102-1104 each represent an NVMe VLUN.

Turning now to the elements of FIG. 11, storage system 1100 also includes at least one processing system, namely processing system 1110. More than one processing system can be included, such as found in FIG. 1. Processing system 1110 includes at least one processor 1111 coupled to an associated PCIe interface 1112. PCIe interface 1112 can be coupled over an associated PCIe connectors 1115 or PCIe switch 1113 to external systems, such as servers 1130, 1140, and 1150. Processing system 1110 can also communicate with storage drives that comprise storage space 1101 over PCIe switch 1114. PCIe switch 1113 can comprise a front end data plane PCIe fabric, and PCIe switch 1114 can comprise a back end data plane PCIe fabric, although unified PCIe fabrics can be employed. PCIe switches 1113-1114 each comprise PCIe crosspoint switches that allow communication among the various elements of FIG. 11.

In operation, processing system 1110 can receive storage transactions from external systems over an external PCIe interface. Processing system 1110 presents the storage resources of storage system 1100 as one or more NVMe VLUNs. In the example of FIG. 11, a first VLUN is presented as VLUN 1121, a second VLUN is presented as VLUN 1122, and a third VLUN is presented as VLUN 1123.

NVMe emulation software 1120 is shown as performing the presentation and emulation of NVMe VLUNs over the PCIe interfaces of FIG. 11. NVMe emulation software 1120 can include an NVMe abstraction layer with advanced virtualization features to present one or more NVMe targets over one or more PCIe physical interfaces. NVMe emulation software 1120 includes generation and maintenance. NVMe emulation software 1120 includes advanced transaction queuing, Message Signaled Interrupts (MSI) for PCI (MSI-X) interrupt generation, error reporting, single root virtualization and sharing (SR-IOV), name spaces, hinting, power management features, and security features, among other features.

These VLUNs can be presented as an NVMe target, such as NVMe target A or NVMe target B in FIG. 1. An NVMe target can present the storage resources of storage system 1100 as a storage target, such as emulating a single storage drive, over a PCIe interface. In this manner, a plurality of storage drives that comprise storage space 1101 can be presented as a single NVMe target to an external system over PCIe interfaces. Processing system 1110 can receive NVMe storage transactions, such as NVMe frames, and handle these storage transactions for storage and retrieval of data within storage space 1101.

In a specific example, server 1130 is coupled over PCIe link 1161 using PCIe signaling with processing system 1110 over PCIe connectors 1115. A cable carrying PCIe signaling, such as a PCIe direct connect cable can be employed. Logical storage unit 1102 is presented as NVMe VLUN 1121 to server 1130 over PCIe link 1161. Server 1130 can mount this NVMe VLUN 1121 as a logical storage unit and use this storage space as a mass storage device for storing and retrieving data. Server 1130 can issue storage transactions, such as read and write transactions, over PCIe link 1161. These storage transactions can include one or more NVMe frames 1131 that indicate an address for data to be read or written (and may include data 1132 for write transactions). The address can include a logical block address or object identifier, among other addresses or data identifiers. Processing system 1110 receives these NVMe frames over PCIe link 1161 and handles the associated storage transactions. In a write example, data 1132 is stored in storage space 1101, specifically in logical storage unit 1102. Data 1132 can be striped across many storage drives or parallelized for storage among many storage drives that comprise storage space 1101.

In a second example, server 1140 is coupled over PCIe link 1162 using PCIe signaling with processing system 1110 over PCIe connectors 1115. A cable carrying PCIe signaling, such as a PCIe direct connect cable can be employed. Logical storage unit 1103 is presented as NVMe VLUN 1122 to server 1140 over PCIe link 1162. Server 1140 can mount this NVMe VLUN 1122 as a logical storage unit and use this storage space as a mass storage device for storing and retrieving data. In some examples, server 1140 assigns a drive letter to VLUN 1122. Server 1140 can issue storage transactions, such as read and write transactions, over PCIe link 1162. These storage transactions can include one or more NVMe frames 1141 that indicate an address for data to be read or written (and may include data 1142 for write transactions). The address can include a logical block address or object identifier, among other addresses or data identifiers. Processing system 1110 receives these NVMe frames over PCIe link 1162 and handles the associated storage transactions. In a write example, data 1142 is stored in storage space 1101, specifically in logical storage unit 1103. Data 1142 can be striped across many storage drives or parallelized for storage among many storage drives that comprise storage space 1101.

In a third example, server 1150 is coupled over PCIe link 1163 using PCIe signaling with processing system 1110 over PCIe switch 1113. External connectors and a cable carrying PCIe signaling, such as a PCIe direct connect cable can be employed. Logical storage unit 1104 is presented as NVMe VLUN 1123 to server 1150 over PCIe link 1163. Server 1150 can mount this NVMe VLUN 1123 as a logical storage unit and use this storage space as a mass storage device for storing and retrieving data. In some examples, server 1150 assigns a drive letter to VLUN 1123. Server 1150 can issue storage transactions, such as read and write transactions, over PCIe link 1163. These storage transactions can include one or more NVMe frames 1151 that indicate an address for data to be read or written (and may include data 1152 for write transactions). The address can include a logical block address or object identifier, among other addresses or data identifiers. Processing system 1110 receives these NVMe frames over PCIe link 1163 and handles the associated storage transactions. In a write example, data 1152 is stored in storage space 1101, specifically in logical storage unit 1104. Data 1152 can be striped across many storage drives or parallelized for storage among many storage drives that comprise storage space 1101.

FIG. 12 is a system diagram illustrating storage system 1200. Storage system 1200 includes storage space 1201 which comprises a plurality of storage drives contained on storage sleds. Storage space 1201 can be an example of a storage space defined over one or more of storage sleds 110 of FIG. 1, although other configurations are possible. Storage sleds 110 of FIG. 1 can include more than one storage space. In this example, however, storage space 1201 is discussed. Storage space 1201 includes one or more logical storage units, such as logical storage unit 1202. These logical units can define a storage unit such as a logical unit number (LUN), VLUN, logical disk, among other logical storage arrangements. In this example, however, logical storage unit 1202 represents an iSCSI LUN.

Some network storage protocols, such as iSCSI, allow for grouping of destination addresses into a logical unit. For example, iSCSI allows for portal groups which can associate more than one IP address with a single target. The target is a particular processor or particular network interface, even if that interface or processor has more than one network address associated therewith. However, FIG. 12 illustrates forming a logical grouping of destination addresses for a network storage protocol using a plurality of processors or processing nodes that share a common storage space spread over a plurality of storage devices. In FIG. 12, many processors can be included in a portal group, with each processor configured to receive network storage traffic for any of the other processors and route the traffic accordingly to the correct processor, even though a single iSCSI portal group is presented to an iSCSI initiator. In specific examples, a PCIe fabric is employed between many processors, network interfaces, and storage drives. These concepts can apply to network storage protocols other than iSCSI.

Turning now to the elements of FIG. 12, storage system 1200 also includes a plurality of processing systems, namely processing systems 1210, 1220, 1230, 1240, and 1250. Each of the processing systems is coupled to an associated network interface, namely network interfaces 1212, 1222, 1232, 1242, and 1252. Each network interface can be coupled over an associated PCIe bus or PCIe switch with the processing system, which can include communicating over PCIe switches 1260-1263. PCIe switches 1260-1263 comprise PCIe crosspoint switches that allow communication among the various processing systems. PCIe switches 1260-1263 comprise a front end data plane PCIe fabric. Each processing system can also communicate with storage drives that comprise storage space 1201 over ones of PCIe switches 1265-1269. PCIe switches 1265-1269 comprise a back end data plane PCIe fabric. As mentioned herein, in alternative examples a unified PCIe fabric can be employed which shares the same PCIe switches among the front end and back end data planes.

Storage space 1201 is comprised of a one or more storage drives and each processing system manages storage transactions for a subset of the plurality of storage drives. However, any processing system in storage system 1200 can receive a storage transaction from an external system over their associated network interface. Although each distinct network interface 1212, 1222, 1232, 1242, and 1252 has a different IP address associated therewith, all of these distinct network interfaces are grouped together into an iSCSI portal group. This iSCSI portal group is indicated in each processing system by IQN_7. IQN_7 is merely an example portal group designation, and other portal group designations can be employed. An iSCSI portal group can be used to associate more than one IP address with a single target-initiator relationship using the iSCSI protocol. This single target can be used to receive packets for storage transactions over any network interface 1212, 1222, 1232, 1242, and 1252. However, in this example, each network interface is associated with a different processing system.

To allow different processing systems to receive packets for iSCSI storage transactions but still have a shared storage space, namely LUN 1202, the following process can be employed. First, a plurality of processing systems, namely processing systems 1210, 1220, 1230, 1240, and 1250, are grouped into an iSCSI portal group, IQN_7, which identifies LUN 1202 as reachable over any of IP addresses 1270-1274. Each of IP addresses 1270-1274 are associated with a different network interface in system 1200. iSCSI initiator 1205 can reach LUN 1202 over any of IP addresses 1270-1274 using the portal group IQN_7. Each processing system 1210, 1220, 1230, 1240, and 1250 includes one or more central processing units (CPUs) 1211, 1221, 1231, 1241, and 1251, and is coupled over a front end data plane PCIe fabric comprising PCIe switches 1260-1263 and any associated PCIe links. If an iSCSI storage transaction is received over any network interface then the associated processing system can route the storage transaction for appropriate handling by another processing system using the front end data plane PCIe fabric. The appropriate processing system which ultimately receives the storage transaction then initiates a storage operation(s) with associated storage drives that comprise storage space 1201 over an associated back end data plane PCIe switch.

Advantageously, multiple independent processing systems (or processing nodes) can be employed within an iSCSI portal group. Any of these independent processing systems can receive an iSCSI storage transaction that the receiving processing system can handle if directed toward storage drives managed by the receiving processing system. Additionally, any of these independent processing systems can further transfer the iSCSI storage transaction to another processing system if the receiving processing system does not manage storage drives associated with the storage transaction. The storage transaction typically indicates a storage address, such as a write or read address, and this address can be used by the receiving processing system to determine if it should handle the storage transaction or if it should transfer the storage transaction to another processing system over the front end data plane PCIe fabric. A PCIe address space is employed to segregate storage within LUN 1202 among each processing system, and this PCIe address space is also employed to transfer the storage transactions among the various processing systems. Each processing system will have an associated address range of the PCIe address space to which it responds during transfer of storage transactions between processing systems. Thus, a single shared PCIe address space is employed over a PCIe fabric comprising PCIe switches 1260-1263 and associated PCIe links.

In a specific example, packets 1203 that include write data 1204 are transferred by iSCSI initiator 1205 for storage in LUN 1202. These packets 1203 are addressed to any of IP addresses 1270-1274 and directed to the portal group indicated by IQN_7. Whichever processing system of storage system 1200 receives packets 1203 then determines which processing system should actually manage the storage of write data 1204 into LUN 1202. The processing system that receives packets 1203 identifies a corresponding write address for write data 1204. This write address can be used to select which processing system should handle the storage transaction. Individual storage drives that comprise storage space 1201 and LUN 1202 are each enumerated and managed by specific processing systems. The PCIe address space can be correlated to an address space of LUN 1202 which can indicate which processing system shall handle the storage transaction. In a first example, the processing system that receives packets 1203 handles the write transaction because it identifies that it manages the storage drives associated with write data 1204. In this first example, the receiving processing system then initiates one or more writes indicated by packets 1203 to write data 1204 into LUN 1202. These one or more writes are performed over a PCIe switch and associated PCIe links included in the back end data plane of system 1200. In a second example, the processing system that receives packets 1203 does not handle the write transaction because it identifies that it does not manage the storage drives associated with write data 1204. The receiving processing system then identifies the processing system that should handle the write transaction and transfers packets 1203 over the front end data plane using associated PCIe switches and PCIe links of the front end data plane. Once the proper processing system receives packets 1203, then that processing system initiates one or more writes indicated by packets 1203 to write data 1204 into LUN 1202. These one or more writes are performed over a PCIe switch and associated PCIe links included in the back end data plane of system 1200.

Figure 13:
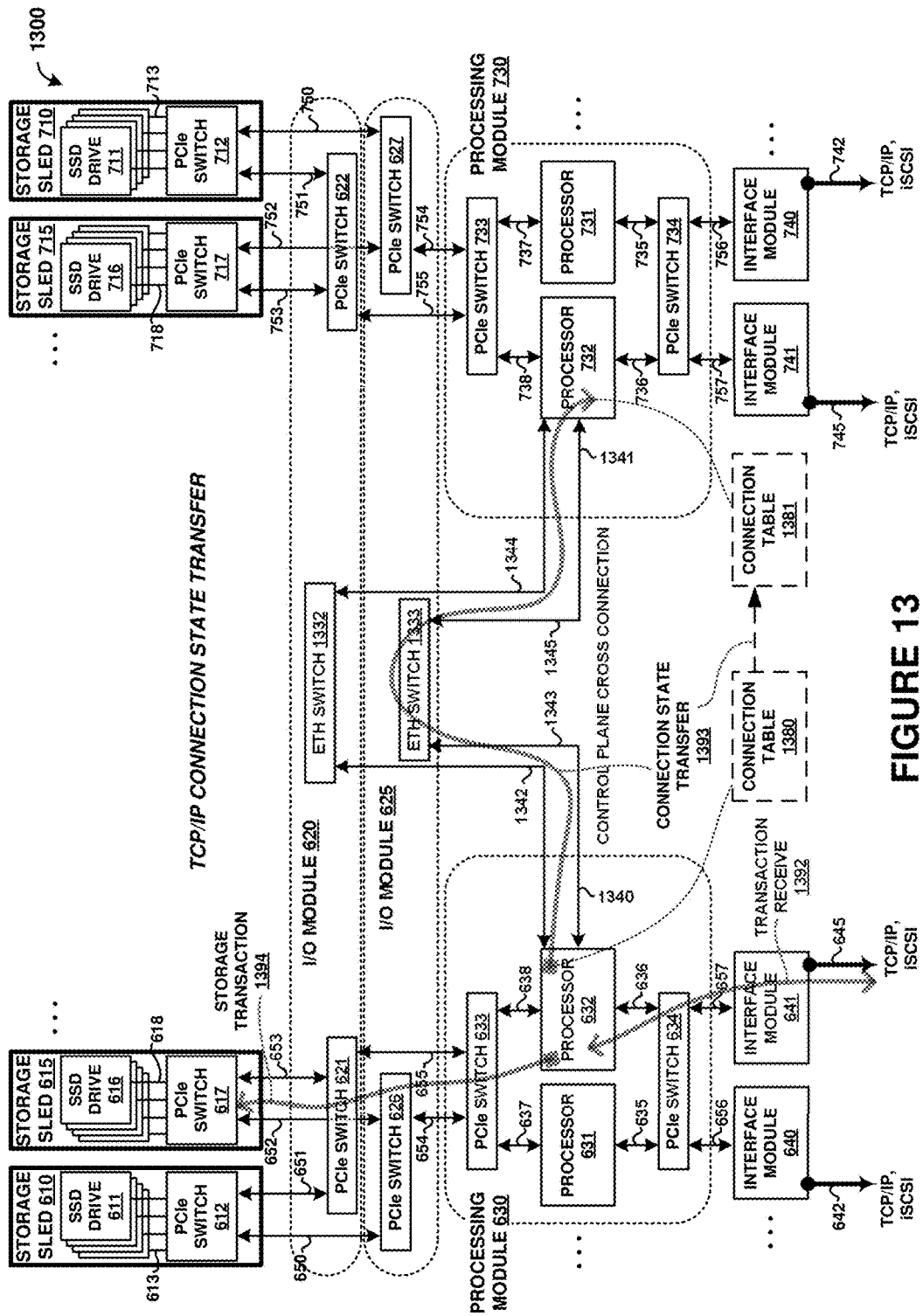
FIG. 13 is a system diagram illustrating a storage system.

FIG. 13 is a system diagram illustrating storage system 1300. FIG. 13 includes elements indicated in FIGS. 6, 7, and 8, as well as additional elements. FIG. 13 illustrates control plane cross connection between processing modules 630 and 730 over any of I/O module 620 and 625. As discussed above, a particular processor can manage a particular I/O sled or set of SSD drives. However, data packets related to storage transactions for a particular SSD drive can be received over any of interface modules 640, 641, 740, and 741. This configuration of multiple interface modules each communicating over various TCP/IP links allows for load balancing, highly parallelized receipt of transactions from external systems, and reception of traffic for any SSD drive over any network interface included in system 1300. A particular processor typically manages traffic for a particular SSD on a PCIe back end data plane, such as for read and write transactions to a particular storage sled, but storage transactions can be received over a network interface by any processor. The operations described in FIG. 13 are further detailed in FIGS. 14A and 14B, which will be discussed below.

Storage system 1300 includes storage sleds 610 and 615, I/O modules 620 and 625, processing module 630, interface modules 640-641, storage sleds 710 and 715, processing module 730, and interface modules 740-741. Storage sled 610 includes SSD drives 611 and PCIe switch 612. Storage sled 615 includes SSD drives 616 and PCIe switch 617. Storage sled 710 includes SSD drives 711 and PCIe switch 712. Storage sled 715 includes SSD drives 716 and PCIe switch 717. Although four storage sleds are included in FIG. 13, it should be understood that any number of storage sleds can be included. Also, although four SSD drives are included in each storage sled, it should be understood that any number of SSD drives can be included.

I/O module 620 includes PCIe switches 621-622, and I/O module 625 includes PCIe switches 626-627. Although two PCIe switches are shown for each I/O module in FIG. 13, it should be understood that any number can be included. Processing module 630 includes processors 631-632 and PCIe switches 633-634, and further elements can be included as discussed above. Processing module 730 includes processors 731-732 and PCIe switches 733-734, and further elements can be included as discussed above. Processor 632 communicates over Ethernet link 1340 with Ethernet switch 1333 and over Ethernet link 1342 with Ethernet switch 1332. Processor 732 communicates over Ethernet link 1341 with Ethernet switch 1333 and over Ethernet link 1344 with Ethernet switch 1332. Processor 631 and processor 731 also communicate over Ethernet switches 1332-1333, although associated links are omitted in FIG. 13 for clarity.

Interface module 640 communicates over at least two interfaces, namely a network interface 642 for TCP/IP or iSCSI traffic, and a processing module PCIe interface 656. Interface module 641 communicates over at least two interfaces, namely a network interface 645 for TCP/IP or iSCSI traffic, and a processing module PCIe interface 657. Interface module 740 communicates over at least two interfaces, namely a network interface 742 for TCP/IP or iSCSI traffic, and a processing module PCIe interface 756. Interface module 741 communicates over at least two interfaces, namely a network interface 745 for TCP/IP or iSCSI traffic, and a processing module PCIe interface 757.

Processing module 630 communicates with any of storage sleds 610, 615, 710, and 715 over PCIe links 654 and 655 which are switched through associated PCIe switches on associated I/O modules. Processing module 730 communicates with any of storage sleds 610, 615, 710, and 715 over PCIe links 754 and 755 which are switched through associated PCIe switches on associated I/O modules. Storage sled 610 communicates with different I/O modules over respective PCIe links 650-651. Storage sled 615 communicates with different I/O modules over respective PCIe links 652-653. Storage sled 710 communicates with different I/O modules over respective PCIe links 750-751. Storage sled 715 communicates with different I/O modules over respective PCIe links 752-753. The elements of FIG. 13 form a storage system with multiple redundant PCIe links between processing modules and storage sleds by way of I/O modules, such as those discussed herein.

The storage systems described herein include a switch fabric which is comprised of a plurality of PCIe switch elements along with associated PCIe links. This switch fabric can include any of the PCIe switches discussed herein, and can be partitioned into a back end data plane, a front end data plane, and a control plane. The control plane is employed to transfer management information, inter-processor control communications, among other control information. The back end data plane is employed to transfer data to and from storage sleds. The front end data plane is employed to transfer data to and from external interfaces and for transferring user data between processing modules. When multiple processors are employed, the switch fabric is preconfigured with a failover path. If the communications goes down for a particular processor, the hardware automatically switches over to another processor. Additionally, there is a management processor on each I/O module that can be instructed to dynamically change the PCIe paths as necessary. The same type of mechanisms that are employed for failover are used to form a redundant path for each of the components of the fabric.

In addition to the paths the hardware provides, there are also software-based additional layers of redundancy via frontend and backend routing. Processors within a storage system are aware of the current state of monitored processors and can determine additional routes to storage sleds as required. Hardware provides minimal latency reroutes for failover and redundancy. While software increase the levels of redundant paths that can be changed too. (i.e. when a hardware path fails software can set up the next path of redundancy for another failure event). There is a table included in each processor that tells it which SSD it owns normally and which it supports when there is a failover situation. In the event of a failover an interrupt is generated on the PCIe bus as it switches over. A discovery process of drive(s) assigned to the failed processor is initiated. This is followed by the processor populating discovered SSD(s) that match the failover table into its active table.

In operation, a specific processor of a processing module will be configured to manage or "own" specific SSD drives on various storage sleds. For example, processor 631 can be configured to manage SSD drives 611 of storage sled 610 while processor 632 can be configured to manage SSD drives 616 of storage sled 615. In another example, processor 731 can be configured to manage SSD drives 711 of storage sled 710 while processor 732 can be configured to manage SSD drives 716 of storage sled 715. Other combinations can be used, including a subset of SSD drives of a particular storage sled managed by a processor and the remaining SSD drives of that particular storage sled managed by another processor. Managing an SSD drive comprises a processor initializing the SSD drive and handling read, write, or other file or object transactions for the SSD drive. Each processor can reference a data structure stored on a non-transitory computer readable medium to determine which SSD drives are to be managed.

However, once a particular processor has been configured to manage a particular SSD drive, that processor might experience a failure or interruption in normal operation. Responsive to the failure of a processor, such as processor 631, another processor can be configured to take over management of the SSD drives previously managed by the failed processor 631. To take over management of the SSD drives previously managed by the failed processor 631, the other processor can initialize the SSD drives previously managed by the failed processor 631 and begin managing file operations, such as read and write operations, for those SSD drives. In another example, responsive to the failure of a processor, such as processor 631, another processor 732 on another processing module can be configured to take over management of the SSD drives previously managed by the failed processor 631. Processor 732 can initialize the SSD drives previously managed by the failed processor 631 and begin managing file operations, such as read and write operations, for those SSD drives. A processor can include a failover table which indicates SSD drives for which the processor manages in the event of a failure of another processor. A failover table can also indicate a processor or processors that a processor monitors to determine if any failures have occurred.

For example, processor 632 can monitor another processor, such as processor 631, using different methods. In a first example, processor 632 sends periodic messages to processor 631 and awaits response messages from processor 631. If the response messages fail to come within a predetermined amount of time, then processor 632 can determine that processor 631 has failed. The periodic messages can include probe packets sent through a network stack or stacks between processors, such as over a network interface that processor 631 and 632 can communicate. In another example, a set of registers or bits are maintained for processor 631 in processor 632 that are set or reset by processor 631. If a register or bit associated with processor 631 has not been properly set or reset within a predetermined amount of time, then processor 632 can determine that processor 631 has failed. Although two processors are shown in FIG. 13 as monitoring each other, in other examples a greater number of processors can be included. This greater number of processors can each be configured be monitored for failure by all other processors, by only one other processor (dual mode), or by two other processors (tri-mode). Any combination of monitored and monitoring processors can be employed.

Once a processor has been determine to have failed, the monitoring processor, such as processor 632, can be configured to initiate a restart, reboot, or power cycle of the failed processor. If the failed processor comes back online and functioning after the restart, reboot, or power cycle, then those SSD drives that were transitioned to the monitoring processor can be re-managed by the previously failed processor.

To handle incoming data packets originally intended for a failed processor, another processor can inherit network connection states from the failed processor, such as TCP/IP connections, and subsequently handle network traffic originally handled by the failed processor. On the front end (TCP/IP stack on each operating system (OS)), connected external iSCSI clients seamlessly migrate to the new owning node. This migration does not require a disconnect and reconnect. From the front end point of view, each iSCSI connection when the client initiates the TCP connection (3-way handshake), OS enhancements to the TCP stack include propagating the connection state (i.e. the source/destination IP address and the source/destination port ID) to all the processing modules in the cluster. The processing modules in the cluster then spoof their local TCP/IP stacks by creating connected socket on their local stacks as well. These sockets are created and ready but never used until failover. When the node failover event is initiated in addition to all the steps described earlier, the node that is assuming ownership of the TCP connections enables the pre-connected client connections that were previously connected to the crashed node. Further details on this process are described below in FIGS. 13-15.

In other examples, an operating system backend software invalidates layer-2 (Ethernet) routing table entries pointing to the crashed node and generates new layer-2 (Ethernet) routing tables entries that point to the new owning peer as the destination for IOs that access the SSDs/LBAs contained on the transferred SSDs. These tables are propagated to all the nodes in the cluster. Incoming iSCSI IOs now are routed correctly at layer-2 to the new owning node.

As a specific example, FIG. 13 illustrates one example failover process. In FIG. 13, a network connection is established between processor 632 and an external iSCSI node, such as an end user device or other computer system. The network connection is typically defined by at least a network address and a network port for each endpoint, such as an IP address and port of a network interface card of interface module 641 and the external iSCSI node. The network connection can be referred to as a "socket" in some examples. Once this network connection is established, processor 632 places information regarding the network connection in a data structure, such as connection table 1380. Connection table 1380 can list several network connections that processor 632 is handling. The network connection can be used to handle storage transactions, such as storage transaction 1394, between the external iSCSI node and a storage drive, such as found on storage sled 610.

Responsive to establishing the network connection, processor 632 also propagates information about the network connection to further processing modules or processors in system 1300. For example, connection state transfer 1393 indicates a transfer of connection information from connection table 1380 to processor 732 over Ethernet control plane links 1340-1344 in FIG. 13. Processor 732 can store this connection information in connection table 1381, in addition to other connection information received from other processors or processing modules.

If processor 632 operates normally, then storage transactions for the associated network connection are handled by processor 632. However, if processor 632 becomes unresponsive, such as due to a failure, hang, or other problem, then another processor can inherit the network connection originally established by processor 632. For example, processor 732 can be configured to monitor processor 632, as described above, and determine when processor 632 has failed. Responsive to the failure of processor 632, processor 732 can inherit any TCP/IP connections with external iSCSI nodes and subsequently handle any storage transactions initiated by those external iSCSI nodes. These storage transactions can be for storage drives, such as found on storage sled 615, that were originally managed by processor 632. Thus, processor 732 can assume management of associated storage drives on storage sled 615 and handle subsequent storage transactions for those storage drives, in addition to any storage drives that processor 732 might already be managing.

Figure 14A:
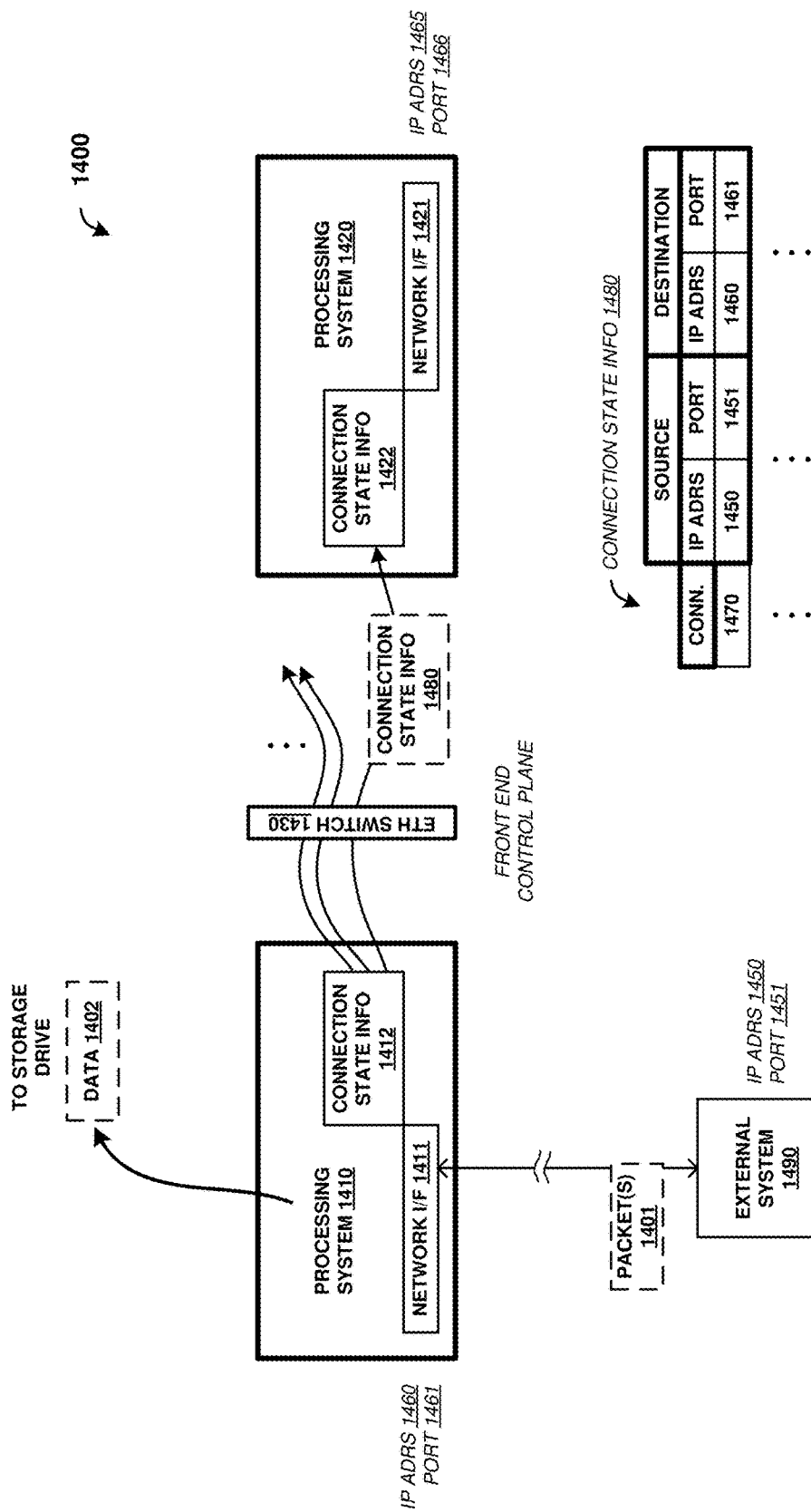
FIG. 14A is a system diagram illustrating a storage system.
Figure 14B:
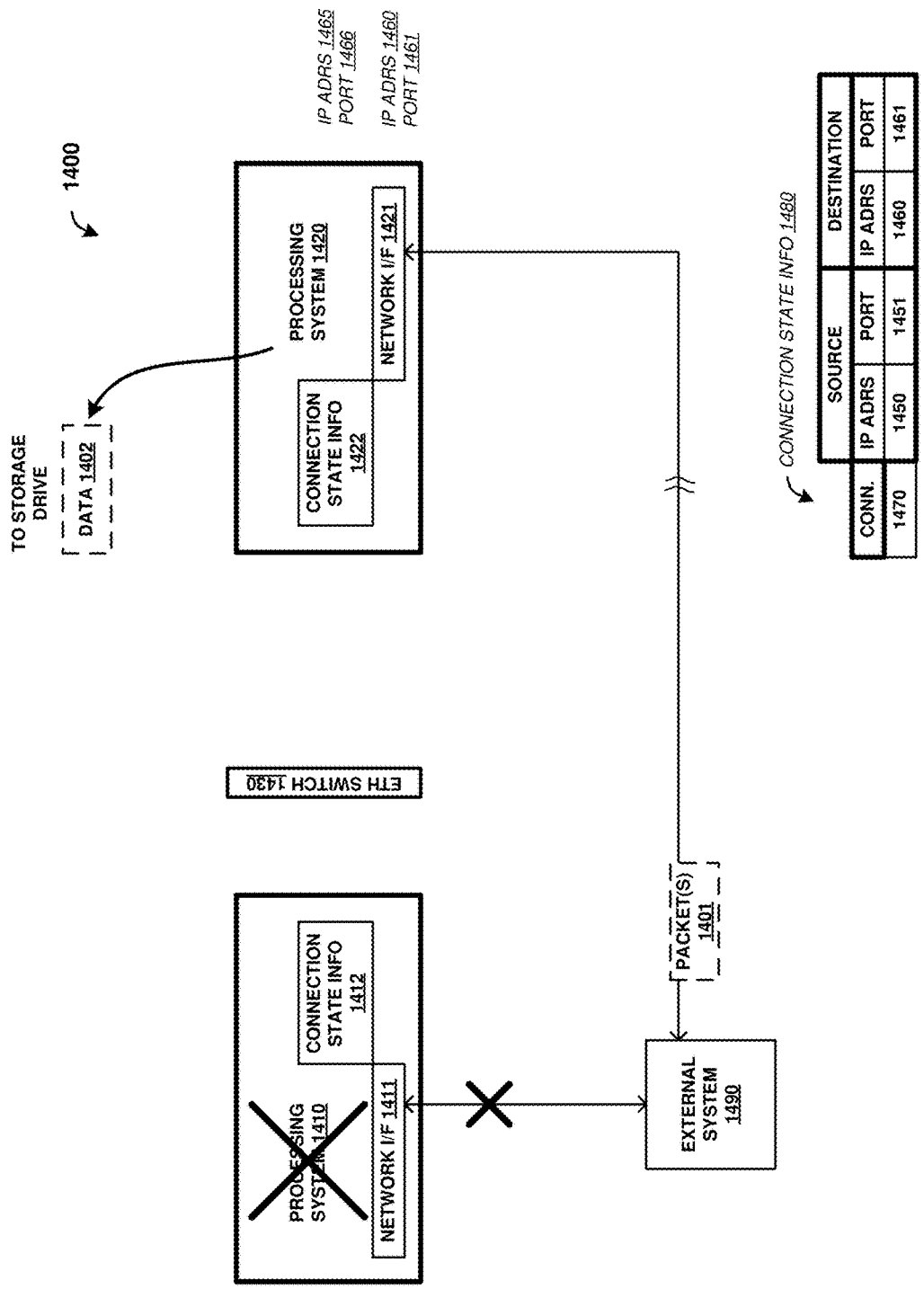
FIG. 14B is a system diagram illustrating a storage system.
Figure 15:
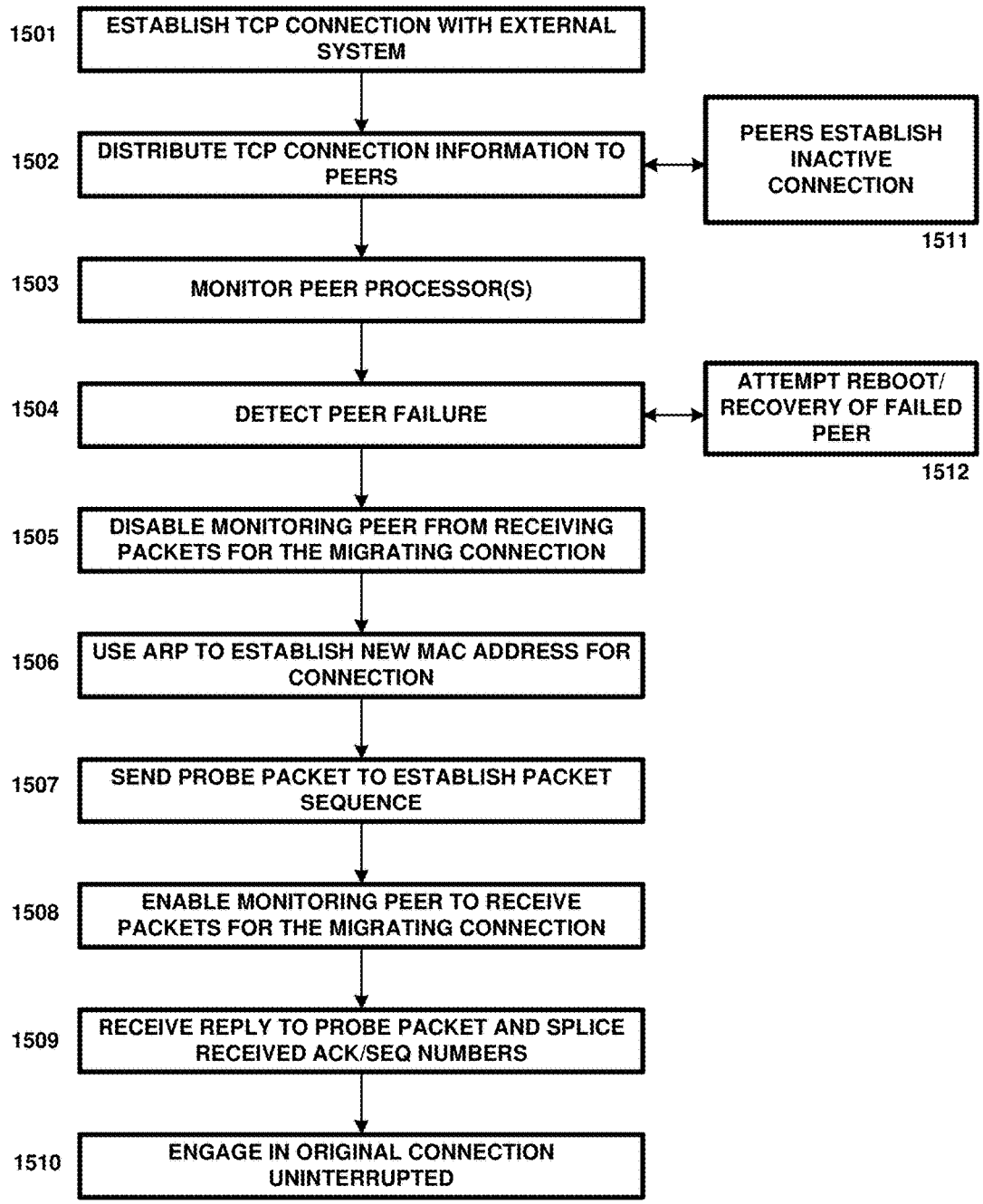
FIG. 15 is a flow diagram illustrating operation of a storage system.

As further examples of TCP/IP connections state failover from one processor to another, FIGS. 14A, 14B, and 15 are presented. FIGS. 14A and 14B are system diagrams illustrating system 1400, which can include common elements as found in FIG. 13, although variations are possible. FIG. 15 is a flow diagram illustrating a method of operating system 1400. The operations of FIG. 15 are referenced below parenthetically.

System 1400 includes processing system 1410, external system 1490, processing system 1420, and Ethernet switch 1430. Processing system 1410 includes network interface 1411 and connection state information 1412. Processing system 1420 includes network interface 1421 and connection state information 1422. Processing system 1410 and 1420 can include further elements, such as the processors, storage systems, software, and other elements described herein for processors and processing modules. Network interfaces 1411 and 1421 include network interface equipment and transceivers, along with any associated software drives and protocol stacks, such as TCP/IP stacks.

In operation, processing system 1410 establishes a network connection 1470 with external system 1490 over a packet network link (1501). The network connection can comprise a TCP/IP connection, which can transport storage transactions and information related to further protocols, such as iSCSI. Processing system 1410 establishes the network connection using at least network interface 1411, which in this example has at least one associated IP address and port for the network connection, namely IP address 1460 and port 1461. External system 1490 has at least one associated IP address and port for the network connection, namely IP Address 1450 and port 1451. Processing system 1410 records network connection information for the network connection established between processing system 1410 and external system 1490, which indicates a combination of the IP addresses and ports. Processing system 1410 can store the network connection information in a data structure, such as connection state information 1412. This network connection information is indicated in connection state information table 1480. Table 1480 lists network connection 1470 as comprising source IP address and port 1450, 1451, and destination IP address and port 1460, 1461. Different combinations of this information can be used to represent the network connection, along with additional or different information.

Processing system 1410 also propagates or distributes information describing network connection 1470, such as that found in table 1480, to other processing systems in system 300 (1502). These other processing systems are referred to as monitoring peers, and can include one or more processors. Typically, 2-3 processors are employed as peers to any other processor, although variations are possible, including up to 'n' processors. Processing system 1410 propagates this network connection information over a control plane, which comprises at least Ethernet switch 1430 along with any associated Ethernet links. Although only processing system 1420 is shown as an additional processing system, it should be understood that many processing modules or processing systems can be included, such as found in FIG. 13. Connection state information 1480 is received by processing system 1420 and stored in a data structure, such as connection state information 1422. Further processing systems can receive and store this connection state information. In this example, processing system 1420 or network interface 1421 are associated with at least network address 1465 and port 1466.

Peer processing system 1420 establishes an inactive network connection which is identical to the connection 1470 established by processing system 1410, namely the connection or socket between processing system 1410 and external system 1490 (1511). However, processing system 1420 maintains this network connection as an 'idle' or 'inactive' connection and does not direct any network traffic over this connection. Further processing systems can also establish these identical sockets or connections. Only processing system 1410 directs network traffic over this connection, at least until processing system 1410 fails.

External system 1490 can initiate storage transactions, such as reads and writes, for data stored in associate storage drives. Packets 1401 represent these storage transactions, and can indicate storage addresses, write data, and other information. Processing system 1410 manages one or more storage drives and transfers or receives data 1402 to/from these storage drives, such as over PCIe interfaces to/from storage sleds as found in FIG. 13.

In FIGS. 14A and 14B, processing system 1420 monitors processing system 1410 (1503). In this example, processing system 1420 is a monitoring peer of processing system 1410. Processing system 1420 can detect when processing system 1410 has hung or otherwise failed (1504), and processing system 1420 can inherit network connection 1470 originally established and managed by processing system 1410. First, processing system 1420 disables any receipt of packets for connection 1470 established by processing system 1410 (1505). Specifically, processing system 1420 does not pass any packets for connection 1470 up a network stack. These packets can be dropped and not responded to, and any packets received by an associated IP stack of processing system 1420 for connection 1470 are dropped.

A MAC address associated with processing system 1420 is established to be associated with the inherited connection (1506). An ARP message is broadcast over the subnet of processing system 1420 to associate IP address 1460 of the crashed node (processing system 1410) with a MAC address of processing system 1420. In network systems employing the IP protocol, an Address Resolution Protocol (ARP) messages can be used to resolve an IP address into an associated Media Access Control (MAC) address. Network routers and other network nodes can employ an ARP table that lists relationships between IP addresses and MAC addresses. The IP addresses typically represent layer-3 addresses, while the MAC addresses typically represent layer-2 addresses, such as Ethernet.

A probe packet is sent by processing system 1420 for delivery to external system 1490 to establish correct acknowledge and sequence (ack/seq) counts for the packets associated with the inherited connection (1507), and this probe packet process is described below in more detail. The probe packet can include zeroed out counts in acknowledge and sequence portions of the TCP header. TCP operation includes "stateful" operation, where a current packet state is maintained by the endpoints of a TCP network connection. The TCP state includes address and port information for each endpoint as well as packet counters for traffic exchanged between the endpoints to guarantee missing packets are accounted for and resent. In the examples discussed herein, TCP state is maintained even when one of the endpoints fails, namely a processor or network interface handling the connection. Upon initiation of a stateful TCP network connection, various packet counters are set to an initial value, such a '0' and each subsequent packet exchanged increments the counters by one. These counters are embedded in headers of the associated TCP packets, and separate counters might be included for a "packet" number and an "acknowledgement received" number. If an endpoint notices that the packet counter is out of sequence with the acknowledgement sequence, such as when a packet is dropped or missing, then a packet resend process is initiated which ensures that missing packets are properly delivered between the endpoints.

Advantageously, instead a peer processing system keeping track of the state ack/seq counts for connection 1470 that can change quickly during a communication session, the probe packet allows for derivation of the ack/seq state information from external system 1490 at the time of the failover from processing system 1410 to processing system 1420. The ack/seq state information need not be stored or maintained by a peer processing system during the time when connection 1470 is active on processing system 1410.

When a new processing system, such as processing system 1420, attempts to take over or inherit a network connection from a failed processing system, such as processing system 1410, processing system 1420 might not have all the needed information to resume communications. For example, although processing system 1420 might have recorded the network connection state information 1480, which includes IP address and port numbers for connection 1470, processing system 1420 does not know a current packet count or packet counter information for the network connection between processing system 1410 and external system 1490. Responsive to processing system 1410 failing, processing system 1420 can send an acknowledgement (ACK) packet for delivery to external system 1490 with a nonsense counter value, such as '0'. This ACK packet can be referred to as a 'probe' packet.

Processing system 1420, i.e. the monitoring peer, enables receipt and processing of packets received for connection 1470 (1508). External system 1490 receives the probe packet and detects that the associated packet counter is out of sequence or has incorrect numbers, and responsively transfers the connection state, including current values of the packet and acknowledgement counters, in a response packet. External system 1490 responds to the probe packet with correct acknowledge and sequence counts (1509). Responsively, processing system 1420 splices the received ack/seq counts into status information for connection 1470 and used for subsequent communications over connection 1470 with external system 1490.

Once processing system 1420 has inherited the network connection originally established between processing system 1410 and external system 1490, then processing system 1420 can begin handling storage transactions for that network connection without interrupting, breaking, ending, or restarting that network connection (1510). Specifically, processing system 1420 can continue to receive packets 1401 for storage transactions originally handled by processing system 1410, such as for storage transactions related to data 1402 and storage drives originally managed by processing system 1410. Processing system 1420 can assume IP address 1460 and port 1461 from failed processing system 1410. Processing system 1420 can resume transfer of packets 1401 with external system 1490 as if processing system 1420 was processing system 1410, and seamlessly inherits the network connection of failed processing system 1410. All subsequent iSCSI traffic for connection 1470 now flows to the processing node 1420.

During the failure of processing system 1410, peer processing system 1420 can attempt a reboot of processing system 1410 (1512) to attempt to recover operation of processing system 1410. If processing system 1410 recovers, then processing system 1420 can either keep the current connection that was failed over to processing system 1420 from processing system 1410, or processing system 1420 can transfer that connection back to processing system 1410.

FIG. 16 is a system diagram illustrating storage system 1600. Storage system 1600 illustrates several storage enclosures stacked vertically, such as in a rackmount enclosure system. In some examples, the storage enclosures comprise 3U sized rackmount enclosures, although other sizes can be employed. Any number of storage enclosures can be included, and further storage enclosures can be included in other non-vertically stacked configurations or in a plurality of rack mount enclosures.

System 1600 includes four example storage enclosures, namely 1610, 1620, 1630, and 1640. Each storage enclosure comprises a storage system, such as described in FIG. 1 and FIG. 2 above. Two I/O modules are shown per storage enclosure, which can each comprise I/O modules as found in FIGS. 1-3. Each I/O module includes at least four external connectors that can be used to interconnect I/O modules of other storage enclosures. For example, storage enclosure 1610 includes two I/O modules 1611. These I/O modules can be user-insertable into the respective storage enclosure, such as by sliding in and out of an associated midplane connector and mounting system.

The external cluster interconnect for PCIe front end data plane communications is provided by a plurality of mini serial attached SCSI (SAS) connectors 1612, such as the four mini-SAS connectors 1612 shown per I/O module. These mini-SAS connectors can comprise mini-SAS jacks. Cabling comprises SAS cabling 1613 which can include associated shielding, wiring, sheathing, and termination connectors. The external cluster interconnect for Ethernet control plane communications is provided by a plurality of Ethernet connectors 1614 and associated Ethernet cabling 1615. These Ethernet cables 1615 can be directly connected between storage enclosures or can be routed to a central Ethernet switch, not shown in FIG. 16.

In this example, each front end data plane cluster interconnect connector and cable do not carry SAS signaling. Instead, these components carry PCIe signaling between crosspoint switches of each associated I/O module. Thus, each storage enclosure intercommunicates over PCIe signaling carried over mini-SAS connectors and mini-SAS cabling. In this example, ×16 PCIe signaling is employed, although other PCIe widths can be employed. Since eight ×16 PCIe signaling pathways are employed per storage enclosure, then 128 lanes of PCIe signaling are provided for each storage enclosure. This can lead to at least 32 petabytes of addressable storage space with 32 terabytes per second of throughput. Additionally, no centralized switching elements, such as Ethernet switches, are required in this front end data plane PCIe cluster interconnect, and traffic for each storage enclosure forms a system-wide "fabric" over which the various elements of the cluster can communicate.

Any processor in the cluster can receive packets over an associated external interface, such as TCP/IP, for storage transactions that involve any storage drive in any storage enclosure. A receiving processor can route these packets over the PCIe fabric to a managing processor that manages a specific set of storage drives. The entire cluster comprising system 1600 can be presented as a single storage entity, such as logical storage unit, and by using the cluster-wide PCIe fabric any processor has memory mapped visibility to any storage drive in the entire cluster. To route storage transactions to any other processor, a receiving processor can perform a PCIe transaction to a memory location that is associated with managing processor, even if the managing processor is external to the storage enclosure of the receiving processor and is associated with different I/O modules of that other storage enclosure. Traffic is automatically routed over the PCIe fabric by the associated crosspoint switches of the associated I/O modules and any external PCIe links to be handled by the appropriate processor. Each processor of the cluster includes a routing table of that indicates which address is associated with a specific storage location of the entire logical storage unit of the cluster.

For example, a first processor of storage enclosure 1610 receives a write transaction over an associated network interface from an end user device. This first processor checks a routing table associated with the first processor to identify a PCIe address associated with the write transaction. The write transaction can indicate a storage address for the write transaction, which can include a storage address of a logical storage unit presented by system 1600 to the end user, such as an iSCSI storage device presented over one or more network interfaces. The first processor can then transfer the storage transaction to the PCIe address associated with the write transaction. The PCIe fabric in this example includes multiple storage enclosures, and thus the PCIe address can be associated with any processor in system 1600, such as a second processor included in storage enclosure 1620. I/O modules of enclosure 1610 and enclosure 1620 handle the PCIe transaction to ensure that the second processor receives the storage transaction. Once the second processor receives the storage transaction, the second processor determines that it handles storage transactions for the particular storage drives indicated by the storage transaction and writes associated data to storage drives to complete the storage transaction. In this manner, any storage transaction can be received by any processor in the cluster formed by system 1600 and the receiving processor can deliver that storage transaction to another processor across the cluster that manages the storage drives associated with the storage transaction. The mini-SAS connectors and cabling are employed to carry PCIe signaling between I/O modules of the various storage enclosures.

Figure 17:
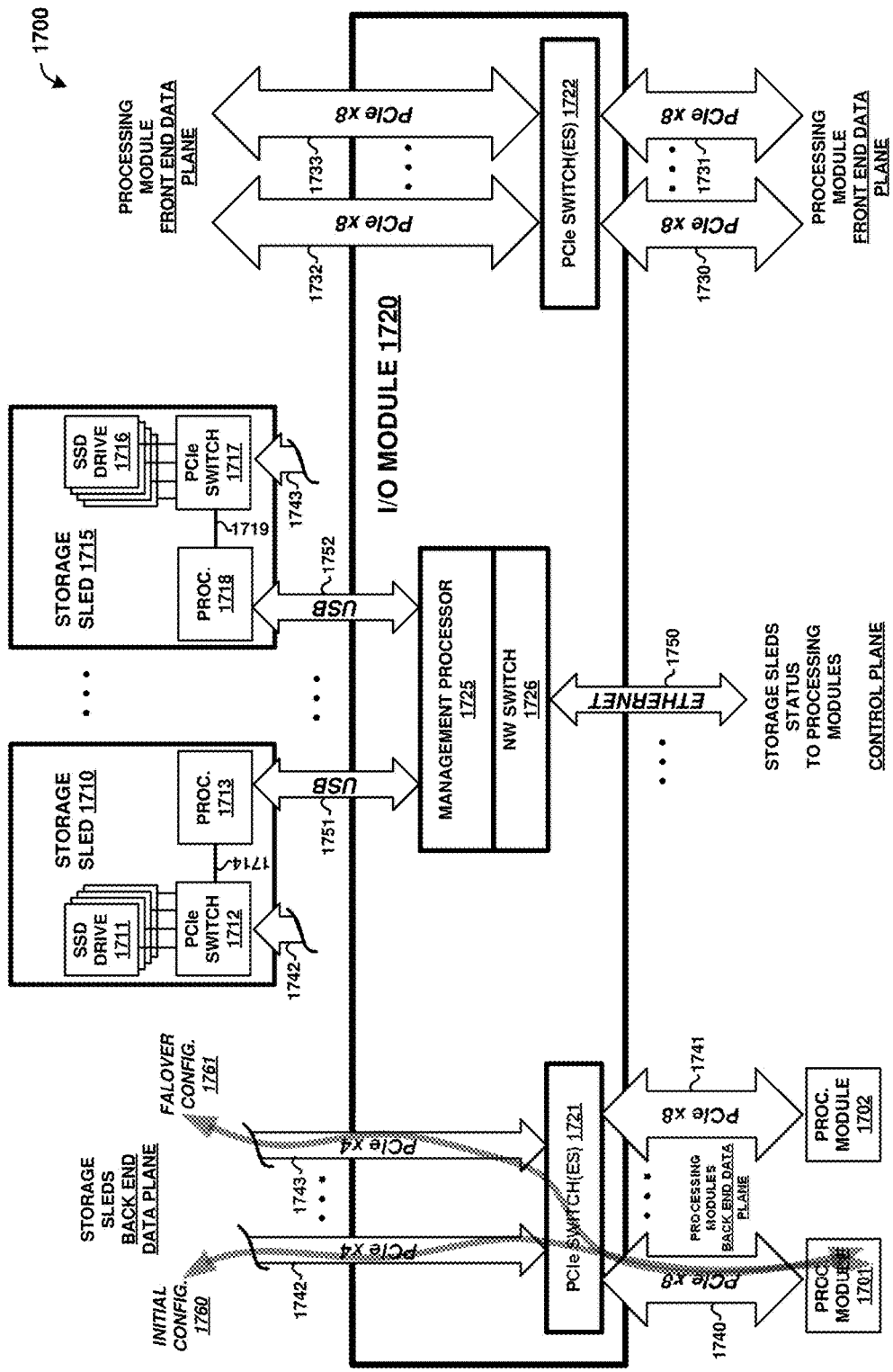
FIG. 17 is a system diagram illustrating a storage system.

To further illustrate the back end data plane of the storage systems discussed herein, FIG. 17 is presented. FIG. 17 is a system diagram illustrating storage system 1700. Storage system 1700 includes many elements of a storage system as described in the many examples herein. However, storage system 1700 focuses on the management and identification of the various storage sleds in a processing system, such as storage sleds 1710 and 1715, among others. Management processor 1725, network switch 1726, and PCIe switches 1721-1722 are included in I/O module 1720. Management processor 1725 communicates with storage sleds over associated USB interfaces, namely USB interfaces 1751 and 1752. Management processor 1725 communicates with the various processing systems or processing nodes of a storage system over Ethernet bus 1750, which can include network switch 1726. This USB/Ethernet communication system allows for initialization, control, and status reporting of the various storage sleds to any processor or processing node of a storage system. The USB/I2C/Ethernet interfaces described in FIG. 17 can comprise the various "sideband" interfaces discussed herein for management and monitoring of the various storage sleds in a storage system by the main processors or processing nodes of a storage system.

For example, any of the processors or processing nodes of FIG. 17 can receive status information above any of the storage sleds over this Ethernet bus 1750. Management processor 1725 monitors and collects status information, operating statistics, among other information for each storage sled over USB interfaces. Each storage sled includes at least one processor (1713, 1718) which can be accessed by management processor 1725 over the associated USB interface.

Each processor on a storage sled can interface with an associated PCIe switch (1712, 1717) to receive operating statistics, status information, or operating conditions, among other information. This information collected on each storage sled can be further accumulated in one or more I/O modules by an associated processor on the I/O module, such as management processor 1725. This information can be stored in computer-readable memory elements associated with management processor 1725. The information about each storage sled can be accumulated by one or more I/O modules for redundancy, failover protection, and load balancing in a storage system. The processor on the storage sleds can interface with the associated PCIe switch of the storage sled via I2C interfaces, among other register-based interfaces. Each PCIe switch can include externally accessible information and registers which can be accessed and modified over an associated interface, such as interfaces 1714 and 1719 in FIG. 17. Interfaces 1714 and 1719 can comprise I2C interfaces, among other interfaces.

As a storage system operates, usage statistics among other information is monitored by a storage sled processor and transferred or requested by a further processor on any I/O module. This usage information can be further transferred or requested by main processing modules or processors over Ethernet bus 1750 which can be used to alter or modify operation of the storage system or for usage statistics monitoring and reporting to other external systems.

In addition to monitoring of status information and operational statistics of a storage system, the sideband interfaces described in FIG. 17 can be used for initialization of the various storage sleds of a storage system, among other initialization features. Specifically, upon power up of a storage system, such as storage system 1700, management processor 1725 can assign unique identifiers to each storage sled over the associated USB interfaces. These unique identifiers can be used to identify each storage sled for retrieval of status information and operational statistics by main processors. These identifiers can be reported to the main processors over Ethernet bus 1750. The identifiers can comprise 16-bit identifiers which are used in combination or alternatively to any 64-bit PCIe identifiers for the storage sleds. These identifiers can correspond to a physical location of a storage sled, such as physical slots on a backplane or midplane, among other physical locations within a storage unit.

Now, the initialization process for the back end data plane will be discussed. Each processor, such as the various processing modules discussed herein, only manages a certain number of storage drives, such as storage drives 1711 and 1715, found on a storage sled. The PCIe switches 1721 and 1722 employed herein can establish segregated connectivity between a particular processor and a storage sled using associated PCIe links 1740-1743 and 1730-1733. For example, processing module 1701 of FIG. 17 can be initially configured by PCIe switches 1721 to communicate with storage sled 1710 over PCIe links 1740 and 1742. Likewise, processing module 1702 of FIG. 17 can be initially configured by PCIe switches 1721 to communicate with storage sled 1715 over PCIe links 1741 and 1743. If processing module 1702 fails or becomes unresponsive, then PCIe switches 1721 can be configured to fail over connectivity for storage sled 1715 to processing module 1701, or another processing module. This can be seen in FIG. 17 as initial configuration 1760 and failover configuration 1761 for processing module 1701.

PCIe switches 1721 can be managed by management processor 1725, such as over a management interface which can comprise I2C, an EEPROM interface, serial interface, parallel bus, or other interfaces. Upon power up of a storage system, such as system 1700, management processor 1725 can ensure that PCIe switches 1721 do not provide connectivity between any processing modules and any storage sleds. Management processor 1725 can selectively power up individual PCIe switches (such as when many are employed as found in FIG. 1) and scan for attached storage sleds. Alternatively, management processor 1725 can scan for attached storage sleds by powering on selective identification circuitry on each storage sled. In yet other examples, each storage sled contains a pull-up pin which indicates when an associated storage sled has been inserted into a midplane connector. Management processor 1725 can detect which storage sleds are present and establish connectivity between various processing modules and various storage sleds using PCIe switches 1721.

In some examples, a failover event is accompanied by a reprogramming of registers or configuration parameters within PCIe switches 1721, and management processor 1725 can be configured to perform this reprogramming. Management processor 1725 can be also instructed by any processing module, such as processing modules 1701 or 1702 over Ethernet interface 1750 to change or alter the PCIe connectivity between processing modules and storage sleds.

In another example, ones of PCIe switches 1721 can be initially programmed for a power-up or 'default' configuration that establishes connectivity between various PCIe interfaces handled by each of PCIe switches 1721. A failover configuration can also be pre-established by management processor 1725. In the event of a detected failure of a processing module, management processor 1725 can establish the failover configuration. The failover and default configurations can be maintained in a data structure, such as a table, in a storage element associated with management processor 1725. The failover configuration can be established in PCIe switches by changing registers or configuration information of an associated PCIe switch over an I2C interface. A reboot of the associated PCIe switch may be required in some examples. Once the failover connectivity is established, then the processing module which has been newly connected to the storage sled can perform an initialization process with the storage drives on the storage sled, such as by performing a PCIe enumeration process.

During a boot up process for the entire storage system, management processor 1725 can be configured to detect all storage drives and storage sleds in the storage system and report this information to each processing module of the system over Ethernet interface 1750. Each processing module, alone or in concert, can be configured to establish which storage sleds will be apportioned to which processing module. Management processor 1725 can receive instructions from one or more processing modules to establish a desired connectivity between ones of the storage sleds and ones of the processing modules using the configurable PCIe interfaces discussed above.

Each storage sled, or each storage drive on the storage sleds, can be identified by a unique identifier by management processor 1725 for use in identification of particular storage sleds by each processing module. For example, if a storage system has 0-47 storage sleds, then each storage sled can have a unique identifier assigned by management processor 1725 during power up. Any communications between management processor 1725 and the various processing modules that need to identify a storage sled can employ these unique identifiers, such as control plane communications over Ethernet interface 1750.

Figure 18:
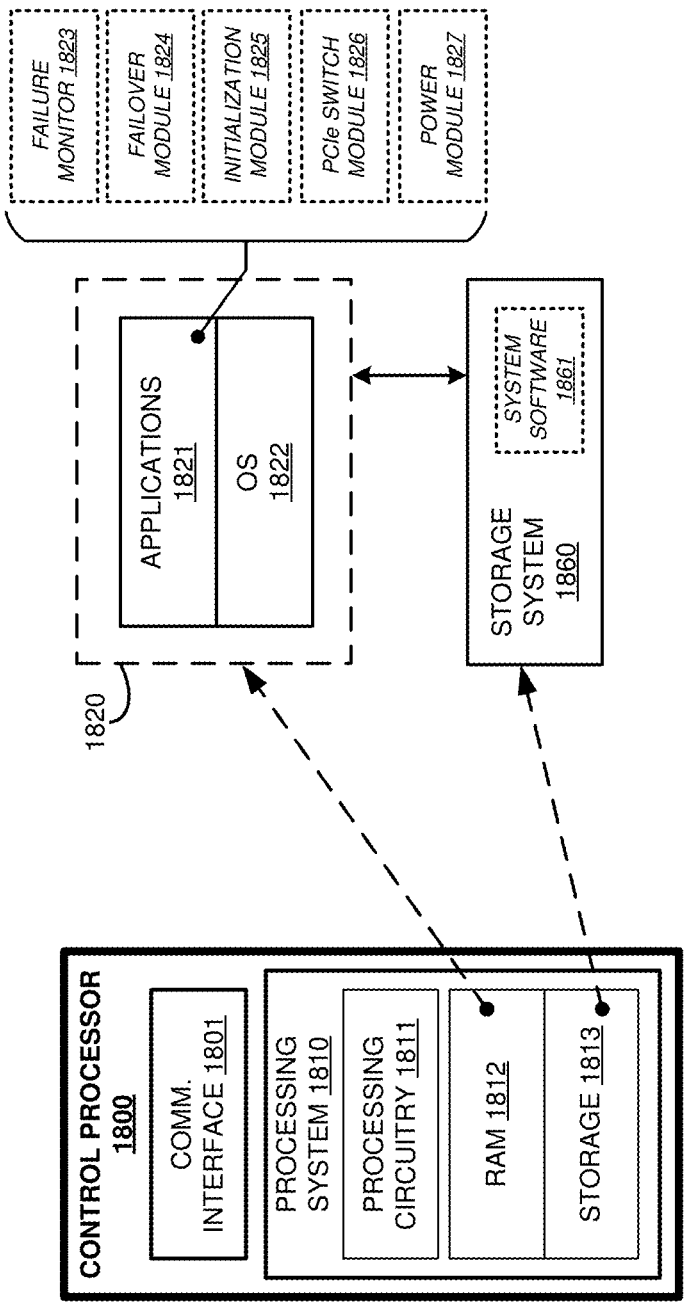
FIG. 18 is a block diagram illustrating a control processor.

FIG. 18 is s block diagram illustrating processing system 1800. Processing system 1800 illustrates an example of any of the control processors, power control elements, or sled processors discussed herein, such as processing systems 131 of FIG. 1, processor 320 or power controller 321 of FIG. 3, processor 450 and power controller 422 of FIG. 4, processor 511 or power controller 531 of FIG. 5, or processors 1713, 1718, and 1725 of FIG. 17. In addition, processing system 1800 can be illustrative of any processing system, processor, or CPU on a processing module, such as processing system 131 of FIG. 1, among others.

Control processor 1800 includes communication interface 1801 and processing system 1810. Processing system 1810 includes processing circuitry 1811, random access memory (RAM) 1812, and storage 1813, although further elements can be included. Example contents of RAM 1812 are further detailed in RAM space 1820, and example contents of storage 1813 are further detailed in storage system 1860.

Processing circuitry 1811 can be implemented within a single processing device but can also be distributed across multiple processing devices or sub-systems that cooperate in executing program instructions. Examples of processing circuitry 1811 include general purpose central processing units, microprocessors, application specific processors, and logic devices, as well as any other type of processing device. In some examples, processing circuitry 1811 includes physically distributed processing devices, such as cloud computing systems.

Communication interface 1801 includes one or more communication and network interfaces for communicating over communication links, networks, such as packet networks, the Internet, and the like. The communication interfaces can include serial links, such as SPI links, I2C links, USB links, UART links, or one or more local or wide area network communication interfaces which can communicate over Ethernet or Internet protocol (IP) links. Communication interface 1801 can include network interfaces configured to communicate using one or more network addresses, which can be associated with different network links. Examples of communication interface 1801 include network interface card equipment, transceivers, modems, and other communication circuitry.

RAM 1812 and storage 1813 together can comprise a non-transitory data storage system, although variations are possible. RAM 1812 and storage 1813 can each comprise any storage media readable by processing circuitry 1811 and capable of storing software. RAM 1812 can include volatile and nonvolatile, removable and non-removable media implemented in any method or technology for storage of information, such as computer readable instructions, data structures, program modules, or other data. Storage 1813 can include non-volatile storage media, such as solid state storage media, flash memory, phase change memory, or magnetic memory, including combinations thereof. RAM 1812 and storage 1813 can each be implemented as a single storage device but can also be implemented across multiple storage devices or sub-systems. RAM 1812 and storage 1813 can each comprise additional elements, such as controllers, capable of communicating with processing circuitry 1811.

Software stored on or in RAM 1812 or storage 1813 can comprise computer program instructions, firmware, or some other form of machine-readable processing instructions having processes that when executed a processing system direct control processor 1800 to operate as described herein. For example, software can drive processor 1800 to monitor operating statistics and status for various storage sleds and other modules, monitor power status for the sleds and modules, and instruct power circuitry to control flow of holdup power or operational power, among other operations. The software can also include user software applications. The software can be implemented as a single application or as multiple applications. In general, the software can, when loaded into a processing system and executed, transform the processing system from a general-purpose device into a special-purpose device customized as described herein.

RAM space 1820 illustrates a detailed view of an example configuration of RAM 1812. It should be understood that different configurations are possible. RAM space 1820 includes applications 1821 and operating system (OS) 1822. Software applications 1823-1825 each comprise executable instructions which can be executed by processor 1800 for operating a processor, CPU, controller, or other circuitry according to the operations discussed herein.

Failure monitor 1823 monitors processing systems, such as processors 131 on processing modules 130, PCIe switches, storage sleds, storage drives, and other components to detect and identify when any of these components experiences failures or degraded performance. The failures can be detected based on keep-alive messaging, periodic polling, discrete signal indicators, or other periodically or interrupt-based indicators. In some examples, the failures are detected using statistical monitoring, where performance statistics, such as throughputs, bandwidth utilization, processor utilization, memory utilization, or other statistics are monitored to identify when a component is experiencing failure or degradation. Failure monitor 1823 can report failures or degraded performance to failover module 1824.

In periodic polling examples, a first processor can be configured to periodically transfer a polling message for delivery to a second processor monitored by the first processor. This polling message can be received by the first processor and a response can be transferred to the second processor which can then determine that the first processor has not yet failed. Polling messages can be combined with other processes, such as monitoring traffic levels handled by a particular processor to determine a robust determination of when a processor is unresponsive. Polling messages can be transferred over more than one communication pathway, which can lead to a determination of when a particular communication pathway is experiencing failures or problems. The first processor can likewise transfer polling messages for delivery to the second processor in a similar manner to monitor failure of the second processor. More than one processor can be configured to poll more than one other processor. For example, PCIe messages can be exchanged among the various processors and processing modules of FIG. 1 to allow identification of when a processor is unresponsive and possibly failed.

Failover module 1824 can initiate failover processes for the various processors that handle storage transactions, such as processors 131 on processing modules 130, among other components. If a processor fails, such as discussed in FIGS. 6-7, then failover module 1824 can responsively switch management of storage drives or storage modules to another non-failed processor to handle further data transactions directed to storage drives originally associated with the failed one of the processors. Likewise, if a PCIe switch fails, then traffic of that PCIe switch can be re-routed to redundant PCIe switches to enable continued operation and storage operation handling.

Initialization module 1825 initializes storage sleds and storage drives therein, such as by instantiating various storage drives and assigning various addresses and identification numbers to the various storage drives and storage sleds. Initialization module 1825 can also initialize various parts on the various modules discussed herein, such as PCIe switches, network interfaces, power control circuitry, power control processors, sideband interfaces, among other elements. Initialization module 1825 can communicate over control plane and sideband interfaces to perform the initialization.

PCIe switch module 1826 handles initialization, configuration, and management of the various PCIe switches and links discussed herein. PCIe switch module 1826 can establish non-transparent port configurations, domains for logical PCIe segregation, among other operations. PCIe switch module 1826 can also retrieve and monitor statistical information for PCIe switches and links to provide these to other processors for monitoring and presentation over user interfaces to users or operators.

Power module 1827 monitors usage status or usage statistics for elements of sleds and modules. The usage statistics include data transfer rates of links, error rates of links, a cumulate number of errors of links, among other statistics.

The usage statistics can be collected and stored by processor 1800 in a data structure, such as a database or table and stored in storage 1813, RAM 1812, or other storage elements. Power module 1827 monitors power inrush statistics during a power-up process, power status statistics, power active status, voltage levels, phase measurements, current draw, holdup circuit status or levels, sled/module insertion status, thermal levels, among other statistics. Power module 1827 instructs power circuitry to power up or power down an associated sled or module using signals such as discrete signals of associated power circuitry. Power module 1827 can power up or power down a sled or module responsive to data commit status of associated storage drives or other circuitry, responsive to insertion status, or other factors.

Applications 1821 and OS 1822 can reside in RAM space 1820 during execution and operation of control processor 1800, and can reside in storage system 1860 during a powered-off state, among other locations and states. Applications 1821 and OS 1822 can be loaded into RAM space 1820 during a startup or boot procedure as described for computer operating systems and applications.

Storage system 1860 illustrates a detailed view of an example configuration of storage 1813. Storage system 1860 can comprise flash memory such as NAND flash or NOR flash memory, phase change memory, magnetic memory, among other solid state storage technologies. As shown in FIG. 18, storage system 1860 includes system software 1861. As described above, system software 1861 can be in a non-volatile storage space for applications and OS during a powered-down state of control processor 1800, among other operating software.

Control processor 1800 is generally intended to represent a computing system with which at least software 1861 and 1821-1822 are deployed and executed in order to render or otherwise implement the operations described herein. However, control processor 1800 can also represent any computing system on which at least software 1861 and 1821-1822 can be staged and from where software 1861 and 1821-1822 can be distributed, transported, downloaded, or otherwise provided to yet another computing system for deployment and execution, or yet additional distribution.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A data storage system, comprising:
    a plurality of processors configured to each manage an associated subset of a plurality of storage devices coupled over a Peripheral Component Interconnect Express (PCIe) fabric;
    at least one processor configured to:
        receive data packets comprising storage operations over a network interface associated with the at least one processor;
        identify when ones of the storage operations are directed to at least one of the plurality of storage devices managed by a target processor; and
        transfer over the PCIe fabric associated data packets comprising the ones of the storage operations into a network buffer of the target processor for handling of the ones of the storage operations by the target processor.

2. The data storage system of claim 1, comprising:
    the target processor configured to process the associated data packets up a network stack of the target processor for handling of the ones of the storage operations.

3. The data storage system of claim 1, wherein the network buffer of the target processor comprises a layer 2 network buffer of a network interface associated with the target processor.

4. The data storage system of claim 1, wherein the associated data packets comprise NVM Express (NVMe) data packets for one or more NVMe storage operations.

5. The data storage system of claim 1, wherein the associated data packets comprise iSCSI (Internet Small Computer System Interface) data packets for one or more iSCSI storage operations.

6. The data storage system of claim 5, comprising:
    the at least one processor further configured to identify when the ones of the storage operations are directed to at least the one of the plurality of storage devices managed by the target processor by at least processing a logical block address (LBA) and an iSCSI target identifier of an iSCSI header associated with the iSCSI data packets.

7. The data storage system of claim 1, comprising:
    the at least one processor further configured to:
        receive data frames comprising further storage operations over an associated NVM Express (NVMe) interface;
        identify when ones of the further storage operations are directed to one or more of the plurality of storage devices managed by the target processor; and
        transfer over the PCIe fabric associated data frames comprising the ones of the further storage operations into an NVMe buffer of the target processor for handling of the ones of the further storage operations by the target processor.

8. The data storage system of claim 1, wherein network interfaces associated with the at least one processor and the target processor have at least one different Internet Protocol (IP) address associated with an Internet Small Computer System Interface (iSCSI) portal group; and comprising:
    the at least one processor configured to identify further data packets as associated with the iSCSI portal group and associated with the at least one of the plurality of storage devices managed by the target processor, and responsively transfer the further data packets for handling by the target processor associated with the iSCSI portal group.

9. The data storage system of claim 1, comprising:
    the at least one processor configured to transfer the associated data packets into the network buffer of the target processor over the PCIe fabric using a PCIe address space shared at least among the at least one processor and the target processor.

10. A method of operating a data storage system, the method comprising:
    in a first processor, receiving data packets comprising storage operations over a network interface associated with the first processor;
    in the first processor, identifying when ones of the storage operations are directed to storage devices managed by a second processor coupled to the first processor over a Peripheral Component Interconnect Express (PCIe) fabric; and in the first processor, transferring over the PCIe fabric associated data packets comprising the ones of the storage operations into a network buffer of the second processor for handling of the ones of the storage operations by the second processor with one or more storage devices coupled over the PCIe fabric.

11. The method of claim 10, further comprising:
in the second processor, processing the associated data packets up a network stack of the second processor for handling of the ones of the storage operations.

12. The method of claim 10, wherein the network buffer of the second processor comprises a layer 2 network buffer of a network interface associated with the second processor.

13. The method of claim 10, wherein the associated data packets comprise NVM Express (NVMe) data packets for one or more NVMe storage operations.

14. The method of claim 10, wherein the associated data packets comprise iSCSI (Internet Small Computer System Interface) data packets for one or more iSCSI storage operations.

15. The method of claim 14, further comprising:
in the first processor, identifying when the ones of the storage operations are directed to the storage devices managed by the second processor by at least processing a logical block address (LBA) and an iSCSI target identifier of an iSCSI header associated with the iSCSI data packets.

16. The method of claim 10, further comprising, in the first processor:
receiving data frames comprising further storage operations over an associated NVM Express (NVMe) interface;
identifying when ones of the further storage operations are directed to the storage devices managed by the second processor; and
transferring over the PCIe fabric associated data frames comprising the ones of the further storage operations into an NVMe buffer of the second processor for handling of the ones of the further storage operations by the second processor.

17. The method of claim 10, wherein network interfaces associated with the first processor and the second processor have at least one different Internet Protocol (IP) address associated with an Internet Small Computer System Interface (iSCSI) portal group; and further comprising:
in the first processor, identifying further data packets as associated with the iSCSI portal group and associated with the storage devices managed by the second processor, and responsively transferring the further data packets for handling by the second processor associated with the iSCSI portal group.

18. The method of claim 10, further comprising:
in the first processor, transferring the associated data packets into the network buffer of the second processor over the PCIe fabric using a PCIe address space shared at least among the at the first processor and the second processor.

19. A data storage control system, comprising:
one or more non-transitory computer readable storage media;
a processing system operatively coupled with the one or more non-transitory computer readable storage media; and
a data storage service comprising program instructions stored on the one or more non-transitory computer readable storage media that, based on being read and executed by the processing system, direct the processing system to at least:
receive data packets comprising storage operations over a network interface; and
based at least on ones of the storage operations identified as directed to storage devices managed by a target processor coupled over a Peripheral Component Interconnect Express (PCIe) fabric, transferring over the PCIe fabric associated data packets comprising the ones of the storage operations into a network buffer of the target processor for handling of the ones of the storage operations up a network stack by the target processor with one or more storage devices coupled over the PCIe fabric.

20. The data storage control system of claim 19, wherein the associated data packets comprise iSCSI (Internet Small Computer System Interface) data packets for one or more iSCSI storage operations; and
comprising further program instructions, that when executed by the processing system, direct the processing system to at least:
identify when the ones of the storage operations are directed to at least the storage devices managed by the target processor by at least processing a logical block address (LBA) and an iSCSI target identifier of an iSCSI header associated with the iSCSI data packets.

* * * * *